United States Patent
Tanaka

(10) Patent No.: US 11,223,812 B2
(45) Date of Patent: Jan. 11, 2022

(54) IMAGE PROCESSING APPARATUS AND IMAGE PROCESSING METHOD

(71) Applicant: SONY CORPORATION, Tokyo (JP)

(72) Inventor: Junichi Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 267 days.

(21) Appl. No.: 15/769,143

(22) PCT Filed: Oct. 28, 2016

(86) PCT No.: PCT/JP2016/082027
§ 371 (c)(1),
(2) Date: Apr. 18, 2018

(87) PCT Pub. No.: WO2017/082079
PCT Pub. Date: May 18, 2017

(65) Prior Publication Data
US 2018/0316902 A1    Nov. 1, 2018

(30) Foreign Application Priority Data
Nov. 11, 2015    (JP) .............................. JP2015-221236

(51) Int. Cl.
*H04N 13/00* (2018.01)
*H04N 13/15* (2018.01)
(Continued)

(52) U.S. Cl.
CPC ............... *H04N 13/15* (2018.05); *H04N 9/64* (2013.01); *H04N 13/117* (2018.05);
(Continued)

(58) Field of Classification Search
CPC .......... H04N 13/00; H04N 19/00; H04N 21/00
See application file for complete search history.

(56) References Cited

U.S. PATENT DOCUMENTS

| | | | |
|---|---|---|---|
| 2011/0025905 A1* | 2/2011 | Tanaka | H04N 9/09 348/362 |
| 2011/0298898 A1 | 12/2011 | Jung et al. | |

(Continued)

FOREIGN PATENT DOCUMENTS

| | | |
|---|---|---|
| JP | 2010-157826 A | 7/2010 |
| JP | 2011-519227 A | 6/2011 |

(Continued)

OTHER PUBLICATIONS

Jun. 3, 2019, European Search Report issued for related EP Application No. 16864042.3.

(Continued)

*Primary Examiner* — Maryam A Nasri
(74) *Attorney, Agent, or Firm* — Paratus Law Group, PLLC

(57) ABSTRACT

There is provided an image processing apparatus and an image processing method by which three-dimensional data can be generated with high accuracy on the basis of two-dimensional image data and depth image data. A color shift correction data generation unit generates color shift correction data for correcting a color shift between two-dimensional image data of a base viewpoint and two-dimensional image data of a reference viewpoint. A metadata addition unit transmits color shift correction information including the color shift correction data generated by the color shift correction data generation unit, encoded data of the two-dimensional image data of the base viewpoint and depth image data indicative of a position of each of pixels in a depthwise direction of an image pickup object and encoded data of the two-dimensional image data of the reference viewpoint and depth image data. The present disclosure can be applied, for example, to a synthesis apparatus.

13 Claims, 29 Drawing Sheets

(51) Int. Cl.
| | |
|---|---|
| H04N 19/597 | (2014.01) |
| H04N 21/235 | (2011.01) |
| H04N 19/70 | (2014.01) |
| H04N 9/64 | (2006.01) |
| H04N 13/117 | (2018.01) |
| H04N 13/161 | (2018.01) |
| H04N 13/178 | (2018.01) |
| H04N 13/122 | (2018.01) |
| H04N 13/133 | (2018.01) |
| H04N 13/25 | (2018.01) |
| H04N 13/30 | (2018.01) |
| H04N 13/194 | (2018.01) |
| H04N 13/271 | (2018.01) |
| H04N 13/243 | (2018.01) |
| H04N 19/44 | (2014.01) |
| H04N 13/344 | (2018.01) |
| H04N 13/167 | (2018.01) |
| H04N 13/296 | (2018.01) |
| H04N 13/246 | (2018.01) |

(52) U.S. Cl.
CPC ......... *H04N 13/122* (2018.05); *H04N 13/133* (2018.05); *H04N 13/161* (2018.05); *H04N 13/178* (2018.05); *H04N 13/194* (2018.05); *H04N 13/243* (2018.05); *H04N 13/25* (2018.05); *H04N 13/271* (2018.05); *H04N 13/30* (2018.05); *H04N 19/44* (2014.11); *H04N 19/597* (2014.11); *H04N 19/70* (2014.11); *H04N 21/235* (2013.01); *H04N 13/167* (2018.05); *H04N 13/246* (2018.05); *H04N 13/296* (2018.05); *H04N 13/344* (2018.05); *H04N 2013/0081* (2013.01); *H04N 2213/003* (2013.01)

(56) References Cited

U.S. PATENT DOCUMENTS

| | | |
|---|---|---|
| 2014/0002592 A1 | 1/2014 | Takahashi et al. |
| 2016/0212406 A1* | 7/2016 | Hayasaka .......... H04N 5/23238 |

FOREIGN PATENT DOCUMENTS

| | | |
|---|---|---|
| JP | 2012-238932 A | 12/2012 |
| JP | 2013-046320 A | 3/2013 |
| JP | 2014-053650 A | 3/2014 |
| WO | WO 2012/128070 A1 | 9/2012 |
| WO | WO 2015/037473 A1 | 3/2015 |

OTHER PUBLICATIONS

Yamamoto et al., Multiview Video Coding Using View Interpolation and Color Correction, IEEE Transactions on Circuits and Systems for Video Technology, Nov. 2007, pp. 1436-1449, vol. 17, No. 11, IEEE.

Collet et al., High-Quality Streamable Free-Viewpoint Video, ACM Trans. Graphics (SIGGRAPH), Aug. 2015, pp. 1-13, vol. 34 Issue 4.

Preda, MPEG Graphics Compression Model, 3D Graphics Compression Model, May 2008, pp. 1-2, Accessed at https://mpeg.chiariglione.org/standards/mpeg-4/3d-graphics-compression-model on Jan. 9, 2018.

Sep. 27, 2019, Chinese Office Action issued for related CN Application No. 201680064636.X.

\* cited by examiner

FIG.4

| CAMERA ID | R\|T | A | isStereoFlag | STEREO CAMERA ID |
|---|---|---|---|---|
| 0 | R0\|T0 | A0 | - | - |
| 1 | R1\|T1 | A1 | - | - |
| 2 | R2\|T2 | A2 | - | - |
| 3 | R3\|T3 | A3 | - | - |
| 4 | R4\|T4 | A4 | - | - |
| 5 | R5\|T5 | A5 | - | - |
| 6 | R6\|T6 | A6 | 1 | 8 |
| 7 | R7\|T7 | A7 | 1 | 9 |
| 8 | R8\|T8 | A8 | 1 | 6 |
| 9 | R9\|T9 | A9 | 1 | 7 |

FIG. 12

| CAMERA ID | num_units_in_tick | time_scale | Delta_num_units_in_tick | Delta_time_scale |
|---|---|---|---|---|
| 0 | 1001 | 60000 | 0 | 60000 |
| 1 | 1001 | 60000 | 2002 | 60000 |
| 2 | 2002 | 60000 | 4004 | 60000 |
| 3 | 2002 | 60000 | 0 | 60000 |
| 4 | 1001 | 60000 | 0 | 60000 |
| 5 | 1001 | 60000 | 2002 | 60000 |
| 6 | 2002 | 60000 | 4004 | 60000 |
| 7 | 2002 | 60000 | 0 | 60000 |
| 8 | 2002 | 60000 | 4004 | 60000 |
| 9 | 2002 | 60000 | 0 | 60000 |

| CAMERA ID | isCorrection Flag | COORDINATE TRANSFORMATION DATA |
|---|---|---|
| 0 | 1 | R\|t(0) |
| 1 | 1 | R\|t(1) |
| 2 | 1 | R\|t(2) |
| 3 | 1 | R\|t(3) |

FIG.27

| CAMERA ID | isCorrection Flag | COLOR SHIFT CORRECTION DATA |
|---|---|---|
| 0 | 0 | – |
| 1 | 0 | – |
| 2 | 0 | – |
| 3 | 1 | P(3) |
| 4 | 0 | – |
| 5 | 1 | P(5) |
| 6 | 0 | – |
| 7 | 0 | – |
| 8 | 0 | – |
| 9 | 0 | – |

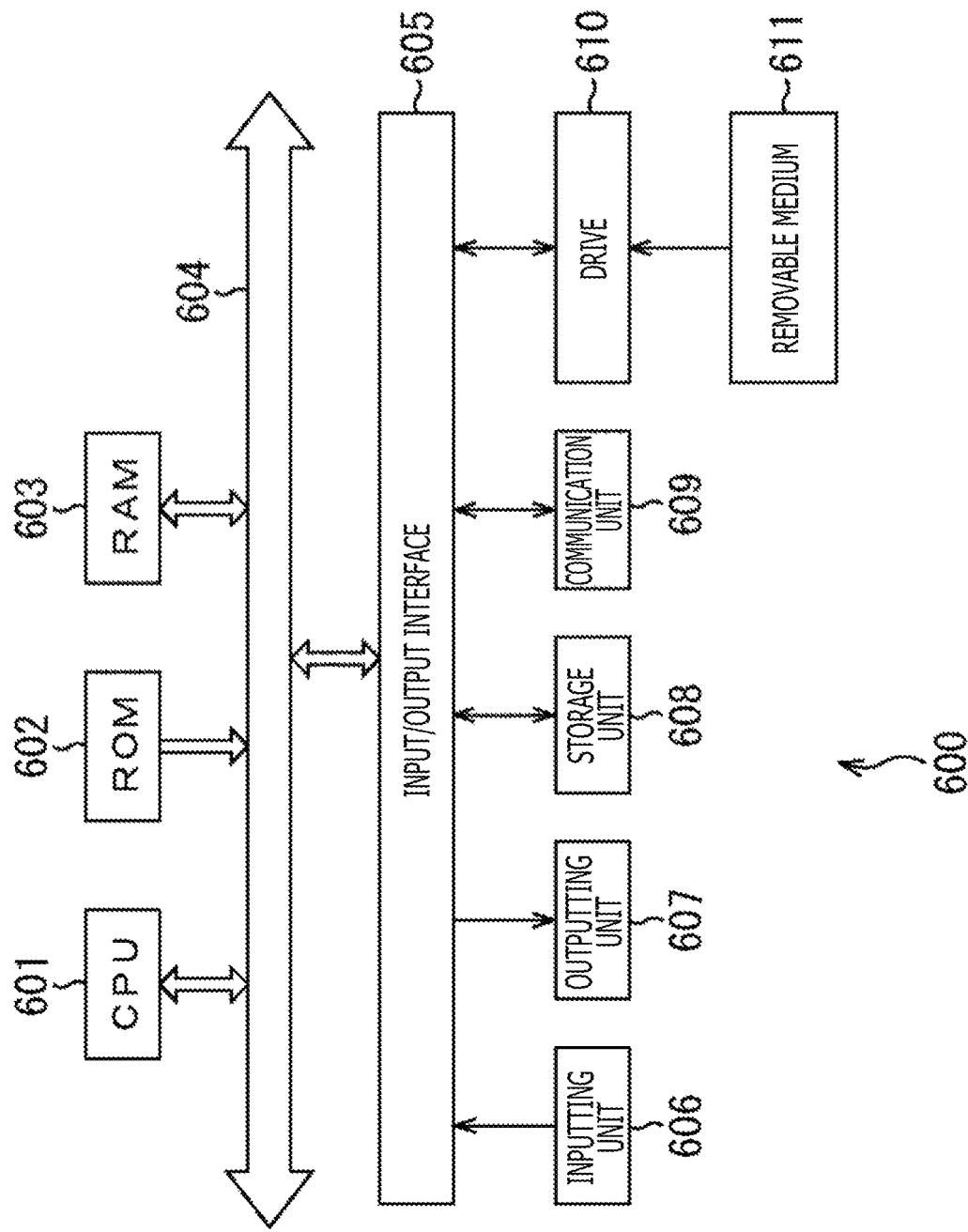

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2016/082027 (filed on Oct. 28, 2016) under 35 U.S.C. § 371, which claims priority to Japanese Patent Application No. 2015-221236 (filed on Nov. 11, 2015), which are all hereby incorporated by reference in their entirety.

TECHNICAL FIELD

The present disclosure relates to an image processing apparatus and an image processing method, and particularly to an image processing apparatus and an image processing method by which three-dimensional data can be generated with high accuracy on the basis of two-dimensional image data and depth image data.

BACKGROUND ART

In a multi-view stereo technology, a transmission system has been devised which records, encodes, transmits, decodes and displays three-dimensional data including three-dimensional position information and two-dimensional image data of a three-dimensional object picked up by a plurality of cameras (for example, refer to NPL 1). As an encoding method of three-dimensional data, an MPEG (Moving Picture Experts Group phase) method and so forth are available (for example, refer to NPL 2).

Further, a transmission system has been devised by which a plurality of pieces of two-dimensional image data of different viewpoints and depth image data including depths indicative of positions of pixels in the depthwise direction of an image pickup object (direction perpendicular to an image pickup plane), both obtained from a plurality of cameras, are recorded, encoded, transmitted, decoded and displayed as they are. As a method for encoding two-dimensional image data and depth image data, an MVCD (Multiview and depth video coding) method, an AVC (Advanced Video Coding) method, an HEVC (High Efficiency Video Coding) method and so forth are available.

CITATION LIST

Non Patent Literature

[NPL 1]
Ming Chuang, Pat Sweeney, Don Gillett, Dennis Evseev, David Calabrese, Hugues Hoppe, Adam Kirk, Steve Sullivan, "High-Quality Streamable Free-Viewpoint Video, Alvaro Collet," Microsoft Corporation
[NPL 2]
Marius Preda, "MPEG Graphics Compression Model" MPEG document: N9892, May 2008

SUMMARY

Technical Problems

However, in the case where three-dimensional information of an image pickup object is transmitted as three-dimensional data, a processing unit of a high function that processes three-dimensional data is required on the reception side.

Further, in the case where three-dimensional information of an image pickup object is transmitted in the form of two-dimensional image data and depth image data obtained by a plurality of cameras, although the processing on the reception side is facilitated, a color shift sometimes occurs in two-dimensional image data of viewpoints. In this case, three-dimensional data cannot be generated with high accuracy on the basis of the two-dimensional image data and the depth image data of the viewpoints.

The present disclosure has been made in view of such a situation as described above, and it is an object of the present disclosure to make it possible to generate three-dimensional data with high accuracy on the basis of two-dimensional image data and depth image data.

Solution to Problems

The image processing apparatus according to a first aspect of the present disclosure is an image processing apparatus, including: a color shift correction data generation unit that generates color shift correction data for correcting a color shift between two-dimensional image data of a first viewpoint and two-dimensional image data of a second viewpoint; and a transmission unit that transmits color shift correction information including the color shift correction data generated by the color shift correction data generation unit, first encoded data that is encoded data of the two-dimensional image data of the first viewpoint and depth image data indicative of a position of each of pixels in a depthwise direction of an image pickup object with respect to a third viewpoint and second encoded data that is encoded data of the two-dimensional image data of the second viewpoint and depth image data of a fourth viewpoint.

The image processing method according to the first aspect of the present disclosure corresponds to the image processing apparatus of the first aspect of the present disclosure.

In the first aspect of the present disclosure, color shift correction data for correcting a color shift between two-dimensional image data of a first viewpoint and two-dimensional image data of a second viewpoint is generated, and color shift correction information including the generated color shift correction data, first encoded data that is encoded data of the two-dimensional image data of the first viewpoint and depth image data indicative of a position of each of pixels in a depthwise direction of an image pickup object with respect to a third viewpoint and second encoded data that is encoded data of the two-dimensional image data of the second viewpoint and depth image data of a fourth viewpoint are transmitted.

The image processing apparatus according to a second aspect of the present disclosure is an image processing apparatus, including: a decoding unit that decodes first encoded data that is encoded data of two-dimensional image data of a first viewpoint and depth image data indicative of a position of each of pixels in a depthwise direction of an image pickup object with respect to a second viewpoint and second encoded data that is encoded data of two-dimensional image data of a third viewpoint and depth image data of a fourth viewpoint; and a color correction unit that performs color correction of the two-dimensional image data of the third viewpoint obtained as a result of the decoding by the decoding unit on the basis of color shift correction information including color shift correction data of the two-dimensional image data of the first viewpoint and the two-dimensional image data of the third viewpoint.

The image processing method and program according to the second aspect of the present disclosure correspond to the image processing apparatus of the second aspect of the present disclosure.

In the second aspect of the present disclosure, first encoded data that is encoded data of two-dimensional image data of a first viewpoint and depth image data indicative of a position of each of pixels in a depthwise direction of an image pickup object with respect to a second viewpoint and second encoded data that is encoded data of two-dimensional image data of a third viewpoint and depth image data of a fourth viewpoint are decoded. On the basis of color shift correction information including color shift correction data of the two-dimensional image data of the first viewpoint and the two-dimensional image data of the third viewpoint, color correction of the two-dimensional image data of the third viewpoint obtained as a result of the decoding is performed.

It is to be noted that the image processing apparatus in the first aspect and the second aspect can be implemented by causing a computer to execute a program.

Further, in order to implement the image processing apparatus of the first aspect and the second aspect, the program to be executed by the computer can be provided by transmitting the same through a transmission medium or by recording the same on a recording medium.

Advantageous Effects of Invention

With the first aspect of the present disclosure, image processing can be performed. Further, with the first aspect of the present disclosure, the image processing can be performed such that three-dimensional data can be generated with high accuracy on the basis of two-dimensional image data and depth image data.

With the second aspect of the present disclosure, image processing can be performed. Further, with the second aspect of the present disclosure, three-dimensional data can be generated with high accuracy on the basis of two-dimensional image data and depth image data.

It is to be noted that the effects described here are not necessarily restrictive and any one of the effects described in the present disclosure may be applied.

BRIEF DESCRIPTION OF DRAWINGS

FIG. 4 is a view depicting an example of camera related information.

FIG. 12 is a view depicting an example of synchronism deviation information.

FIG. 27 is a view depicting an example of color shift correction information.

FIG. 30 is a block diagram depicting an example of a hardware configuration of a computer.

DESCRIPTION OF EMBODIMENTS

In the following, modes for carrying out the present disclosure (hereinafter referred to as embodiments) are described. It is to be noted that the description is given in the following order.
1. First Embodiment: transmission system (FIGS. 1 to 9)
2. Second Embodiment: transmission system (FIGS. 10 to 16)
3. Third Embodiment: transmission system (FIGS. 17 to 19)
4. Fourth Embodiment: transmission system (FIGS. 20 to 25)
5. Fifth Embodiment: transmission system (FIGS. 26 to 29)
6. Sixth Embodiment: computer (FIG. 30)

First Embodiment

Example of Configuration of First Embodiment of Transmission System

Figure 1:
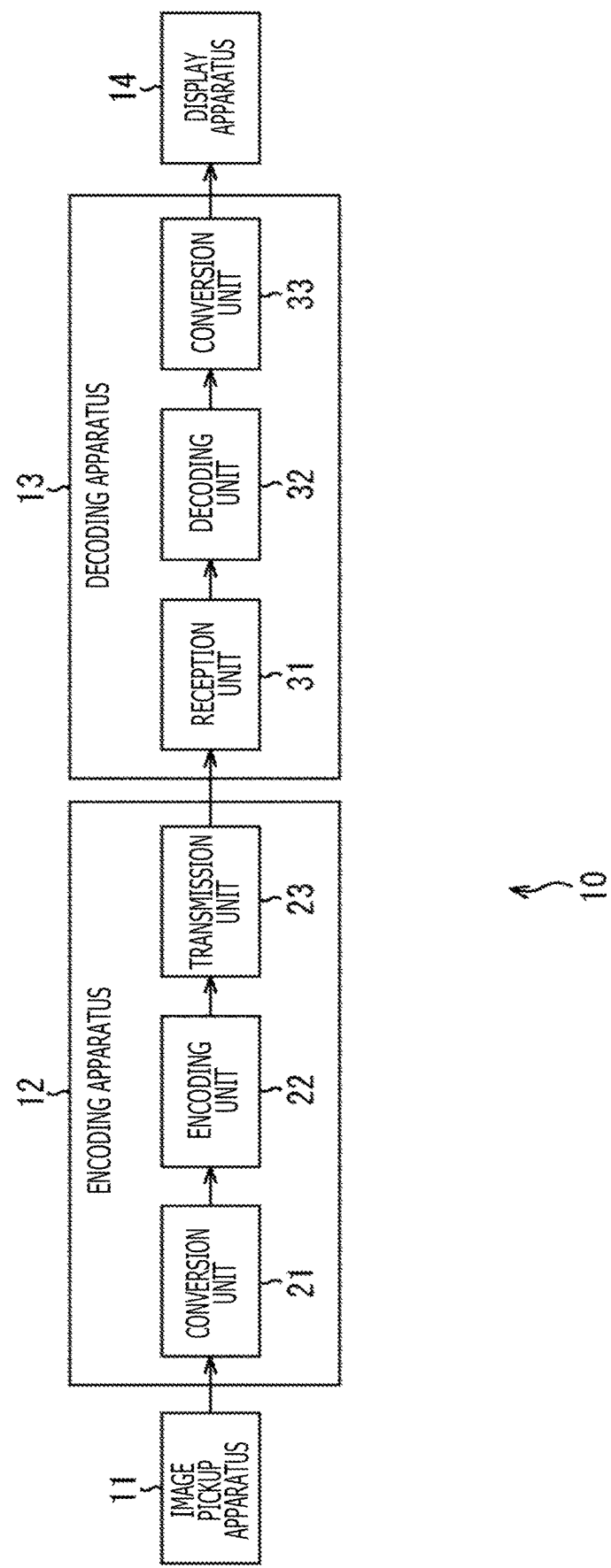
FIG. 1 is a block diagram depicting an example of a configuration of a first embodiment of a transmission system to which the present disclosure is applied.

FIG. 1 is a block diagram depicting an example of a configuration of a first embodiment of a transmission system to which the present disclosure is applied.

A transmission system 10 of FIG. 1 includes an image pickup apparatus 11, an encoding apparatus 12, a decoding apparatus 13 and a display apparatus 14. The transmission system 10 generates and displays display image data in accordance with a predetermined display image generation method using two-dimensional image data and so forth acquired from the image pickup apparatus 11.

In particular, the image pickup apparatus 11 of the transmission system 10 includes, for example, a multi-camera, a distance measuring instrument and an image processing unit. The multi-camera of the image pickup apparatus 11 includes a plurality of (for example, eight) cameras that pick up two-dimensional image data of moving images of an image pickup object, which are same at least at part thereof among the cameras. The distance measuring instrument is provided, for example, in each camera and generates depth image data of a viewpoint same as that of the camera.

The image processing unit (three-dimensional data generation unit) of the image pickup apparatus 11 performs modeling by Visual Hull and so forth using two-dimensional image data and depth image data of the viewpoints of the cameras and internal parameters and external parameters of the cameras to generate a mesh. The image processing unit generates geometrical information (Geometry) indicative of three-dimensional positions of points (Vertex) configuring the generated mesh and links (Polygon) of the points and two-dimensional image data of the mesh as three-dimensional data of the image pickup object and supplies the three-dimensional data to the encoding apparatus 12.

Details of a method for generating three-dimensional data from two-dimensional image data and depth image data of a plurality of viewpoints are described, for example, in Saied Moezzi, Li-Cheng Tai, Philippe Gerard, "Virtual View Generation for 3D Digital Video," University of California, San Diego or Takeo Kanade and Peter Ranger, P. J. Narayanan, "Virtualized Reality: Constructing Virtual Worlds from Real Scenes."

The encoding apparatus 12 includes a conversion unit 21, an encoding unit 22 and a transmission unit 23.

The conversion unit 21 of the encoding apparatus 12 sets internal parameters and external parameters of virtual cameras of a plurality of viewpoints corresponding to the predetermined display image generation method as camera parameters. The conversion unit 21 generates two-dimensional image data and depth image data of a plurality of viewpoints corresponding to the predetermined display image generation method from three-dimensional data supplied from the image pickup apparatus 11 on the basis of the camera parameters.

Details of the 3DCG technology for generating two-dimensional image data and depth image data of a plurality of viewpoints from three-dimensional data are described, for example, in Masayuki TANIMOTO, "Aiming for ultimate video communication," Technical Report of the Proceedings of the Institute of Electronics, Information and Communication Engineers, CS, Communication Method 110(323), 73-78, 2010-11-25 and so forth.

In the present specification, although it is assumed that the viewpoints of two-dimensional image data and depth image data are same as each other, the viewpoints and the numbers of viewpoints of two-dimensional image data and depth image data may be different from each other. Further, the viewpoints and the numbers of the viewpoints of two-dimensional image data and depth image data may be equal to or different from the viewpoints and the numbers of the viewpoints of the cameras of the image pickup apparatus 11.

The conversion unit 21 extracts three-dimensional data in an occlusion region that is invisible from a plurality of viewpoints corresponding to the predetermined display image generation method (such data is hereinafter referred to as occlusion three-dimensional data) from three-dimensional data supplied from the image pickup apparatus 11. The conversion unit 21 supplies two-dimensional image data and depth image data of a plurality of viewpoints corresponding to the predetermined display image generation method, and occlusion three-dimensional data as well as metadata including camera related information that is information regarding virtual cameras such as camera parameters and so forth of the viewpoints to the encoding unit 22.

The encoding unit 22 encodes two-dimensional image data, depth image data and metadata supplied from the conversion unit 21. As the encoding method, the MVCD (Multiview and depth video coding) method, the AVC method, the HEVC method and so forth can be adopted.

In the case where the encoding method is the MVCD method, two-dimensional image data and depth image data of all viewpoints are encoded collectively. As a result, a single encoded stream including the encoded data of the two-dimensional image data and the depth image data and the metadata is generated. In this case, the camera parameters from among the metadata are placed in reference displays information SEI of the encoded stream. Meanwhile, information relating to the depth image data from among the metadata is placed in Depth representation information SEI.

On the other hand, in the case where the encoding method is the AVC method or the HEVC method, depth image data and two-dimensional image data of the viewpoints are encoded separately from each other. As a result, an encoded stream of each viewpoint including two-dimensional image data and metadata of the viewpoint and an encoded stream of each viewpoint including encoded data of depth image data and metadata of the viewpoint are generated. In this case, the metadata is placed, for example, in User unregistered SEI of each encoded stream. Further, the metadata includes information that associates an encoded stream and a camera parameter and so forth with each other.

It is to be noted that the information that associates an encoded stream and a camera parameter or the like may not be included in metadata, but only metadata corresponding to an encoded stream may be included in the encoded stream.

The encoding unit 22 supplies an encoded stream to the transmission unit 23. The transmission unit 23 transmits the encoded stream supplied from the encoding unit 22 to the decoding apparatus 13. It is to be noted that, while, in the present specification, it is stated that metadata is placed in and transmitted together with an encoded stream, it may otherwise be transmitted separately from an encoded stream.

The decoding apparatus 13 includes a reception unit 31, a decoding unit 32 and a conversion unit 33.

The reception unit 31 of the decoding apparatus 13 receives an encoded stream transmitted from the transmission unit 23 and supplies the encoded stream to the decoding unit 32. The decoding unit 32 decodes the encoded stream supplied from the reception unit 31 in accordance with a method corresponding to the encoding method by the encoding unit 22. The decoding unit 32 supplies two-dimensional image data and depth image data of a plurality of viewpoints and metadata obtained as a result of the decoding to the conversion unit 33.

The conversion unit 33 selects, on the basis of the metadata supplied from the decoding unit 32 and the display image generation method of the decoding apparatus 13, two-dimensional image data of a predetermined viewpoint or two-dimensional image data and depth image data of a predetermined viewpoint from two-dimensional image data and depth image data of a plurality of viewpoints. The conversion unit 33 generates display image data on the basis of selected two-dimensional image data of a predetermined viewpoint or selected two-dimensional image data and depth image data of a predetermined viewpoint and supplies the display image data to the display apparatus 14.

The display apparatus 14 includes a two-dimensional head-mounted display, a two-dimensional monitor, a three-dimensional head-mounted display, a three-dimensional monitor or the like. The display apparatus 14 two-dimensionally displays or three-dimensionally displays a display image on the basis of display image data supplied from the conversion unit 33.

Example of Configuration of Conversion Unit 21

Figure 2:
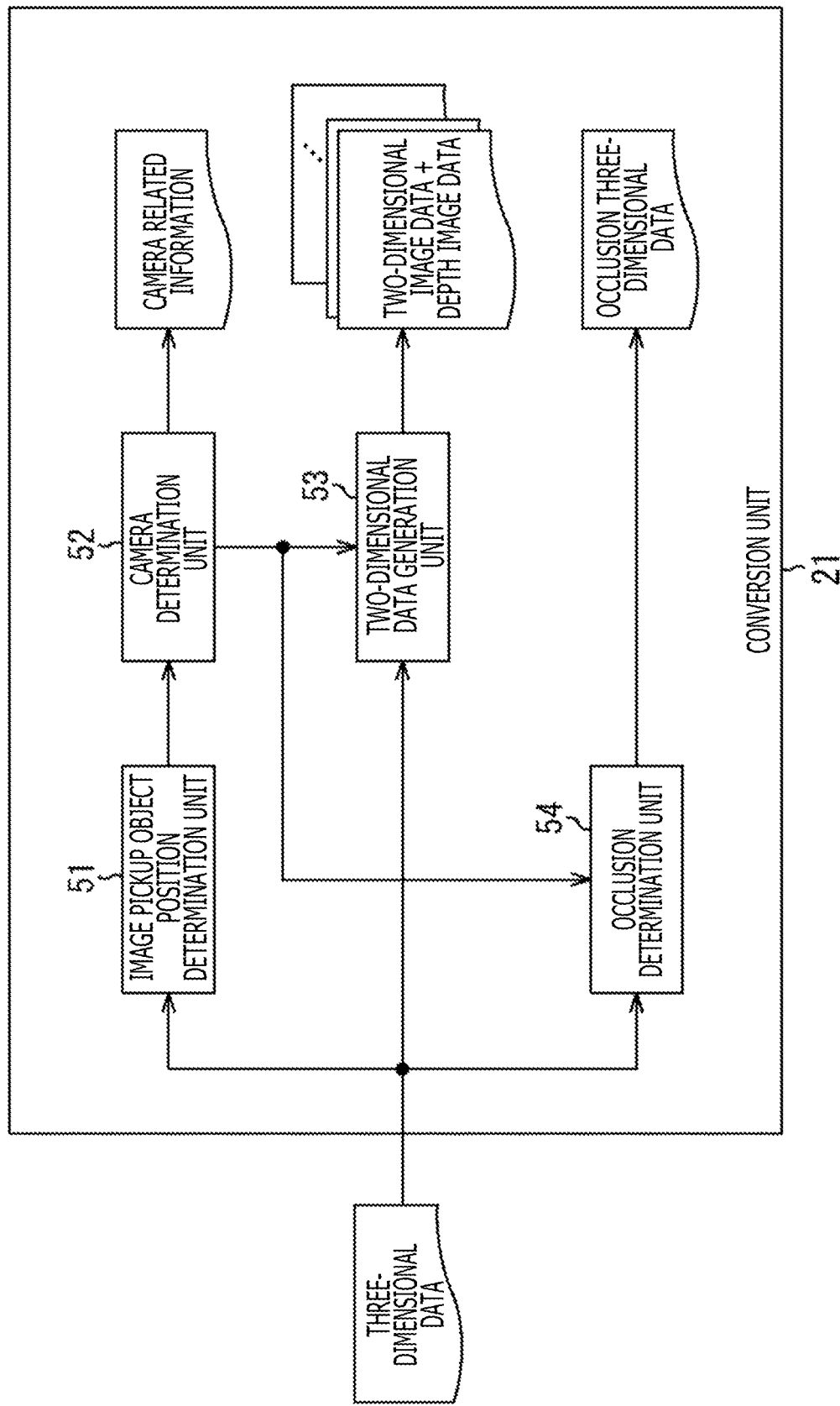
FIG. 2 is a block diagram depicting an example of a configuration of a conversion unit of FIG. 1.

FIG. 2 is a block diagram depicting an example of a configuration of the conversion unit 21 of FIG. 1.

The conversion unit 21 of FIG. 2 includes an image pickup object position determination unit 51, a camera determination unit 52, a two-dimensional data generation unit 53, and an occlusion determination unit 54.

The image pickup object position determination unit 51 of the conversion unit 21 determines a three-dimensional position of the center of an image pickup object of a three-dimensional object corresponding to three-dimensional data supplied from the image pickup apparatus 11 of FIG. 1, and supplies image pickup object position information representative of the three-dimensional position to the camera determination unit 52.

The camera determination unit 52 determines, on the basis of the image pickup object position information supplied from the image pickup object position determination unit 51, camera parameters of a plurality of viewpoints corresponding to the predetermined display image generation method and supplies the camera parameters to the two-dimensional data generation unit 53 and the occlusion determination unit 54. Further, the camera determination unit 52 generates camera related information from camera parameters and so forth of the viewpoints and supplies the camera related information as metadata to the encoding unit 22 of FIG. 1.

The two-dimensional data generation unit 53 performs, on the basis of the camera parameters of a plurality of viewpoints supplied from the camera determination unit 52, perspective projection of a three-dimensional object corresponding to three-dimensional data for each of the viewpoints.

In particular, a relation between a matrix m' corresponding to two-dimensional positions of the pixels and a matrix M corresponding to three-dimensional coordinates of a world coordinate system is represented by the following expression (1) using an internal parameter A and external parameters R|t of the camera.

[Math. 1]

$$sm' = A[R|t]M \quad (1)$$

The expression (1) is represented more particularly by an expression (2).

[Math. 2]

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad (2)$$

In the expression (2), (u, v) represent two-dimensional coordinates on the image, and $f_x$ and $f_y$ represent focal distances. Meanwhile, $C_x$ and $C_y$ represent main points, $r_{11}$ to $r_{13}$, $r_{21}$ to $r_{23}$, $r_{31}$ to $r_{33}$ and $t_1$ to $t_3$ represent parameters, and (X, Y, Z) represent three-dimensional coordinates of the world coordinate system.

Accordingly, the two-dimensional data generation unit 53 determines three-dimensional coordinates corresponding to two-dimensional coordinates of each pixel using the camera parameters in accordance with the expressions (1) and (2) given above.

Further, the two-dimensional data generation unit 53 sets, for each viewpoint, two-dimensional image data of three-dimensional coordinates corresponding to two-dimensional coordinates of the pixels from among three-dimensional data as two-dimensional image data of the pixels to generate two-dimensional image data that associate the two-dimensional coordinates and the image data of the pixels. Further, the two-dimensional data generation unit 53 determines, for each viewpoint, a depth of each pixel on the basis of the three-dimensional coordinates corresponding to the two-dimensional coordinates of the pixel to generate depth image data that associates the two-dimensional coordinates and the depth of the pixel. The depth is, for example, a reciprocal number 1/z of the position z in the depthwise direction of an image pickup object. The two-dimensional data generation unit 53 supplies the two-dimensional image data and the depth image data of each viewpoint to the encoding unit 22.

The occlusion determination unit 54 extracts, on the basis of camera parameters supplied from the camera determination unit 52, occlusion three-dimensional data from three-dimensional data supplied from the image pickup apparatus 11 and supplies the extracted occlusion three-dimensional data as metadata to the encoding unit 22.

Figure 3:
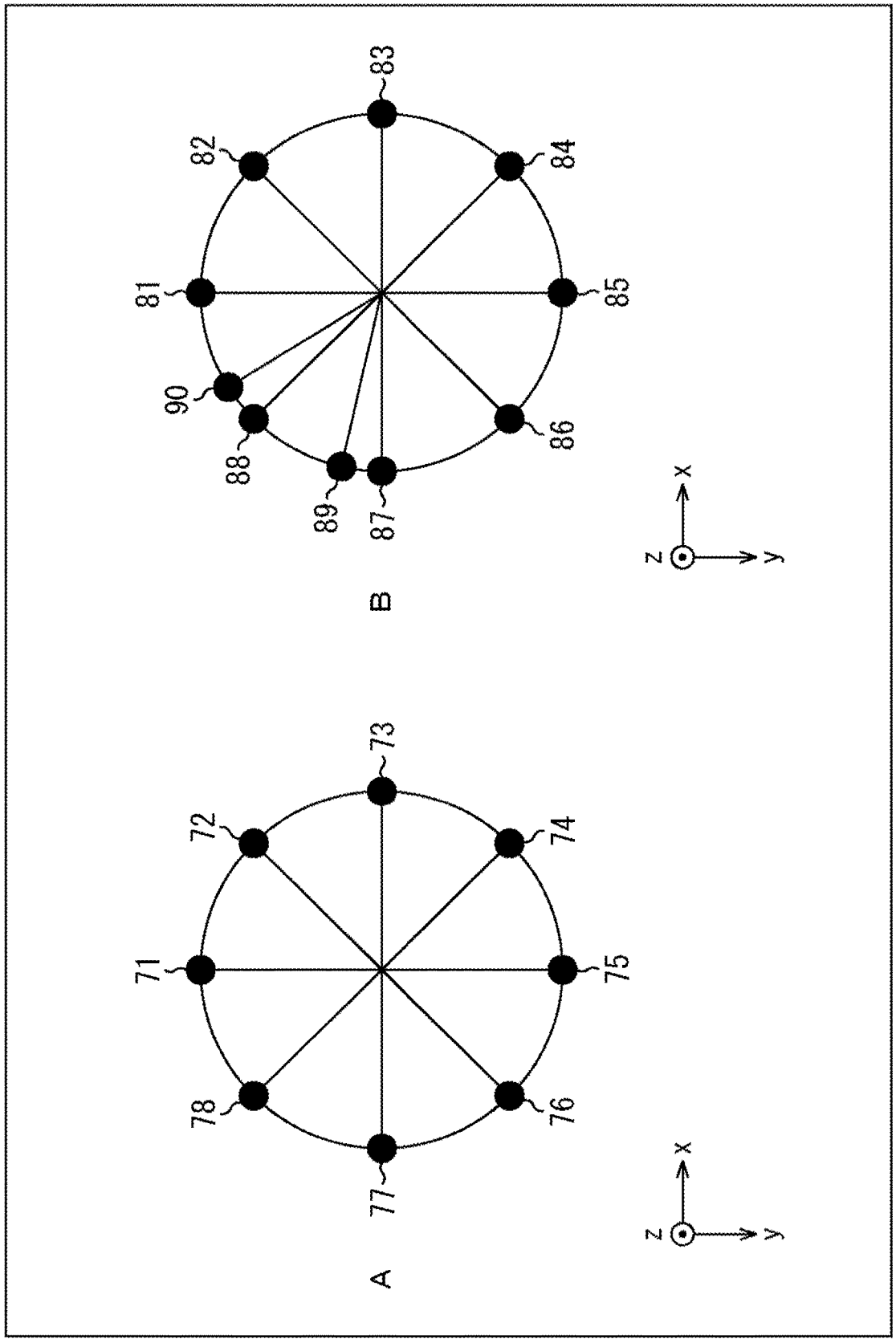
FIG. 3 is a view depicting an example of a plurality of viewpoints corresponding to a predetermined display image generation method.

Example of Plurality of Viewpoints corresponding to Predetermined Display Image Generation Method FIG. 3 is a view depicting examples of a plurality of viewpoints corresponding to a predetermined display image generation method.

In the example of A of FIG. 3, the predetermined display image generation method is a predetermined viewpoint display image generation method by which a display image of a predetermined one viewpoint is two-dimensionally displayed and a free viewpoint display image generation method by which a display image of a free viewpoint that is an arbitrary one viewpoint is two-dimensionally displayed. In this case, as depicted in A of FIG. 3, the plurality of viewpoints corresponding to the predetermined display image generation method are a plurality of (in the example of A of FIG. 3, eight) viewpoints 71 to 78 existing at equal distances on a same circle, and the directions of the viewpoints 71 to 78 are those directed to the center of the circle.

From the foregoing, the decoding apparatus 13 can select and supply two-dimensional image data of one of the viewpoints 71 to 78 as display image data to the display apparatus 14 such that the display apparatus 14 can two-dimensionally display the display image from the viewpoint.

On the other hand, the decoding apparatus 13 can generate two-dimensional image data of a free viewpoint as display image data by generating three-dimensional data on the basis of two-dimensional image data and depth image data of the viewpoints 71 to 78 and performing perspective projection of a three-dimensional object corresponding to the three-dimensional data to the free viewpoint. Accordingly, the decoding apparatus 13 can cause the display apparatus 14 to two-dimensionally display a display image of the free viewpoint by supplying the generated display image data to the display apparatus 14.

In the example of B of FIG. 3, the predetermined display image generation method is a predetermined viewpoint display image generation method, a free viewpoint display image generation method, a three-dimensional display image generation method by which a display image is three-dimensionally displayed on the basis of two-dimensional image data of two viewpoints and an interpolation viewpoint display image generation method by which a display image of a viewpoint between two viewpoints is two-dimensionally displayed.

In this case, as depicted in B of FIG. 3, a plurality of viewpoints corresponding to the predetermined display image generation method are, for example, a plurality of (in the example of B of FIG. 3, ten) viewpoints 81 to 90 existing at equal distances on a same circle. The viewpoint 88 and the viewpoint 89 are lined up in a substantially horizontal direction with the viewpoint 87 and the viewpoint 88. The distances between the viewpoint 87 and the viewpoint 89 and between the viewpoint 88 and the viewpoint 90 in the substantially horizontal direction correspond, for example, to the distance between the left and right human eyes. The directions of the viewpoints 81 to 90 are those directed toward the center of the circle on which the viewpoints 81 to 90 are disposed.

From the foregoing, the decoding apparatus 13 can cause the display apparatus 14 to two-dimensionally display a display image of one of the viewpoints 81 to 90 or a display image of a free viewpoint as with the case of A of FIG. 3. Further, the decoding apparatus 13 can cause the display apparatus 14 to three-dimensionally display paired display images of the viewpoint 87 and the viewpoint 89 or of the viewpoint 88 and the viewpoint 90 by selecting the two-dimensional image data of the viewpoint 87 and the viewpoint 89 in pair or the viewpoint 88 and the viewpoint 90 in pair as display image data and supplying the selected display image data to the display apparatus 14.

Further, the decoding apparatus 13 can interpolate, on the basis of the two-dimensional image data and the depth image data of the viewpoint 87 and the viewpoint 89 in pair or the viewpoint 88 and the viewpoint 90 in pair, two-dimensional image data of a viewpoint between the viewpoints in the pair. Accordingly, the decoding apparatus 13 can cause the display apparatus 14 to two-dimensionally display a display image of a viewpoint between the viewpoint 87 and the viewpoint 89 in pair or between the viewpoint 88 and the viewpoint 90 in pair by supplying the interpolated two-dimensional image data as display image data to the display apparatus 14.

In the case of the examples of A of FIG. 3 and B of FIG. 3, the number of predetermined display image generation methods is a plural number. Accordingly, the decoding apparatus 13 can generate display image data by one of the predetermined display image generation methods on the basis of two-dimensional image data and depth image data of a plurality of viewpoints corresponding to the predetermined display image generation methods. Therefore, it can be said that the encoding apparatus 12 can generate an encoded stream having scalability. It is to be noted that the number of predetermined display image generation methods may be one.

Further, in the case where the number of cameras of the image pickup apparatus 11 is greater than a plurality of viewpoints corresponding to predetermined display image generation methods, the camera determination unit 52 can eliminate the redundancy of viewpoints by determining camera parameters of the plurality of viewpoints corresponding to the predetermined display image generation methods.

For example, in the case where, while the viewpoints of the cameras of the image pickup apparatus 11 are eight viewpoints of the viewpoints 71 to 78, the plurality of viewpoints corresponding to the plurality of display image generation methods are four viewpoints of the viewpoint 71, viewpoint 73, viewpoint 75 and viewpoint 77, the camera determination unit 52 determines camera parameters of the four viewpoints. Accordingly, the redundancy of viewpoints in an encoded stream can be eliminated in comparison with an alternative case in which all two-dimensional image data and all depth image data of the viewpoints 71 to 78 are encoded.

The positions of a plurality of viewpoints corresponding to a plurality of display image generation methods are not limited to those in the example of A of FIG. 3 or B of FIG. 3 but can be set to arbitrary positions. Further, a camera parameter for each viewpoint can be made a camera parameter, for example, corresponding to a comparatively small angle of view. In this case, the resolution of the display image upon zooming can be improved.

Further, although, in the present specification, even in the case where the number of predetermined display image generation methods is a plural number, an encoded stream of a plurality of viewpoints corresponding to all of the predetermined display image generation methods is generated, for each of the predetermined display image generation methods, an encoded stream of a corresponding plurality of viewpoints may be generated. In this case, the decoding apparatus 13 generates display image data using an encoded stream corresponding to a display image generation method of itself.

Furthermore, the camera determination unit 52 may determine a plurality of viewpoints corresponding to predetermined display image generation methods in accordance with a request from the decoding apparatus 13.

Example of Camera Related Information

FIG. 4 is a view depicting an example of camera related information.

In the example of FIG. 4, the plurality of viewpoints corresponding to the predetermined display image generation methods are the viewpoints 81 to 90 of B of FIG. 3.

As depicted in FIG. 4, the camera related information includes external parameters R|T, an internal parameter A, isStereoFlag and a stereo camera ID of each viewpoint, which are associated with a camera ID of the viewpoint.

The camera ID is an ID unique to the viewpoint. In the example of FIG. 4, the camera IDs are represented by sequential numbers beginning with 0 to the viewpoints 81 to 90. Further, in FIG. 4, the external parameters R|T and the internal parameter A whose camera ID is i are represented by Ri|Ti and Ai, respectively.

isStereoFlag is a flag representative of whether or not there exists a different viewpoint lined up in a substantially horizontal direction and is set to 1 in the case where there is a different viewpoint lined up in a substantially horizontal direction. In the example of FIG. 4, since a different viewpoint lines up in a substantially horizontal direction with each of the viewpoints 87 to 90 whose camera IDs are 6 to 9, respectively, isStereoFlag associated with each of the camera IDs of 6 to 9 is 1 as depicted in FIG. 4.

The stereo camera ID is a camera ID of a different viewpoint lined up in a substantially horizontal direction and is pair information that specifies two viewpoints lined up in a substantially horizontal direction. In the example of FIG. 4, since the camera ID of the different viewpoint 89 lined up in a substantially horizontal direction with respect to the viewpoint 87 whose camera ID is 6 is 8, the stereo camera ID associated with the camera ID that is 6 is 8.

Similarly, since the camera ID of the different viewpoint 90 lined up in a substantially horizontal direction with respect to the viewpoint 88 whose camera ID is 7 is 9, the stereo camera ID associated with the camera ID that is 7 is 9. Further, the stereo camera ID associated with the camera ID that is 8 is 6, and the stereo camera ID associated with the camera ID that is 9 is 7.

Description of Processing of Image Pickup Apparatus and Encoding Apparatus

Figure 5:
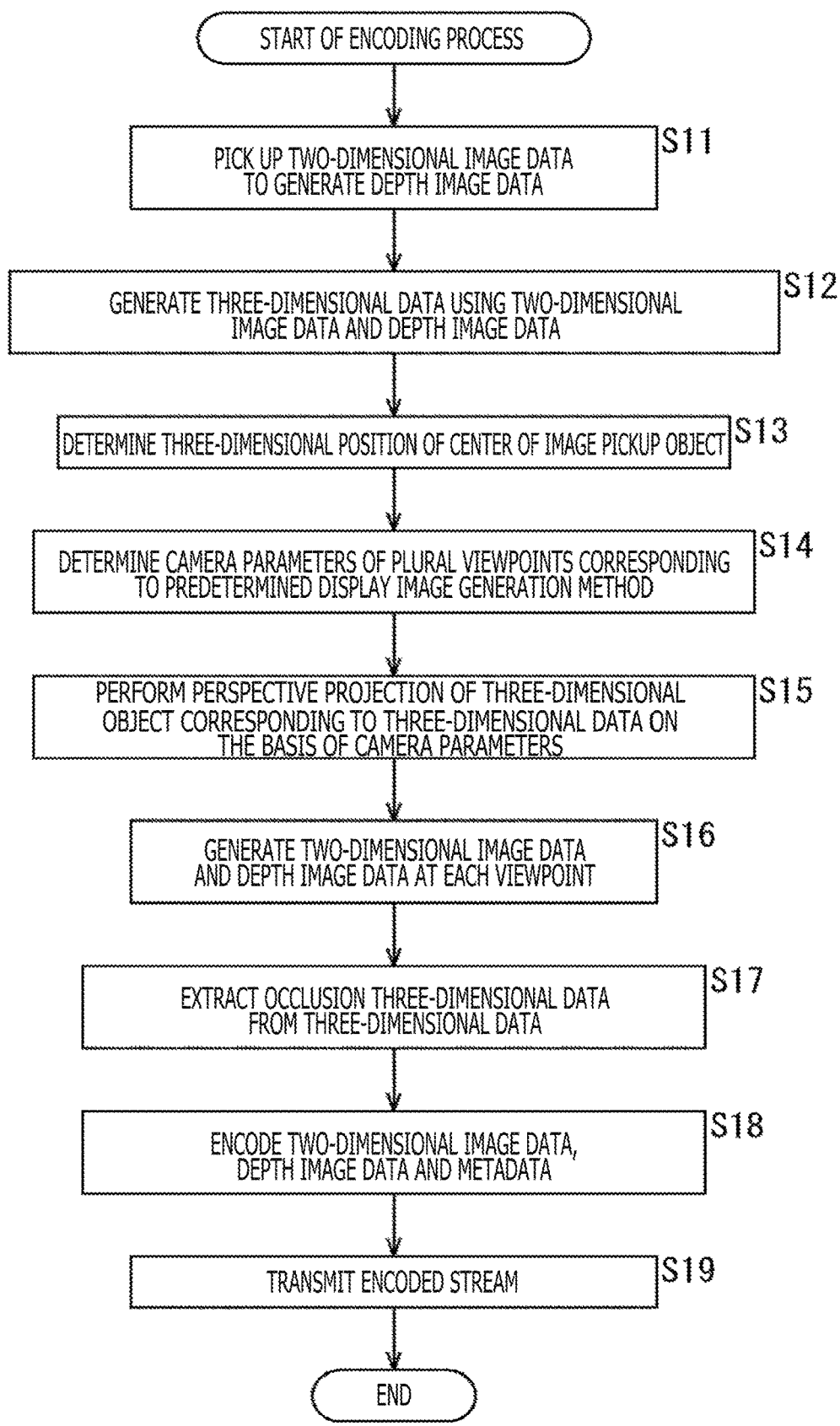
FIG. 5 is a flow chart illustrating an encoding process of an image pickup apparatus and an encoding apparatus of FIG. 1.

FIG. 5 is a flow chart illustrating an encoding process of the image pickup apparatus 11 and the encoding apparatus 12 of FIG. 1.

At step S11 of FIG. 5, the image pickup apparatus 11 picks up two-dimensional image data of a moving image by the multi-camera and generates depth image data by the distance measuring instruments. At step S12, the image pickup apparatus 11 generates three-dimensional data using the two-dimensional image data and the depth image data and supplies the three-dimensional data to the encoding apparatus 12.

At step S13, the image pickup object position determination unit 51 (FIG. 2) of the encoding apparatus 12 determines a three-dimensional position of the center of an image pickup object of a three-dimensional object corresponding to the three-dimensional data supplied from the image pickup apparatus 11 and supplies image pickup object position information representative of the three-dimensional position to the camera determination unit 52.

At step S14, the camera determination unit 52 determines, on the basis of the image pickup object position information supplied from the image pickup object position determination unit 51, camera parameters of a plurality of viewpoints corresponding to the predetermined display image generation method, and supplies the camera parameters to the two-dimensional data generation unit 53 and the occlusion determination unit 54. Further, the camera determination unit 52 generates camera related information of FIG. 4 from the camera parameters and so forth and supplies the camera related information as metadata to the encoding unit 22 of FIG. 1.

At step S15, the two-dimensional data generation unit 53 performs, on the basis of the camera parameters of the plurality of viewpoints supplied from the camera determination unit 52, perspective projection of the three-dimensional object corresponding to the three-dimensional data for each viewpoint to determine three-dimensional coordinates corresponding to two-dimensional coordinates of each pixel.

At step S16, the two-dimensional data generation unit 53 converts, for each viewpoint, the two-dimensional image data of the three-dimensional coordinates of each pixel from within the three-dimensional data into two-dimensional image data of the pixel to generate two-dimensional image data. Further, the two-dimensional data generation unit 53 determines, for each viewpoint, the depth of each pixel on the basis of the three-dimensional coordinates of the pixel to generate depth image data. The two-dimensional data generation unit 53 supplies the two-dimensional image data and the depth image data of the viewpoints to the encoding unit 22.

At step S17, the occlusion determination unit 54 extracts, on the basis of the camera parameters supplied from the camera determination unit 52, occlusion three-dimensional data from the three-dimensional data supplied from the image pickup apparatus 11 and supplies the occlusion three-dimensional data as metadata to the encoding unit 22.

At step S18, the encoding unit 22 encodes the two-dimensional image data, depth image data and metadata supplied from the conversion unit 21 and supplies an encoded stream obtained as a result of the encoding to the transmission unit 23.

At step S19, the transmission unit 23 transmits the encoded stream supplied from the encoding unit 22 to the decoding apparatus 13. Then, the processing is ended.

First Configuration Example of Conversion Unit 33

Figure 6:
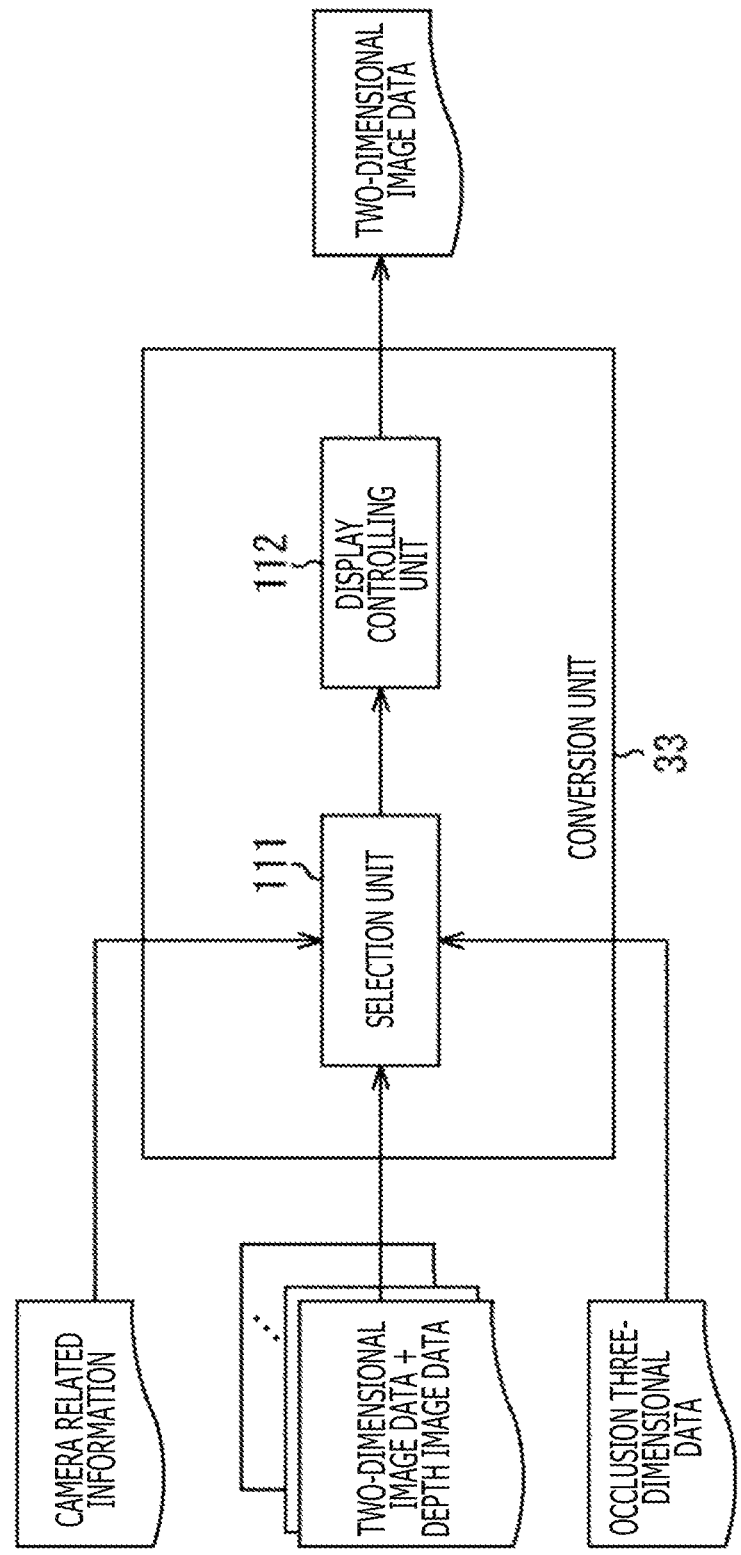
FIG. 6 is a block diagram depicting a first configuration example of the conversion unit of FIG. 1.

FIG. 6 is a block diagram depicting a first configuration example of the conversion unit 33 of FIG. 1.

The conversion unit 33 of FIG. 6 is a conversion unit 33 in the case where the display image generation method of the decoding apparatus 13 of FIG. 1 is the predetermined viewpoint display image generation method and includes a selection unit 111 and a display controlling unit 112.

The selection unit 111 of the conversion unit 33 recognizes the camera ID of a desired one viewpoint on the basis of camera related information supplied from the decoding unit 32 of FIG. 1. The selection unit 111 selects, from among the two-dimensional image data, depth image data and occlusion three-dimensional data supplied from the decoding unit 32, the two-dimensional image data of one viewpoint corresponding to the recognized camera ID. The selection unit 111 supplies the two-dimensional image data of the selected one viewpoint to the display controlling unit 112.

The display controlling unit 112 supplies the two-dimensional image data of the one viewpoint supplied from the selection unit 111 as display image data to the display apparatus 14 such that the display image is two-dimensionally displayed on the display apparatus 14.

It is to be noted that, though not depicted, the configuration of the conversion unit 33 in the case where the display image generation method of the decoding apparatus 13 is the three-dimensional display image generation method is same as the configuration of FIG. 6 except that the selection unit 111 selects two-dimensional image data of two viewpoints lined up in a substantially horizontal direction on the basis of the camera related information.

In particular, in this case, the selection unit 111 selects two-dimensional image data of a viewpoint of a camera ID whose isStereoFlag is 1 in the camera related information and another viewpoint of a stereo camera ID corresponding to the camera ID. As a result, to the display apparatus 14, two-dimensional image data of the two selected viewpoints are supplied as display image data. The display apparatus 14 displays a display image for the left eye on the basis of the two-dimensional image data of one viewpoint from between the display image data and displays a display image for the right eye on the basis of the two-dimensional image data of the other one viewpoint thereby to three-dimensionally display a display image.

Second Configuration Example of Conversion Unit 33

Figure 7:
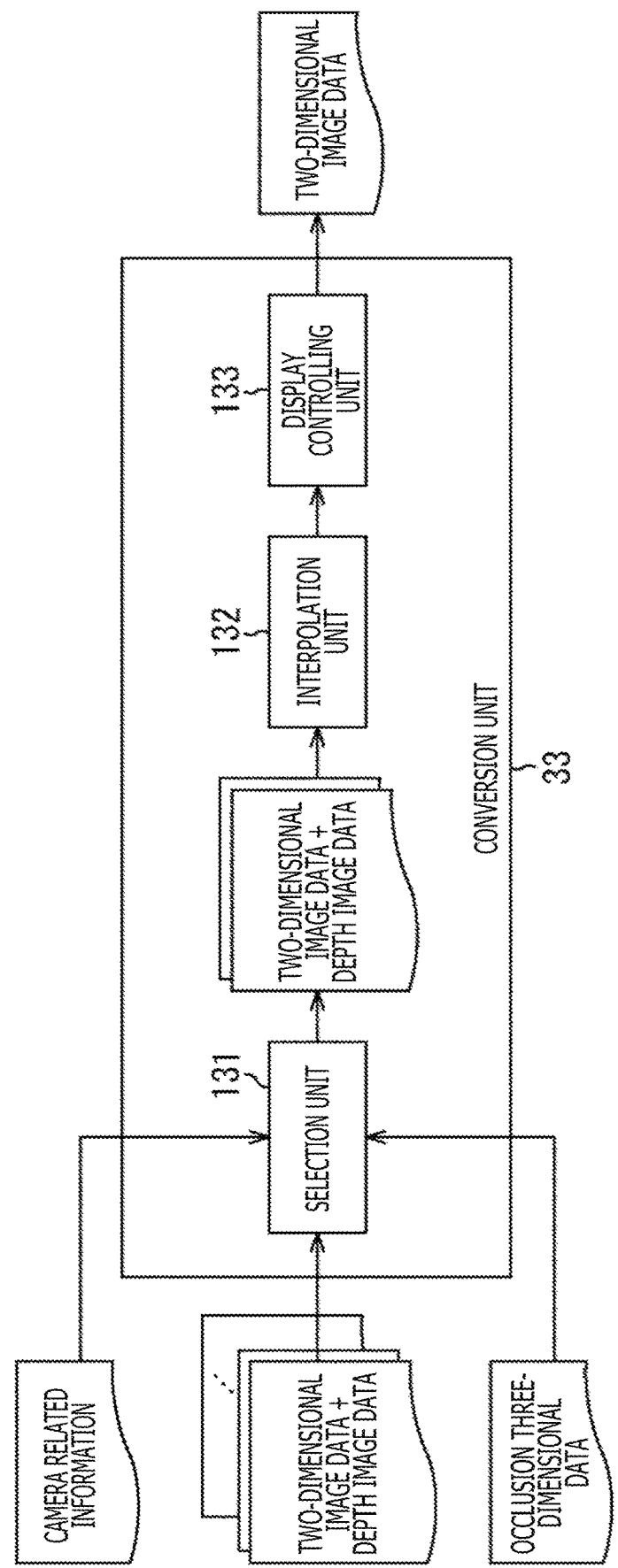
FIG. 7 is a block diagram depicting a second configuration example of the conversion unit of FIG. 1.

FIG. 7 is a block diagram depicting a second configuration example of the conversion unit 33 of FIG. 1.

The conversion unit 33 of FIG. 7 is a conversion unit 33 in the case where the display image generation method of the decoding apparatus 13 is the interpolation viewpoint display image generation method and includes a selection unit 131, an interpolation unit 132 and a display controlling unit 133.

The selection unit 131 of the conversion unit 33 recognizes, on the basis of camera related information supplied from the decoding unit 32 of FIG. 1, one of camera IDs that correspond to isStereoFlag that is 1 and the stereo camera ID corresponding to the one camera ID. The selection unit 131 selects, from among two-dimensional image data, depth image data and occlusion three-dimensional image data supplied from the decoding unit 32, two-dimensional image data and depth image data of the two viewpoints corresponding to the two recognized camera IDs and supplies the selected data to the interpolation unit 132.

The interpolation unit 132 interpolates, on the basis of the two-dimensional image data and the depth image data of the two viewpoints supplied from the selection unit 131, two-dimensional image data of a viewpoint at a position between the two viewpoints. Such interpolation technology is called Depth Image Based Rendering and is described, for example, in the pamphlet of International Publication No. WO2014083752. The interpolation unit 132 supplies the two-dimensional image data of the interpolated one viewpoint to the display controlling unit 133.

The display controlling unit 133 supplies the two-dimensional image data of the one viewpoint supplied from the interpolation unit 132 as display image data to the display apparatus 14 such that a display image is two-dimensionally displayed on the display apparatus 14.

Third Configuration Example of Conversion Unit 33

Figure 8:
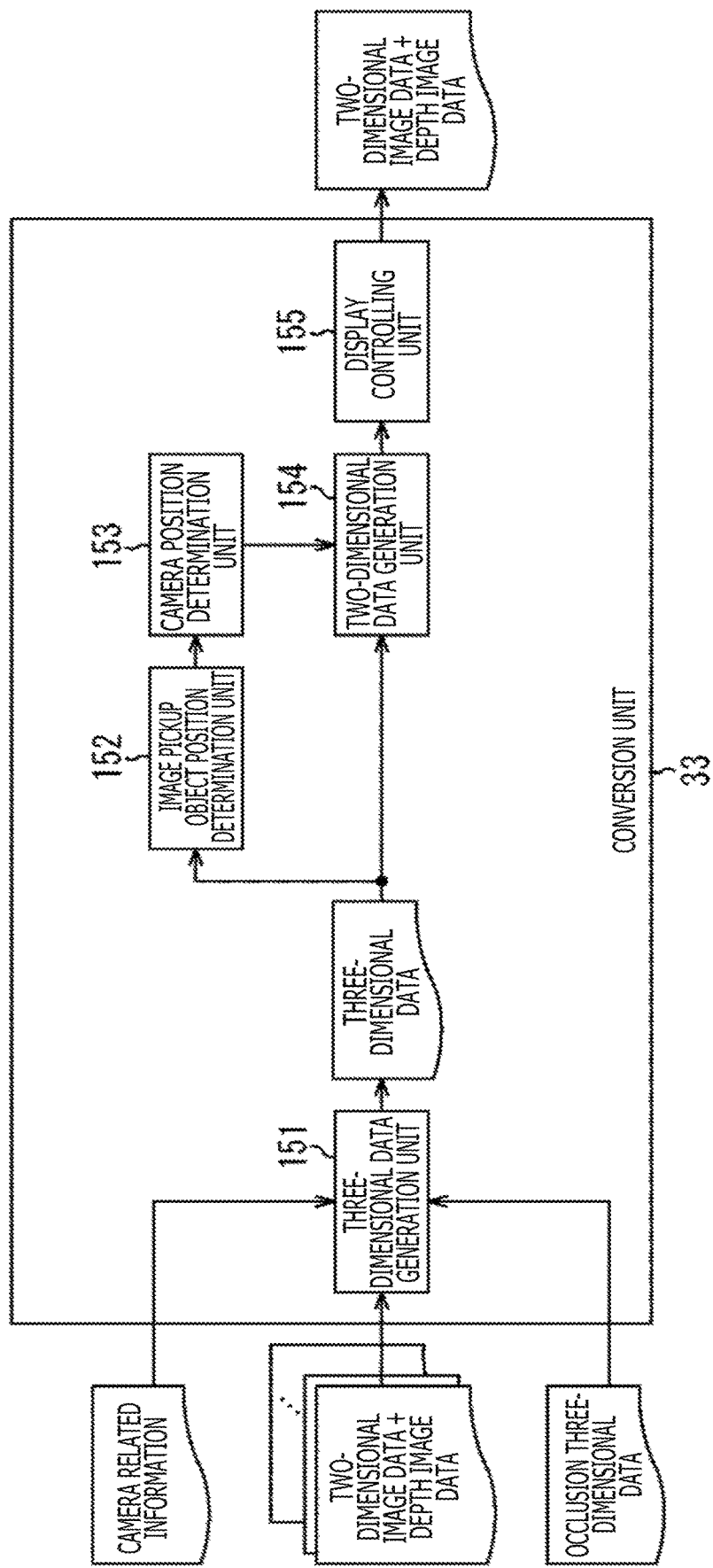
FIG. 8 is a block diagram depicting a third configuration example of the conversion unit of FIG. 1.

FIG. 8 is a block diagram depicting a third configuration example of the conversion unit 33 of FIG. 1.

The conversion unit 33 of FIG. 8 is a conversion unit 33 in the case where the display image generation method of the decoding apparatus 13 is the free viewpoint display image generation method. The conversion unit 33 of FIG. 8 includes a three-dimensional data generation unit 151, an image pickup object position determination unit 152, a camera position determination unit 153, a two-dimensional data generation unit 154 and a display controlling unit 155.

The three-dimensional data generation unit 151 of the conversion unit 33 uses two-dimensional image data, depth image data and camera parameter included in the camera related information supplied from the decoding unit 32 to generate three-dimensional data of an image pickup object similarly to the image pickup apparatus 11. The three-dimensional data generation unit 151 modifies the generated three-dimensional data using occlusion three-dimensional data supplied from the decoding unit 32. Consequently, it is possible to generate three-dimensional data of an overall region of an image pickup object including an occlusion region which cannot be generated only from the two-dimensional image data and the depth image data. The three-dimensional data generation unit 151 supplies the modified three-dimensional data to the image pickup object position determination unit 152 and the two-dimensional data generation unit 154.

The image pickup object position determination unit 152 determines a three-dimensional position of the center of the image pickup object from within the three-dimensional object corresponding to the three-dimensional data supplied from the three-dimensional data generation unit 151 and supplies image pickup object position information representative of the three-dimensional position to the camera position determination unit 153.

The camera position determination unit 153 determines a camera parameter of a free viewpoint on the basis of the image pickup object position information supplied from the image pickup object position determination unit 152 and supplies the camera parameter to the two-dimensional data generation unit 154.

The two-dimensional data generation unit 154 generates, on the basis of the three-dimensional data supplied from the three-dimensional data generation unit 151 and the camera parameter of the free viewpoint supplied from the camera position determination unit 153, two-dimensional image data as display image data in accordance with the free viewpoint display image generation method.

In particular, the two-dimensional data generation unit 154 performs, on the basis of the camera parameter of the free viewpoint, perspective projection of the three-dimensional object corresponding to the three-dimensional data to determine three-dimensional coordinates corresponding to the two-dimensional coordinates of each pixel similarly to the two-dimensional data generation unit 53 of FIG. 2. Then, the two-dimensional data generation unit 154 generates two-dimensional image data of the three-dimensional coordinates corresponding to the two-dimensional coordinates of each pixel from within the three-dimensional data as display image data of the pixel.

Further, the two-dimensional data generation unit 154 determines the depth of each pixel on the basis of the three-dimensional coordinates corresponding to the two-dimensional coordinates of the pixel to generate depth image data. The two-dimensional data generation unit 154 supplies the display image data and the depth image data to the display controlling unit 155.

The display controlling unit 155 supplies the display image data and the depth image data supplied from the two-dimensional data generation unit 154 to the display apparatus 14. The display apparatus 14 two-dimensionally displays a display image, for example, using the display image data and the depth image data as Point Cloud.

As described above, the conversion unit 33 of FIG. 8 generates three-dimensional data from two-dimensional image data and depth image data of a plurality of viewpoints and generates two-dimensional image data and depth image data from the generated three-dimensional data on the basis of the camera parameter of the free viewpoint determined newly. Accordingly, the conversion unit 33 can change the zoom ratio or change the viewpoints of the two-dimensional image data and the depth image data of a plurality of viewpoints transmitted thereto from the encoding apparatus 12.

Description of Processing of Decoding Apparatus

Figure 9:
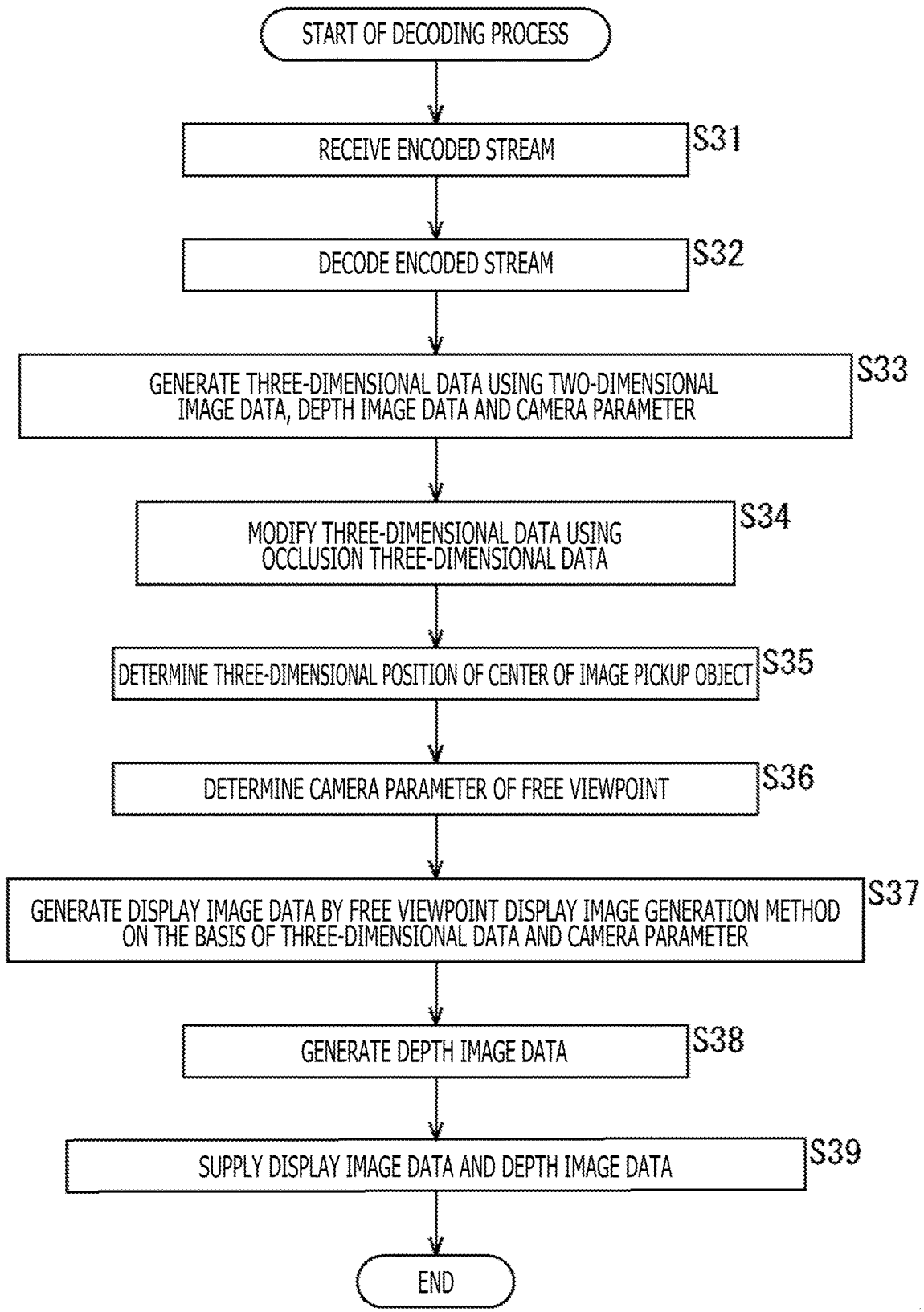
FIG. 9 is a flow chart illustrating a decoding process of a decoding apparatus of FIG. 1.

FIG. 9 is a flow chart illustrating a decoding process of the decoding apparatus 13 in the case where the configuration of the conversion unit 33 of FIG. 1 is the configuration of FIG. 8. This decoding process is started, for example, when an encoded stream is transmitted from the encoding apparatus 12 to the decoding apparatus 13.

At step S31 of FIG. 9, the reception unit 31 of the decoding apparatus 13 receives an encoded stream transmitted from the transmission unit 23 and supplies the encoded stream to the decoding unit 32.

At step S32, the decoding unit 32 decodes the encoded stream supplied from the reception unit 31. The decoding unit 32 supplies two-dimensional image data and depth image data of a plurality of viewpoints as well as metadata obtained as a result of the decoding to the conversion unit 33.

At step S33, the three-dimensional data generation unit 151 (FIG. 8) of the conversion unit 33 uses the two-dimensional image data and depth image data and camera parameter included in the metadata supplied from the decoding unit 32 to generate three-dimensional data of an image pickup object similarly to the image pickup apparatus 11.

At step S34, the three-dimensional data generation unit 151 modifies the three-dimensional data generated at step S33 using the occlusion three-dimensional data included in the metadata supplied from the decoding unit 32. The three-dimensional data generation unit 151 supplies the modified three-dimensional data to the image pickup object position determination unit 152.

At step S35, the image pickup object position determination unit 152 determines a three-dimensional position of the center of an image pickup object of a three-dimensional object corresponding to the three-dimensional data supplied from the three-dimensional data generation unit 151 and supplies image pickup object position information representative of the three-dimensional position to the camera position determination unit 153.

At step S36, the camera position determination unit 153 determines a camera parameter of a free viewpoint on the basis of the image pickup object position information supplied from the image pickup object position determination unit 152 and supplies the camera parameter to the two-dimensional data generation unit 154.

At step S37, the two-dimensional data generation unit 154 generates, on the basis of the three-dimensional data and the camera parameter of the free viewpoint, two-dimensional image data as display image data in accordance with the free viewpoint display image generation method.

At step S38, the two-dimensional data generation unit 154 determines the depth of each pixel on the basis of the three-dimensional coordinates corresponding to the two-dimensional coordinates of the pixel to generate depth image data. The two-dimensional data generation unit 154 supplies the display image data and the depth image data to the display controlling unit 155.

At step S39, the display controlling unit 155 supplies the display image data and the depth image data supplied from the two-dimensional data generation unit 154 to the display apparatus 14.

In this manner, in the transmission system 10, the image pickup apparatus 11 generates three-dimensional data from picked up two-dimensional image data of a plurality of viewpoints, and the encoding apparatus 12 generates and encodes two-dimensional image data and depth image data of a plurality of viewpoints corresponding to the predetermined display image generation method from the three-dimensional data. Accordingly, the encoding apparatus 12 can encode two-dimensional image data and depth image data of a viewpoint corresponding to a predetermined display image generation method such that the two-dimensional image data and the depth image data can be acquired by the decoding apparatus 13 without depending upon the viewpoints upon imaging.

Further, the decoding apparatus 13 receives and decodes an encoded stream of two-dimensional image data and depth image data of a plurality of viewpoints corresponding to the predetermined display image generation method transmitted thereto from the encoding apparatus 12. Accordingly, the decoding apparatus 13 can acquire two-dimensional image data and depth image data of a viewpoint corresponding to the predetermined display image generation method without depending upon the viewpoints upon imaging.

Further, where the number of predetermined display image generation methods is a plural number, an encoded stream generated by the encoding apparatus 12 can be reproduced by decoding apparatus of the plurality of display image generation methods. For example, both a decoding apparatus of a low function whose display image generation method is the predetermined viewpoint display image generation method and another decoding apparatus of a high function whose display image generation method is the free viewpoint image generation method can perform reproduction of an encoded stream according to the capacities of the own apparatus.

Second Embodiment

Example of Configuration of Second Embodiment of Transmission System

Figure 10:
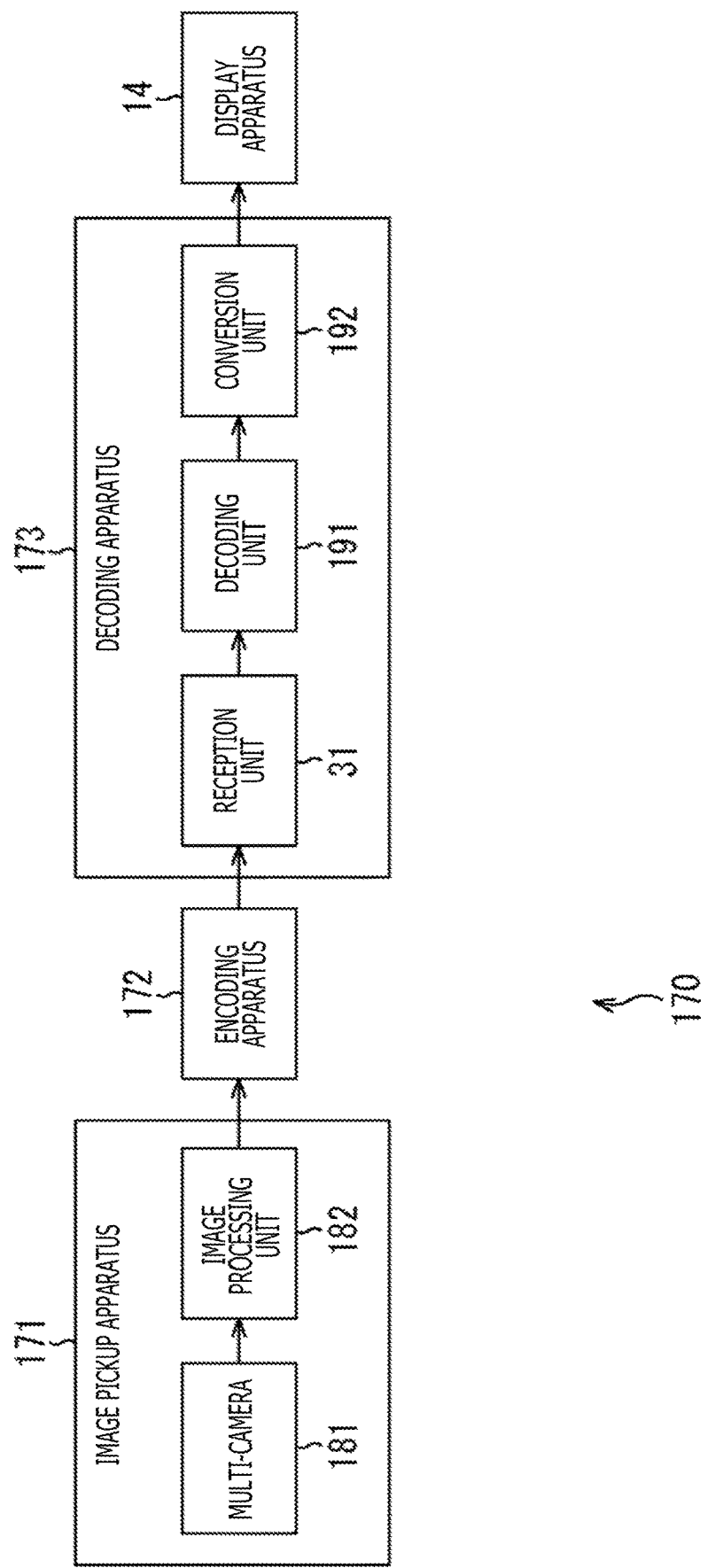
FIG. 10 is a block diagram depicting an example of a configuration of a second embodiment of the transmission system to which the present disclosure is applied.

FIG. 10 is a block diagram depicting an example of a configuration of a second embodiment of the transmission system to which the present disclosure is applied.

Of the components depicted in FIG. 10, components same as those in FIG. 1 are denoted by the same reference signs. Overlapping description is suitably omitted.

The configuration of a transmission system 170 of FIG. 10 is different from the configuration of the transmission system 10 of FIG. 1 in that the image pickup apparatus 11, encoding apparatus 12 and decoding apparatus 13 are replaced by an image pickup apparatus 171, an encoding apparatus 172 and a decoding apparatus 173. In the transmission system 170, two-dimensional image data and depth image data acquired by the image pickup apparatus 171 are encoded as they are and transmitted.

In particular, the image pickup apparatus 171 of the transmission system 170 includes a multi-camera 181 and an image processing unit 182. A plurality of cameras that configure the multi-camera 181 of the image pickup apparatus 171 individually pick up two-dimensional image data. The multi-camera 181 supplies the two-dimensional image data picked up by the cameras to the image processing unit 182.

The image processing unit 182 sets one of the plurality of cameras configuring the multi-camera 181 as a base camera and sets the other cameras as reference cameras. The image processing unit 182 detects, on the basis of the two-dimensional image data picked up by the base camera of the multi-camera 181 and two-dimensional image data picked up by the reference cameras, a synchronism deviation of the two-dimensional image data of each reference camera with respect to the base camera. Further, the image processing unit 182 detects the synchronism deviation of the base camera as 0. The image processing unit 182 supplies synchronism deviation information including information representative of the detected synchronism deviations of the viewpoints of the cameras and the camera related information to the encoding apparatus 172.

Further, the image processing unit 182 performs stereo matching for the two-dimensional image data picked up by the cameras to generate depth image data of the cameras and supplies the depth image data to the encoding apparatus 172.

The encoding apparatus 172 determines the synchronism deviation information and the camera related information supplied from the image pickup apparatus 171 as metadata. The encoding apparatus 172 encodes the two-dimensional image data and the depth image data of the cameras supplied from the image pickup apparatus 171 as well as the metadata to generate an encoded stream similarly to the encoding unit 22 of FIG. 1. The encoding apparatus 172 (transmission unit) transmits the generated encoded stream to the decoding apparatus 173.

The configuration of the decoding apparatus 173 is different from that of the decoding apparatus 13 of FIG. 1 in that the decoding unit 32 and the conversion unit 33 are replaced by a decoding unit 191 and a conversion unit 192, respectively.

The decoding unit 191 of the decoding apparatus 173 decodes an encoded stream supplied from the reception unit 31 in accordance with a method corresponding to the encoding method by the encoding apparatus 172. The decoding unit 191 synchronizes, on the basis of the synchronism deviation information from within the metadata obtained as a result of the decoding, the two-dimensional image data and the depth image data of the base camera and the reference cameras with each other and supplies the synchronized data to the conversion unit 192. Further, the decoding unit 191 supplies the camera related information from within the metadata to the conversion unit 192.

The configuration of the conversion unit 192 is same as the configuration of the conversion unit 33 of FIG. 1 except that three-dimensional data is not corrected using occlusion three-dimensional data, and therefore, description of the same is omitted.

Example of Configuration of Image Pickup Apparatus

Figure 11:
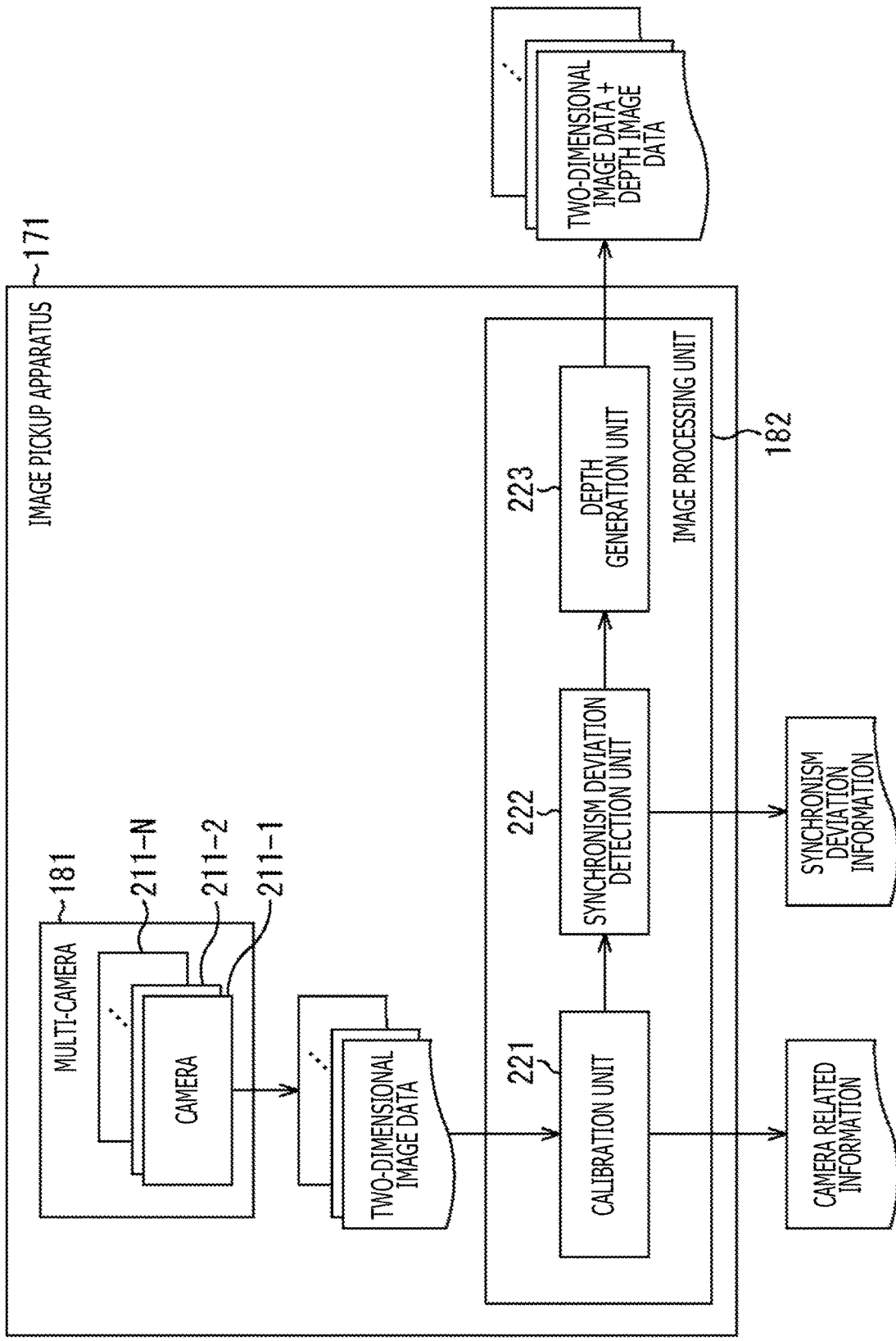
FIG. 11 is a block diagram depicting an example of a configuration of an image pickup apparatus of FIG. 10.

FIG. 11 is a block diagram depicting an example of a configuration of the image pickup apparatus 171 of FIG. 10.

The multi-camera 181 of the image pickup apparatus 171 of FIG. 11 includes N (N is a plural number) cameras 211-1 to 211-N.

The cameras 211-1 to 211-N are disposed such that, for example, the viewpoints of the cameras 211-1 to 211-N become viewpoints corresponding to the predetermined display image generation method. The cameras 211-1 to 211-N individually perform image pickup and supply two-dimensional image data of a moving image (picked up image data) obtained as a result of the image pickup to the image processing unit 182. In the following description, in the case where there is no necessity to particularly distinguish the cameras 211-1 to 211-N from each other, they are collectively referred to as cameras 211.

The image processing unit 182 includes a calibration unit 221, a synchronism deviation detection unit 222 and a depth generation unit 223.

The calibration unit 221 of the image processing unit 182 performs, for each camera 211, calibration for two-dimensional image data supplied from the multi-camera 181 using a camera parameter. The calibration unit 221 supplies the two-dimensional image data of each camera 211 after the calibration to the synchronism deviation detection unit 222.

Further, the calibration unit 221 supplies camera related information to the encoding apparatus 172 of FIG. 10.

The synchronism deviation detection unit 222 determines one of the cameras 211-1 to 211-N as a base camera and determines the remaining ones of the cameras 211-1 to 211-N as reference cameras. The synchronism deviation detection unit 222 detects, on the basis of two-dimensional image data of the base camera and two-dimensional image data of the reference cameras supplied from the calibration unit 221, a synchronism deviation of the two-dimensional image data of each reference camera with respect to the base camera in the msec order.

In particular, the synchronism deviation detection unit 222 detects flashlight from the two-dimensional image data of the base camera and the two-dimensional image data of the reference cameras. The synchronism deviation detection unit 222 detects the difference in image pickup time between the two-dimensional image data of the base camera and the two-dimensional image data of each reference camera, from which flashlight is detected, as a synchronism deviation of the two-dimensional image data of the reference camera.

The synchronism deviation of the two-dimensional image data of each reference camera may be performed using two-dimensional image data by a method different from the method by which flashlight is detected. Further, in the case where the camera 211 acquires audio data together with two-dimensional image data, a synchronism deviation of the two-dimensional image data of the reference camera may be detected by detecting a synchronism deviation of audio data of the reference camera with respect to the base camera.

The synchronism deviation detection unit 222 detects the synchronism deviation of the two-dimensional image data of the base camera as 0. The synchronism deviation detection unit 222 supplies synchronism deviation information of the detected synchronism deviation to the encoding apparatus 172. Further, the synchronism deviation detection unit 222 supplies two-dimensional image data of each camera 211 supplied from the calibration unit 221 to the depth generation unit 223.

The depth generation unit 223 performs stereo matching for the two-dimensional image data of each camera 211 supplied from the synchronism deviation detection unit 222 to generate depth image data of the camera 211. The depth generation unit 223 supplies the two-dimensional image data and the depth image data of the cameras 211 to the encoding apparatus 172.

Example of Synchronism Deviation Information

FIG. 12 is a view depicting an example of the synchronism deviation information.

In the example of FIG. 12, the viewpoints of the cameras 211 are the viewpoints 81 to 90 of B of FIG. 3.

As depicted in FIG. 12, the synchronism deviation information is configured by associating num_units_in_tick, time_scale, Delta_num_units_in_tick and Delta_time_scale of each camera 211 with the camera ID of the viewpoint of the camera 211.

num_units_in_tick is information indicative of the number of time_units the frame distance corresponds to, time_unit being defined by time_scale. time_scale is the number of time_units for one second. Accordingly, a frame rate can be represented by num_units_in_tick and time_scale.

In the example of FIG. 12, the frame rate of the cameras 211 whose camera ID is 0, 1, 4 and 5 is 60 Hz (59.94 Hz). Accordingly, for example, of the cameras 211 whose camera ID is 0, 1, 4 and 5, num_units_in_tick is 1001 and time_scale is 60000. Meanwhile, the frame rate of the cameras 211 whose camera ID is 2, 3 and 6 to 9 is 30 Hz (29.97 Hz). Accordingly, for example, of the cameras 211 whose camera ID is 2, 3 and 6 to 9, num_units_in_tick is 2002 and time_scale is 60000.

Delta_num_units_in_tick is information indicative of the number of time_units the synchronism deviation corresponds to, time_unit being defined by Delta_time_scale. Delta_time_scale is the number of time_units for one second. Accordingly, a synchronism deviation can be represented by Delta_num_units_in_tick and Delta_time_scale.

In the example of FIG. 12, the camera 211 whose camera ID is 0 is the base camera. Accordingly, Delta_num_units_in_tick corresponding to the camera ID of 0 is 0. Further, in the example of FIG. 12, the synchronism deviation of the cameras 211 whose camera ID is 3, 4, 7 and 9 is 0. Accordingly, also Delta_num_units_in_tick corresponding to the camera IDs of 3, 4, 7 and 9 is 0.

Furthermore, in the example of FIG. 12, the synchronism deviation of the cameras 211 whose camera ID is 1 and 5 is 1/30 (1/29.97) second. Accordingly, for example, Delta_num_units_in_tick corresponding to the camera IDs of 1 and 5 is 2002 and Delta_time_scale is 60000. Further, the synchronism deviation of the cameras 211 whose camera ID is 2, 6 and 8 is 1/15 (1/14.985) second. Accordingly, for example, Delta_num_units_in_tick corresponding to the camera IDs of 2, 6 and 8 is 4004, and Delta_time_scale is 60000.

It is to be noted that the synchronism deviation information may include a synchronism deviation common flag indicative of whether or not the synchronism deviations of all of the cameras 211 with which a synchronism deviation occurs are equal.

In this case, when the synchronism deviations of all of the cameras 211 with which a synchronism deviation occurs are equal, the synchronism deviation information includes the synchronism deviation common flag indicating that the synchronism deviations of all of the cameras 211 with which a synchronism deviation occurs are equal, a synchronism deviation flag (synchronism deviation presence/absence information) indicative of presence/absence of a synchronism deviation in each camera 211 and information representative of a synchronism deviation common to all of the cameras 211 with which a synchronism deviation occurs.

On the other hand, when the synchronism deviations of all of the cameras 211 with which a synchronism deviation occurs are not equal, the synchronism deviation information includes the synchronism deviation information of FIG. 12 and a synchronism deviation common flag indicating that the synchronism deviations of all of the cameras 211 in which a synchronism deviation occurs are not equal.

Example of Configuration of Encoding Apparatus

Figure 13:
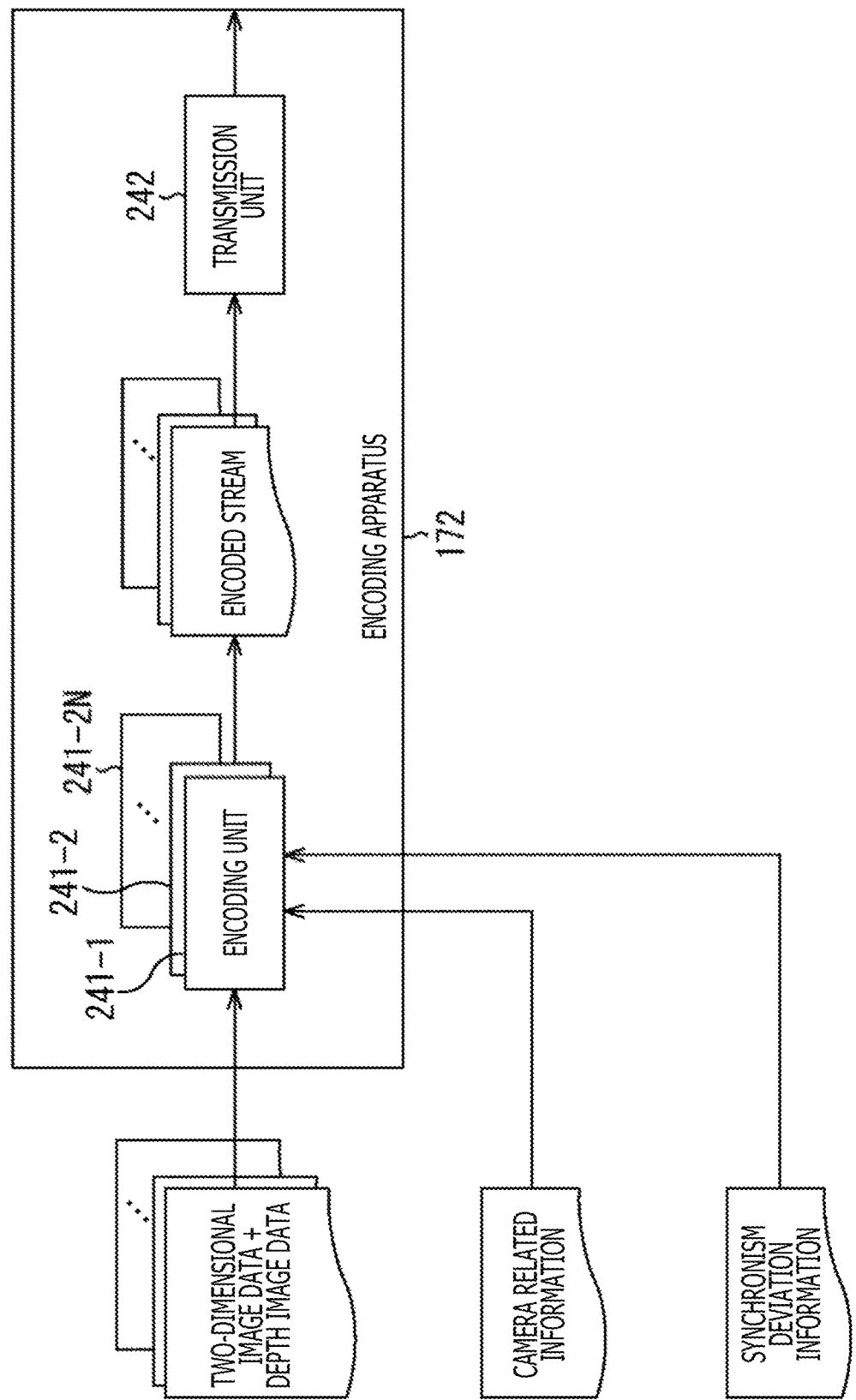
FIG. 13 is a block diagram depicting an example of a configuration of an encoding apparatus of FIG. 10.

FIG. 13 is a block diagram depicting an example of a configuration of the encoding apparatus 172 of FIG. 10.

The encoding apparatus 172 of FIG. 13 is an encoding apparatus 172 in the case where encoding is performed by the AVC method or the HEVC method and includes 2N encoding units 241-1 to 241-2N and a transmission unit 242.

The encoding units 241-1 to 241-2N of the encoding apparatus 172 individually encode two-dimensional image data or depth image data of the cameras 211 supplied from the image pickup apparatus 171 in accordance with the AVC method or the HEVC method to individually generate an encoded stream.

The encoding units 241-1 to 241-2N set camera related information and synchronism deviation information supplied from the image pickup apparatus 171 as well as information that associates the camera related information and the synchronism deviation information with the encoded streams as metadata. The encoding units 241-1 to 241-2N place the metadata into User unregistered SEI of the generated encoded streams.

It is to be noted that the encoding units 241-1 to 241-N can place only metadata corresponding to an encoded stream into User unregistered SEI of the encoded stream. In this case, the information that associates the camera related information and the synchronism deviation information with the encoded stream is not included in the metadata. The encoding units 241-1 to 241-2N supply the encoded streams in which the metadata are placed to the transmission unit 242.

The transmission unit 242 transmits the encoded streams supplied from the encoding units 241-1 to 241-2N to the decoding apparatus 173 of FIG. 10.

Description of Processing of Image Pickup Apparatus and Encoding Apparatus

Figure 14:
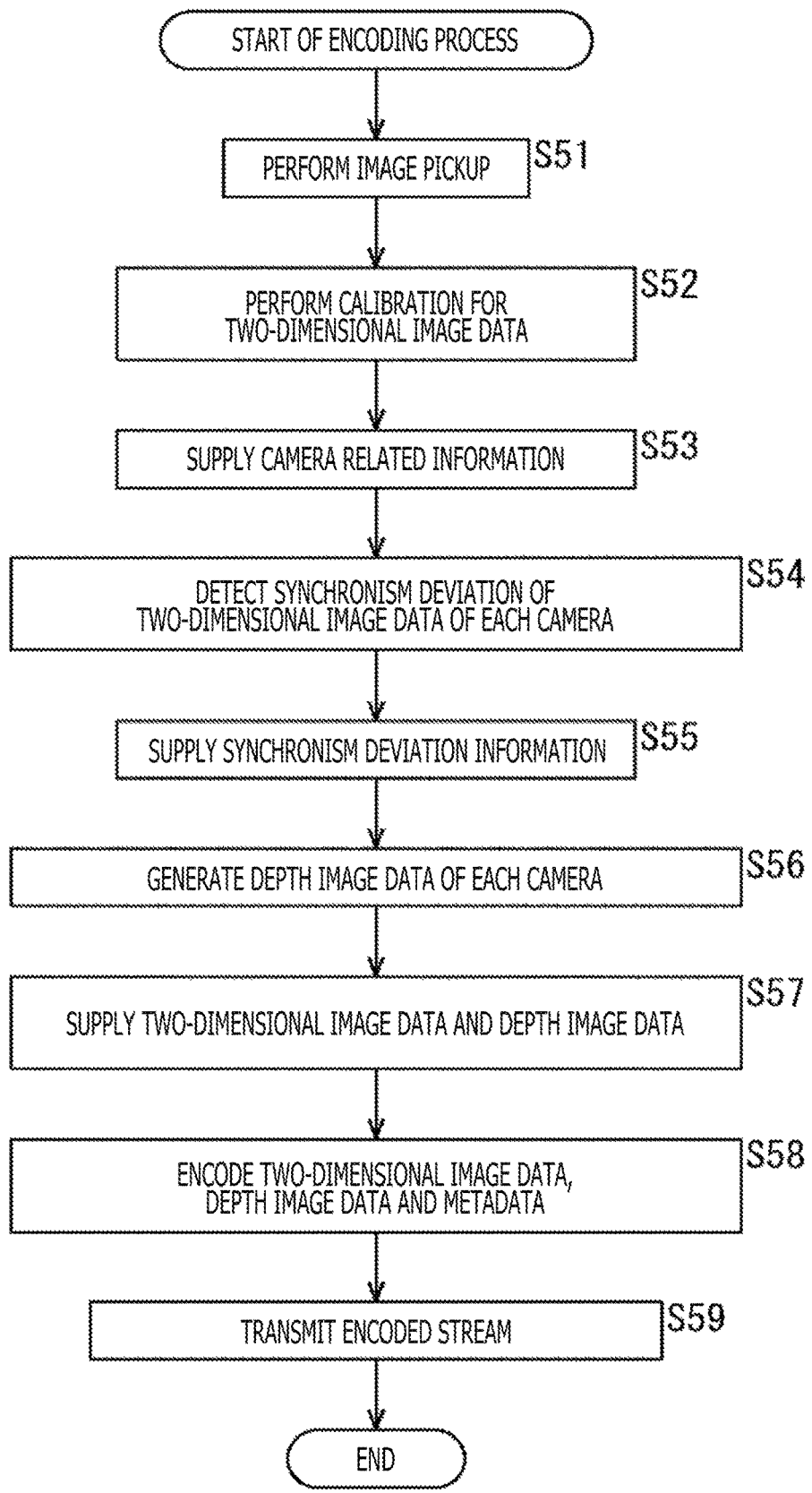
FIG. 14 is a flow chart illustrating an encoding process of the image pickup apparatus and the encoding apparatus of FIG. 10.

FIG. 14 is a flow chart illustrating an encoding process of the image pickup apparatus 171 and the encoding apparatus 172 of FIG. 10.

At step S51 of FIG. 14, the cameras 211 (FIG. 11) of the image pickup apparatus 171 perform image pickup and supply two-dimensional image data of a moving image obtained as a result of the image pickup to the image processing unit 182.

At step S52, the calibration unit 221 of the image processing unit 182 performs, for each camera 211, calibration for the two-dimensional image data supplied from the multi-camera 181 using a camera parameter. The calibration unit 221 supplies the two-dimensional image data of each camera 211 after the calibration to the synchronism deviation detection unit 222.

At step S53, the calibration unit 221 supplies camera related information as metadata to the encoding apparatus 172.

At step S54, the synchronism deviation detection unit 222 detects, for each reference camera, a synchronism deviation of the two-dimensional image data of the reference camera with respect to the base camera on the basis of the two-dimensional image data of the base camera and the reference camera supplied from the calibration unit 221. Further, the synchronism deviation detection unit 222 detects the synchronism deviation of the two-dimensional image data of the base camera as 0.

At step S55, the synchronism deviation detection unit 222 supplies synchronism deviation information of the detected synchronism deviations as metadata to the encoding apparatus 172. Further, the synchronism deviation detection unit 222 supplies the two-dimensional image data of the cameras 211 supplied from the calibration unit 221 to the depth generation unit 223.

At step S56, the depth generation unit 223 performs stereo matching for the two-dimensional image data of the respective cameras 211 supplied from the synchronism deviation detection unit 222 to generate depth image data for each camera 211.

At step S57, the depth generation unit 223 supplies the two-dimensional image data and the depth image data of the cameras 211 to the encoding apparatus 172.

At step S58, the encoding apparatus 172 encodes the two-dimensional image data and the depth image data of the cameras 211 supplied thereto from the image pickup apparatus 171 and the metadata to generate an encoded stream.

At step S59, the encoding apparatus 172 transmits the generated encoded stream to the decoding apparatus 173. Then, the processing is ended.

Example of Configuration of Decoding Unit

Figure 15:
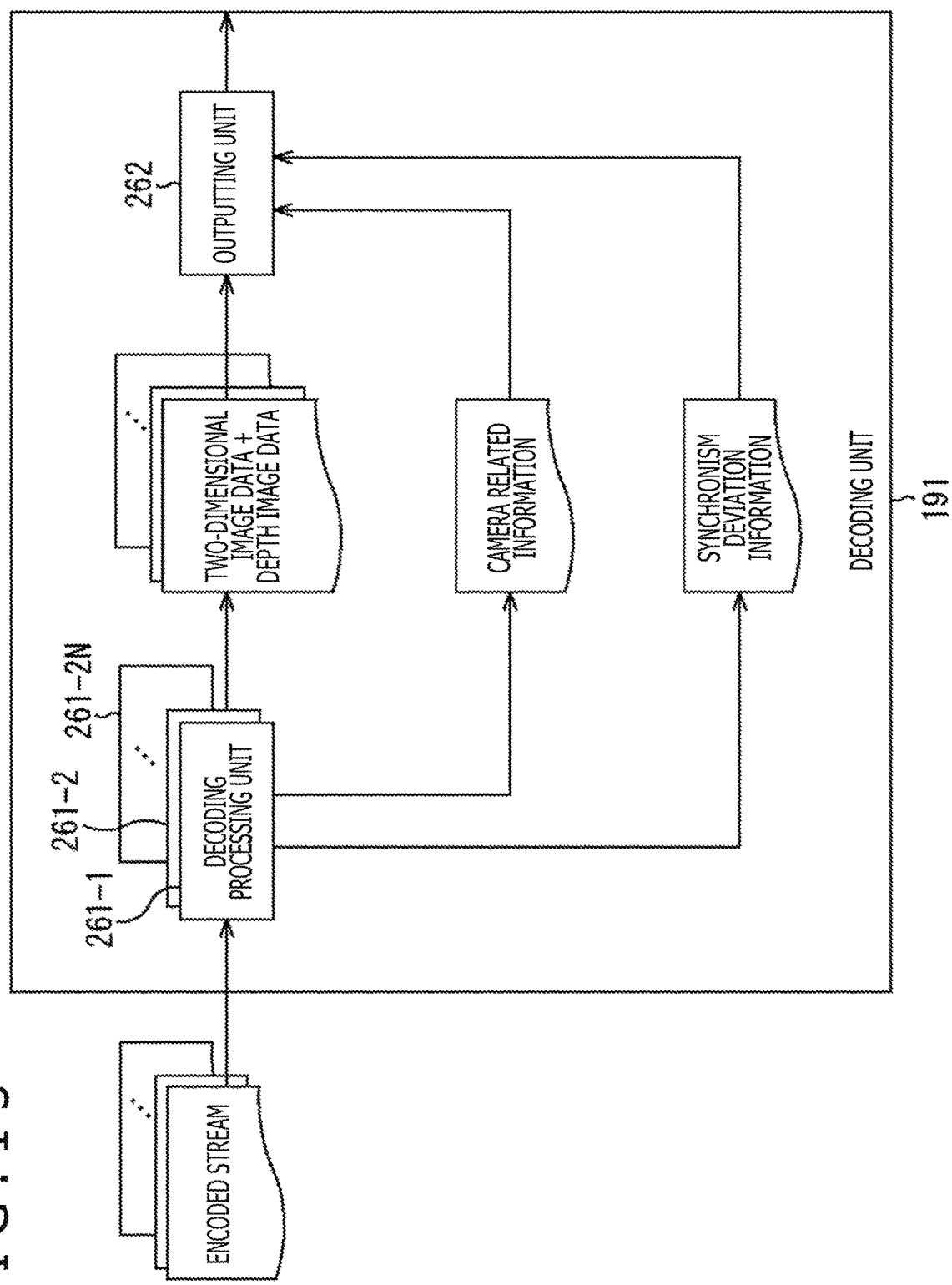
FIG. 15 is a block diagram depicting an example of a configuration of a decoding unit of FIG. 10.

FIG. 15 is a block diagram depicting an example of a configuration of the decoding unit 191 of FIG. 10.

In the example of FIG. 15, the configuration of the encoding apparatus 172 is the configuration of FIG. 13, and the encoding method of an encoded stream transmitted from the encoding apparatus 172 is the AVC method or the HEVC method. The decoding unit 191 of FIG. 15 includes 2N decoding processing units 261-1 to 261-2N and an outputting unit 262.

The decoding processing units 261-1 to 261-2N of the decoding unit 191 individually decode an encoded stream of two-dimensional image data and depth image data of the cameras 211 supplied from the reception unit 31 in accordance with a method corresponding to the AVC method or the HEVC method. The decoding processing units 261-1 to 261-2N supply the two-dimensional image data or the depth image data of the cameras 211 obtained as a result of the decoding and camera related information and synchronism deviation information configuring metadata to the outputting unit 262.

The outputting unit 262 (synchronous processing unit) supplies, for each reference camera, on the basis of the synchronism deviation information supplied from the decoding processing units 261-1 to 261-2N, the two-dimensional image data and the depth image data of the base camera and the reference cameras in a synchronized relation with each other to the conversion unit 192 of FIG. 10.

For example, in the case where num_units_in_tick of a reference camera included in the synchronism deviation information is 1001 and Delta_num_units_in_tick is 2002 and besides time_scale and Delta_time_scale are 60000, the outputting unit 262 supplies the two-dimensional image data and the depth image data of the reference camera by delaying two frames to the conversion unit 192. Further, the outputting unit 262 supplies the camera related information supplied from the decoding processing units 261-1 to 261-2N to the conversion unit 192.

Since, by the foregoing, two-dimensional image data and depth image data of the cameras 211 to be supplied to the conversion unit 192 are synchronized with each other, the generation accuracy of three-dimensional data by the conversion unit 192 is improved.

Description of Processing of Decoding Apparatus

Figure 16:
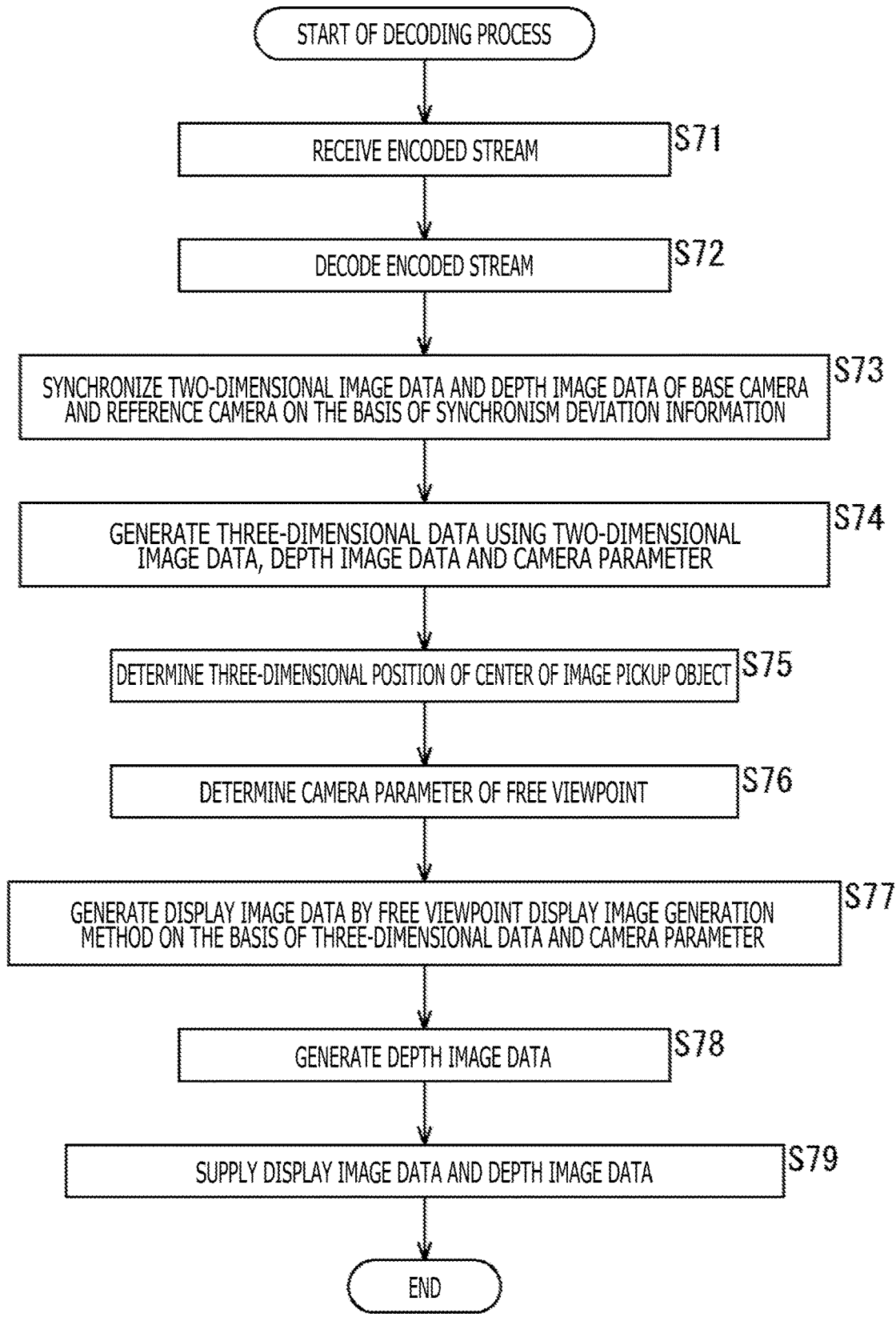
FIG. 16 is a flow chart illustrating a decoding process of a decoding apparatus of FIG. 10.

FIG. 16 is a flow chart illustrating a decoding process of the decoding apparatus 173 in the case where the configuration of the conversion unit 192 of FIG. 10 is same as the configuration of FIG. 8 except that three-dimensional data is not corrected using occlusion three-dimensional data. This decoding process is started, for example, when an encoded stream is transmitted from the encoding apparatus 172 to the decoding apparatus 173.

At step S71 of FIG. 16, the reception unit 31 of the decoding apparatus 173 receives an encoded stream transmitted from the encoding apparatus 172 and supplies the encoded stream to the decoding unit 191.

At step S72, the decoding unit 191 decodes the encoded stream supplied from the reception unit 31 by a method corresponding to the encoding method by the encoding apparatus 172.

At step S73, the decoding unit 191 supplies, for each reference camera, on the basis of the synchronism deviation information from within metadata obtained as a result of the decoding, two-dimensional image data and depth image data of the base camera and the reference camera in a synchronized relation with each other to the conversion unit 192. Further, the outputting unit 262 supplies camera related information from within the metadata to the conversion unit 192.

At step S74, the conversion unit 192 generates three-dimensional data of an image pickup object similarly as in the image pickup apparatus 11 using the two-dimensional image data and the depth image data supplied from the decoding unit 191 and a camera parameter included in the camera related information.

Processes at steps S75 to S79 are similar to those at steps S35 to S39 of FIG. 9, respectively, and therefore, description of them is omitted.

As described above, since, in the transmission system 170, two-dimensional image data and depth image data acquired by the cameras 211 are encoded as they are and transmitted, synchronization of the two-dimensional image data and the depth image data of the camera 211 may not be available in some cases.

However, in the transmission system 170, the image pickup apparatus 171 detects a synchronism deviation of two-dimensional image data of the cameras, and the encoding apparatus 172 transmits synchronism deviation information of the detected synchronism deviations together with the two-dimensional image data and the depth image data. Accordingly, the decoding apparatus 173 can synchronize the two-dimensional image data and the depth image data of the cameras 211 with each other on the basis of the synchronism deviation information. As a result, the decoding apparatus 173 can generate three-dimensional data with high accuracy using the two-dimensional image data and the depth image data of the N cameras 211, which are synchronized with each other.

Third Embodiment

Example of Configuration of Third Embodiment of Transmission System

Figure 17:
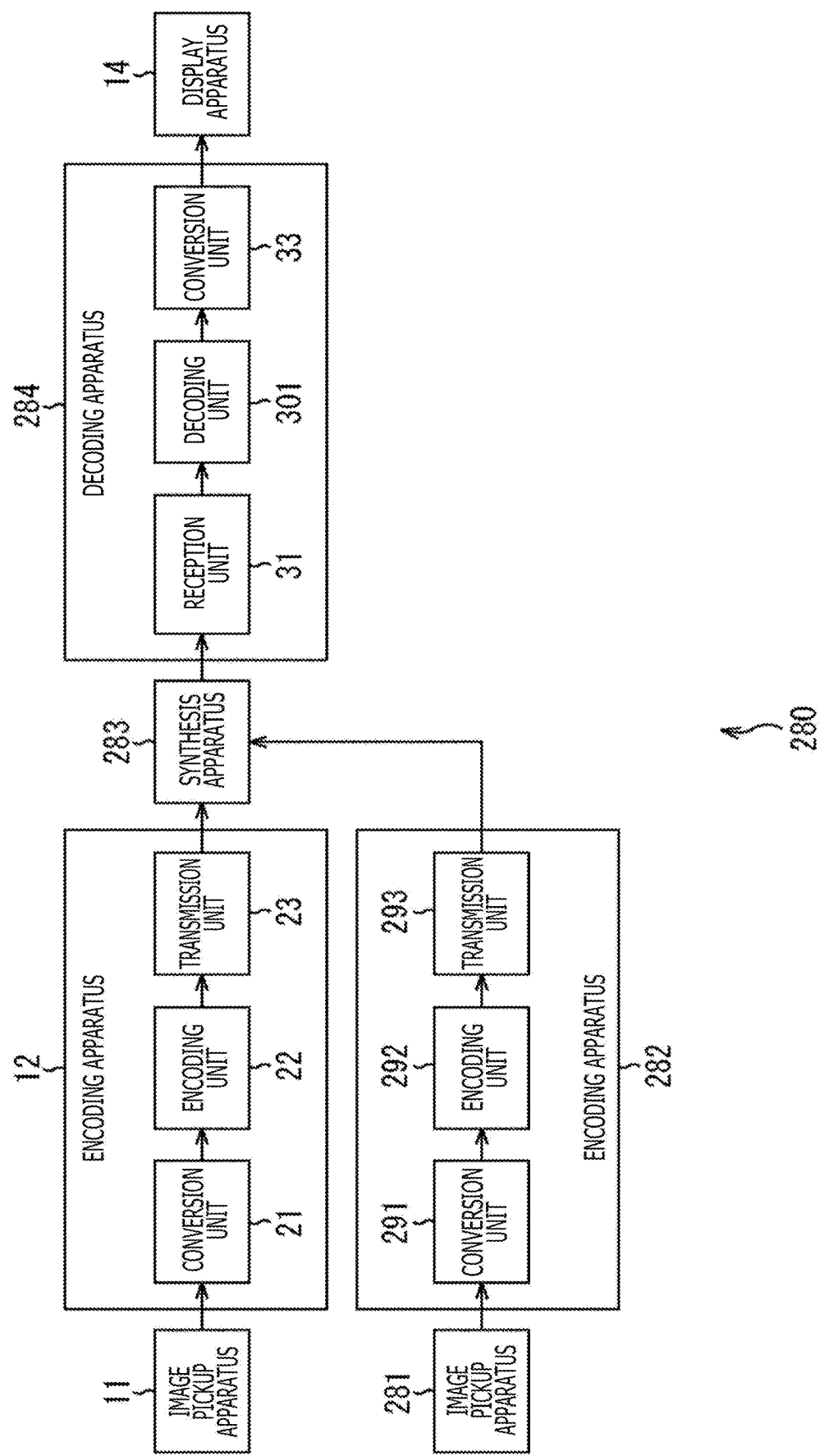
FIG. 17 is a block diagram depicting an example of a configuration of a third embodiment of the transmission system to which the present disclosure is applied.

FIG. 17 is a block diagram depicting an example of a configuration of a third embodiment of the transmission system to which the present disclosure is applied.

Of the components depicted in FIG. 17, components same as those of FIG. 1 are denoted by the same reference signs. Overlapping description is suitably omitted.

The configuration of a transmission system 280 of FIG. 17 is different from the configuration of the transmission system 10 of FIG. 1 in that an image pickup apparatus 281, an encoding apparatus 282 and a synthesis apparatus 283 are provided newly, that the decoding apparatus 13 is replaced by a decoding apparatus 284 and that the viewpoint of two-dimensional image data and depth image data generated by the encoding apparatus 12 is part of a plurality of viewpoints corresponding to a predetermined display image generation method.

In the transmission system 280, an encoded stream of some viewpoints (hereinafter referred to as first viewpoint group) from among a plurality of viewpoints corresponding to the predetermined display image generation method is generated by the encoding apparatus 12 while an encoded stream of the other viewpoints (hereinafter referred to as second viewpoint group) is generated by the encoding apparatus 282, and both encoded streams are synthesized (merged).

In particular, the image pickup apparatus 281 of the transmission system 280 is configured similarly to the image pickup apparatus 11 of FIG. 1 and at least part thereof picks up an image of an image pickup object, which is same as the image pickup object of the image pickup apparatus 11, and supplies three-dimensional data of the image pickup object to the encoding apparatus 282.

The encoding apparatus 282 includes a conversion unit 291 configured similarly to the conversion unit 21, an encoding unit 292 configured similarly to the encoding unit 22, and a transmission unit 293 configured similarly to the transmission unit 23. The encoding apparatus 282 generates two-dimensional image data and depth image data of the second viewpoint group from three-dimensional data and encodes and transmits the generated data to the synthesis apparatus 283.

The synthesis apparatus 283 receives an encoded stream of the first viewpoint group (hereinafter referred to as first partial encoded stream) transmitted thereto from the encoding apparatus 12 and an encoded stream of the second viewpoint group (hereinafter referred to as second partial encoded stream) transmitted from the encoding apparatus 282. The synthesis apparatus 283 detects a synchronism deviation of the second partial encoded stream with respect to the first partial encoded stream and generates viewpoint group synchronism deviation information representative of the synchronism deviation of the second encoded stream.

The viewpoint group synchronism deviation information includes, for example, num_units_in_tick and time_scale representative of the frame rate of the second viewpoint group and Delta_num_units_in_tick and Delta_time_scale representative of a synchronism deviation.

The synthesis apparatus 283 places the viewpoint group synchronism deviation information into the metadata of the second partial encoded stream. The synthesis apparatus 283 synthesizes the second partial encoded stream, in which the viewpoint group synchronism deviation information is placed, and the first partial encoded stream to generate an encoded stream of a plurality of viewpoints corresponding to the predetermined display image generation method and transmits the encoded stream to the decoding apparatus 284.

The configuration of the decoding apparatus 284 is different from the configuration of the decoding apparatus 13 of FIG. 1 in that the decoding unit 32 is replaced by a decoding unit 301. The decoding unit 301 of the decoding apparatus 284 is similar to the decoding unit 191 of FIG. 10 except that synchronism deviation information is replaced by viewpoint group synchronism deviation information and that occlusion three-dimensional data from within metadata is supplied together with camera related information to the conversion unit 33, and therefore, description of the decoding unit 301 is omitted.

Example of Configuration of Synthesis Apparatus

Figure 18:
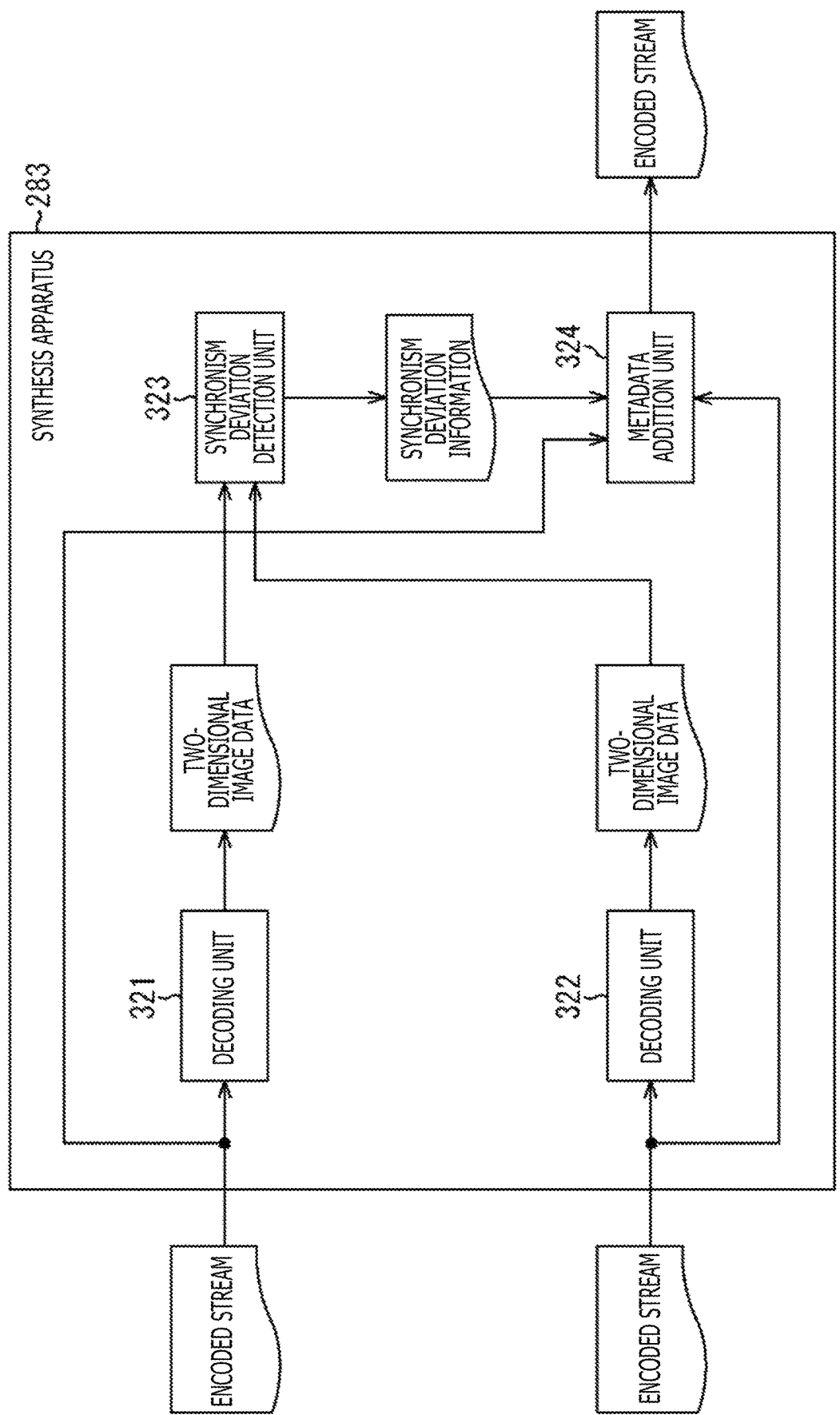
FIG. 18 is a block diagram depicting an example of a configuration of a synthesis apparatus of FIG. 17.

FIG. 18 is a block diagram depicting an example of a configuration of the synthesis apparatus 283 of FIG. 17.

The synthesis apparatus 283 of FIG. 18 includes a decoding unit 321, another decoding unit 322, a synchronism deviation detection unit 323 and a metadata addition unit 324.

The decoding unit 321 of the synthesis apparatus 283 receives a first partial encoded stream transmitted from the encoding apparatus 12. The decoding unit 321 decodes the received first partial encoded stream in accordance with a method corresponding to the encoding method (in the example of FIG. 18, MVCD) by the encoding unit 22 to generate two-dimensional image data and depth image data of the first viewpoint group and metadata. The decoding unit 321 supplies the two-dimensional image data of one viewpoint from within the generated first viewpoint group to the synchronism deviation detection unit 323.

The decoding unit 322 receives a second partial encoded stream transmitted thereto from the encoding apparatus 282. The decoding unit 322 decodes the received second partial encoded stream in accordance with a method corresponding to the encoding method (in the example of FIG. 18, MVCD) by the encoding unit 292 to generate two-dimensional image data and depth image data of the second viewpoint group and metadata. The decoding unit 322 supplies the two-dimensional image data of one viewpoint from within the generated second viewpoint group to the synchronism deviation detection unit 323.

The synchronism deviation detection unit 323 detects, on the basis of the two-dimensional image data supplied from the decoding unit 321 and the decoding unit 322, a synchronism deviation of the two-dimensional image data of the second viewpoint group with respect to the first viewpoint group.

The detection method of a synchronism deviation may be same as or different from the detection method of a synchronism deviation in the second embodiment.

Further, for detection of a synchronism deviation, not only two-dimensional image data but also a camera parameter and depth image data may be used. In this case, for example, the synchronism deviation detection unit 323 converts the two-dimensional position of a feature point of two-dimensional image data at each point of time of one viewpoint from within the first viewpoint group and one viewpoint from within the second viewpoint group into the three-dimensional position on the basis of the camera parameter included in the camera related information. The synchronism deviation detection unit 323 detects the difference between points of time of the two-dimensional image data when the difference between the three-dimensional positions of the feature points of the two viewpoints is in the minimum as a synchronism deviation of the two-dimensional image data of the second viewpoint group with respect to the first viewpoint group.

The synchronism deviation detection unit 323 supplies viewpoint group synchronism deviation information representative of the detected synchronism deviation to the metadata addition unit 324.

The metadata addition unit 324 places the viewpoint group synchronism deviation information supplied from the synchronism deviation detection unit 323 as metadata into a second partial encoded stream transmitted thereto from the encoding apparatus 282. The metadata addition unit 324 synthesizes the second partial encoded stream, in which the viewpoint group synchronism deviation information is replaced as the metadata, and the first partial encoded stream transmitted from the encoding apparatus 12. The metadata addition unit 324 (transmission unit) transmits the encoded stream of the plurality of viewpoints corresponding to the predetermined display image generation method obtained as a result of the synthesis to the decoding apparatus 284.

Description of Processing of Synthesis Apparatus

Since the encoding processes of the image pickup apparatus 11 and encoding apparatus 12 of FIG. 17 and the image pickup apparatus 281 and encoding apparatus 282 are similar to the encoding process of FIG. 5, description of them is omitted.

Figure 19:
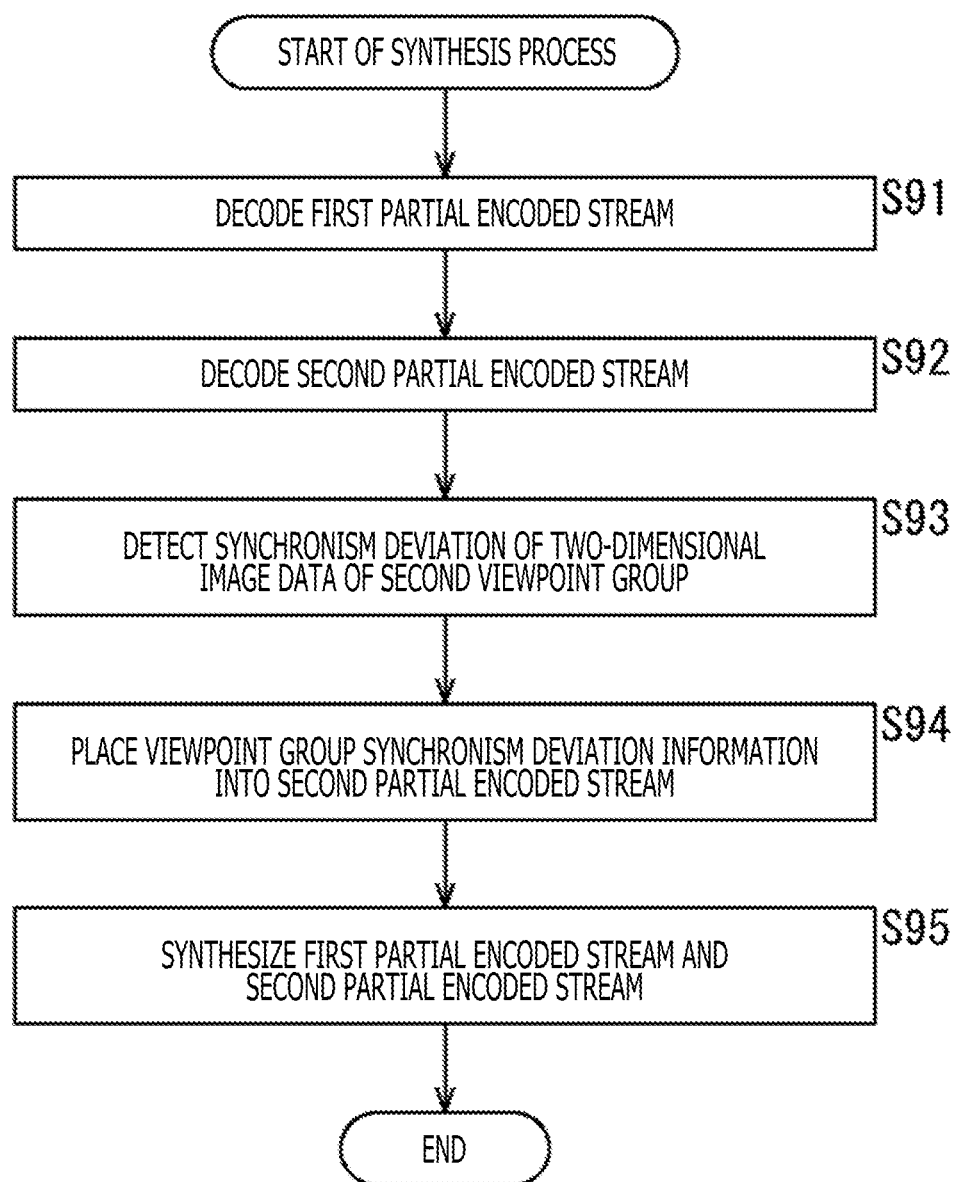
FIG. 19 is a flow chart illustrating a synthesis process of the synthesis apparatus of FIG. 18.

FIG. 19 is a flow chart illustrating a synthesis process of the synthesis apparatus 283 of FIG. 18.

At step S91 of FIG. 19, the decoding unit 321 of the synthesis apparatus 283 decodes a first partial encoded stream transmitted from the encoding apparatus 12 in accordance with a method corresponding to the encoding method by the encoding unit 22. The decoding unit 321 supplies two-dimensional image data of one viewpoint from within the first viewpoint group obtained as a result of the decoding to the synchronism deviation detection unit 323.

At step S92, the decoding unit 322 decodes a second partial encoded stream transmitted from the encoding apparatus 282 in accordance with a method corresponding to the encoding method by the encoding unit 292. The decoding unit 322 supplies two-dimensional image data of one viewpoint from within the second viewpoint group obtained as a result of the decoding to the synchronism deviation detection unit 323.

At step S93, the synchronism deviation detection unit 323 detects, on the basis of the two-dimensional image data supplied from the decoding unit 321 and the decoding unit 322, a synchronism deviation of the two-dimensional image data of the second viewpoint group with respect to the first viewpoint group. The synchronism deviation detection unit 323 supplies viewpoint group synchronism deviation information representative of the detected synchronism deviation to the metadata addition unit 324.

At step S94, the metadata addition unit 324 places the viewpoint group synchronism deviation information supplied from the synchronism deviation detection unit 323 as metadata into a second partial encoded stream transmitted from the encoding apparatus 282.

At step S95, the metadata addition unit 324 synthesizes the first partial encoded stream transmitted from the encoding apparatus 12 and the second partial encoded stream including the viewpoint group synchronism deviation information. The metadata addition unit 324 supplies an encoded stream of the plurality of viewpoints corresponding to the predetermined display image generation method obtained as a result of the synthesis to the decoding apparatus 284, and then the processing is ended.

The decoding process of the decoding apparatus 284 is similar to the decoding process of FIG. 16 except that synchronism deviation information is replaced by viewpoint group synchronism deviation information and that also occlusion three-dimensional data is generated by the process at step S72 and, after the process at step S74, the three-dimensional data is modified using the occlusion three-dimensional data similarly as at step S34 of FIG. 9.

As described above, in the transmission system 280, a first partial encoded stream generated by the encoding apparatus 12 and a second partial encoded stream generated by the encoding apparatus 282 are synthesized and transmitted to the decoding apparatus 284.

Accordingly, synchronization between the encoded streams for the first viewpoint group and the second viewpoint group corresponding to the predetermined display image generation method obtained as a result of the synthesis may not be available in some cases.

However, in the transmission system 280, the synthesis apparatus 283 decodes the first partial encoded stream and the second partial encoded stream once and detects a synchronism deviation between the two-dimensional image data for the first viewpoint group and the second viewpoint group obtained as a result of the decoding. Then, the synthesis apparatus 283 transmits viewpoint group synchronism deviation information representative of the detected synchronism deviation together with the first partial encoded stream and the second partial encoded stream. Accordingly, the decoding apparatus 284 can synthesize the two-dimensional image data and the depth image data of the first viewpoint group and the second viewpoint group with each other on the basis of the viewpoint group synchronism deviation information. As a result, the decoding apparatus 284 can generate three-dimensional data with high accuracy using the two-dimensional image data and the depth image data of the first viewpoint group and the second viewpoint group that are in a synchronized state with each other.

Fourth Embodiment

Example of Configuration of Synthesis Apparatus in Fourth Embodiment of Transmission System The configuration of a fourth embodiment of the transmission system to which the present disclosure is applied is same as the configuration of the transmission system 280 of FIG. 17 except that the synthesis apparatus 283 is replaced by a synthesis apparatus 340 and the conversion unit 33 of the decoding apparatus 284 is replaced by a conversion unit 380 and that viewpoint group synchronism deviation information is replaced by coordinate transformation information. Accordingly, in the following, only the synthesis apparatus 340 and the conversion unit 380 are described.

Figure 20:
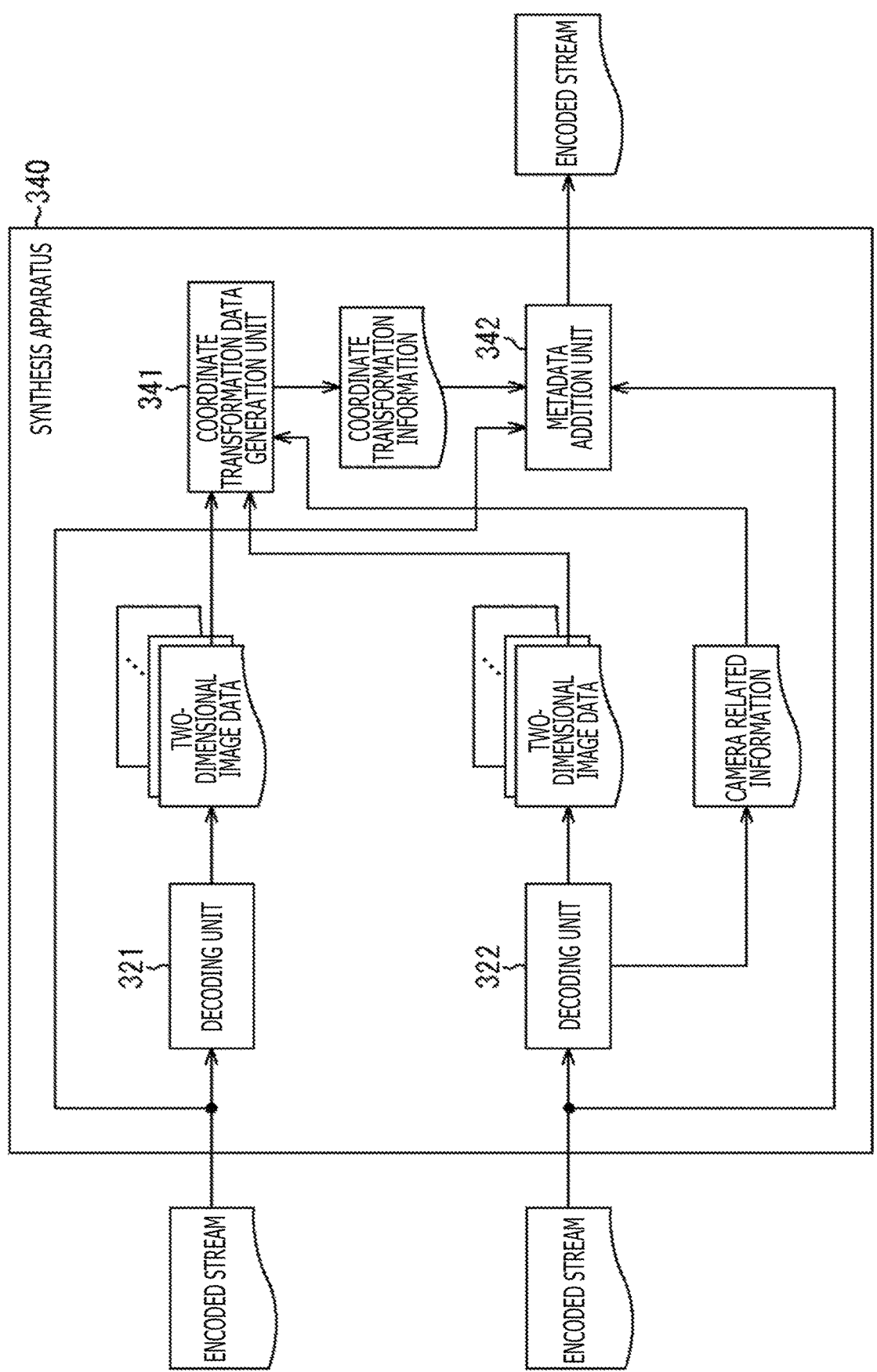
FIG. 20 is a block diagram depicting an example of a configuration of a synthesis apparatus in a fourth embodiment.

FIG. 20 is a block diagram depicting an example of a configuration of the synthesis apparatus 340.

Of the components depicted in FIG. 20, components that are same as those of FIG. 18 are denoted by the same reference signs. Overlapping description is suitably omitted.

The configuration of the synthesis apparatus 340 of FIG. 20 is different from the configuration of the synthesis apparatus 283 of FIG. 18 in that the synchronism deviation detection unit 323 and the metadata addition unit 324 are replaced by a coordinate transformation data generation unit 341 and a metadata addition unit 342, respectively. The synthesis apparatus 340 does not detect a synchronism deviation of two-dimensional image data of different viewpoints but generates coordinate transformation data for transforming a first three-dimensional coordinate system that is a three-dimensional coordinate system of the first viewpoint group into a second three-dimensional coordinate system that is a three-dimensional coordinate system of the second viewpoint group.

In particular, the coordinate transformation data generation unit 341 of the synthesis apparatus 340 determines, on the basis of two-dimensional image data of the first viewpoint group generated by decoding by the decoding unit 322, a two-dimensional position of a feature point for each viewpoint of the first viewpoint group.

Further, the coordinate transformation data generation unit 341 determines, on the basis of a camera parameter, the two-dimensional image data and the depth image data included in camera related information of the second viewpoint group generated by the decoding by the decoding unit 321, a three-dimensional position of the feature point in the second three-dimensional coordinate system in accordance with the expression (1) given hereinabove.

The coordinate transformation data generation unit 341 generates, for each viewpoint of the first viewpoint group, coordinate transformation data on the basis of the two-dimensional position and the three-dimensional position in the second three-dimensional coordinate system of the feature point. The coordinate transformation data generation unit 341 supplies coordinate transformation information including the coordinate transformation data of the viewpoints of the first viewpoint group to the metadata addition unit 342.

The metadata addition unit 342 places the coordinate transformation information supplied from the coordinate transformation data generation unit 341 as metadata into the first partial encoded stream transmitted thereto from the encoding apparatus 12. Further, the metadata addition unit 342 synthesizes the first partial encoded stream in which the coordinate transformation information is placed as metadata and the second partial encoded stream transmitted thereto from the encoding apparatus 282. The metadata addition unit 342 (transmission unit) transmits an encoded stream of the plurality of viewpoints corresponding to the predetermined display image generation method obtained as a result of the synthesis to the decoding apparatus 284.

Description of Generation Process of Coordinate Transformation Data

Figure 21:
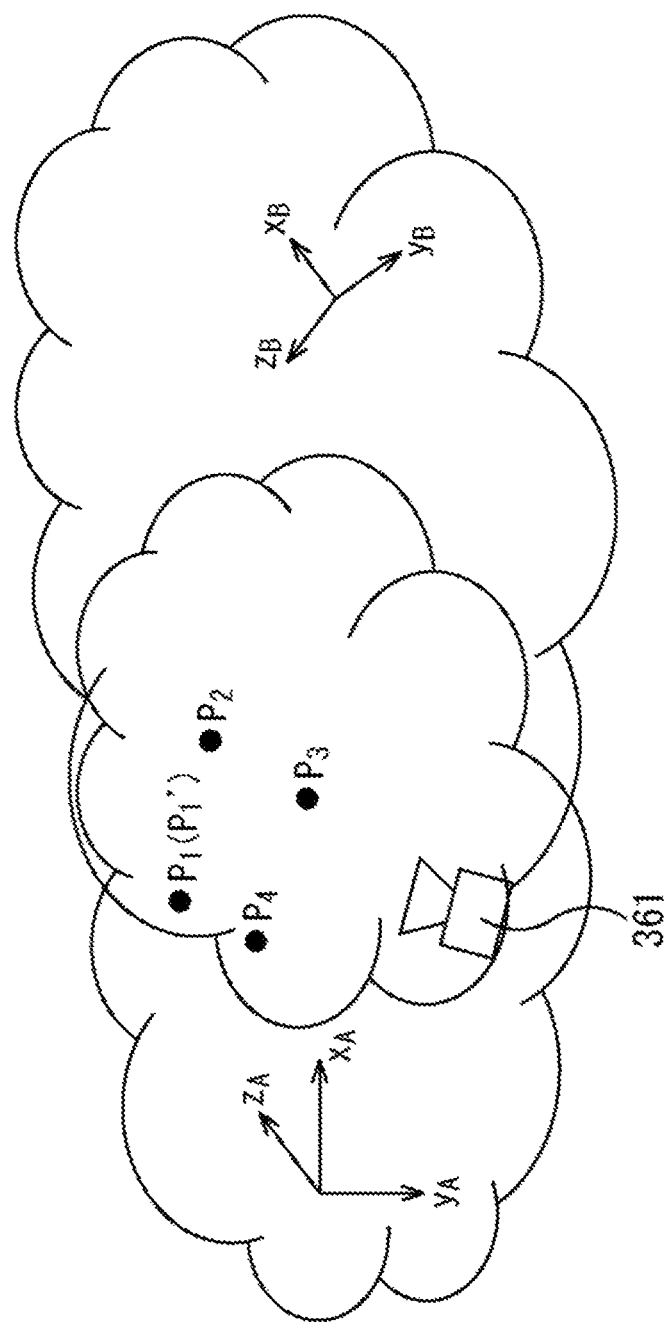
FIG. 21 is a view illustrating a process for generating coordinate transformation data.

FIG. 21 is a view illustrating a process for generating coordinate transformation data by the coordinate transformation data generation unit 341 of FIG. 20.

In the example of FIG. 21, the first three-dimensional coordinate system is a coordinate system that includes axes $x_A$ to $z_A$ that cross perpendicularly with each other as coordinate axes, and the second three-dimensional coordinate system is a coordinate system that includes axes $x_B$ to $z_B$ that cross perpendicularly with each other as coordinate axes and is different from the first three-dimensional coordinate system.

A two-dimensional position $P_A$ on an image, which is picked up by a virtual camera 361 of one viewpoint in the first viewpoint group, of a feature point whose three-dimensional position in the first three-dimensional coordinate system is $P_1$ is represented by the following expression (3).

[Math. 3]

$$P_A = R_{cam_A} P_1 + t_{cam_A} \quad (3)$$

$R_{cam_A}|t_{cam_A}$ are camera parameters of the virtual camera 361 in the first three-dimensional coordinate system from within the metadata of the first partial encoded stream.

Meanwhile, a two-dimensional position $P_B$ on an image, which is picked up by the virtual camera 361, of a feature point whose three-dimensional position in the first three-dimensional coordinate system is $P_1$ and whose three-dimensional position in the second three-dimensional coordinate system is $P_1'$ is represented by the following expression (4).

[Math. 4]

$$P_A = P_B = R_{cam_B} P_1' + t_{cam_B} \quad (4)$$

$R_{cam_B}|t_{cam_B}$ are camera parameters of the virtual camera 361 in the second three-dimensional coordinate system.

By transforming the expression (4), the three-dimensional position $P_1'$ is represented by the following expression (5).

[Math. 5]

$$P_1' = R_{cam_B}^{-1} P_B - R_{cam_B}^{-1} t_{cam_B} \quad (5)$$

Since the two-dimensional position $P_A$ and the two-dimensional position $P_B$ are same, by substituting the right side of the expression (3) into the two-dimensional position $P_B$ of the expression (5) given above, the following expression (6) is obtained.

[Math. 6]

$$P_1' = R_{cam_B}^{-1}(R_{cam_A} P_1 + t_{cam_A}) - R_{cam_B}^{-1} t_{cam_B} \quad (6)$$
$$= R_{con} P_1 + t_{con}$$

The expression (6) is an expression for transforming the three-dimensional position $P_1$ in the first three-dimensional coordinate system into the three-dimensional position $P_1'$ in the second three-dimensional coordinate system. Accordingly, the coordinate transformation data generation unit 341 determines $R_{con}|t_{con}$ represented by the same representation method as the external parameter of the camera in the expression (6) as coordinate transformation data.

In particular, the coordinate transformation data generation unit 341 determines, on the basis of the camera parameter, two-dimensional image data and depth image data of the second viewpoint group, a three-dimensional position of the feature point in the second three-dimensional coordinate system in accordance with the expression (1) given hereinabove. Further, the coordinate transformation data generation unit 341 determines, on the basis of the two-dimensional image data of the first viewpoint group, the two-dimensional position of the feature point for each viewpoint of the first viewpoint group.

Then, the coordinate transformation data generation unit 341 substitutes, for each viewpoint of the first viewpoint group, the three-dimensional position of the feature point in the second three-dimensional coordinate system into $P_1'$ and determines the external parameters $R_{camB}|t_{camB}$ of the virtual camera 361 in the second three-dimensional coordinate system in accordance with the expression (4) in which the two-dimensional position is substituted in $P_A$.

The process described above is called online calibration. Details of the online calibration are described, for example, in Zhengyou Zhang, "A Flexible New Technique for Camera Calibration," Technical Report MSR-TR-98-71, Microsoft Corporation, Dec. 2, 1998 and so forth.

The coordinate transformation data generation unit 341 determines coordinate transformation data in accordance with the expression (6) given hereinabove for each viewpoint of the first viewpoint group using the external parameters $R_{camB}|t_{camB}$ and the external parameters $R_{camB}|t_{camB}$.

Example of Coordinate Transformation Information

Figures 22, 23:
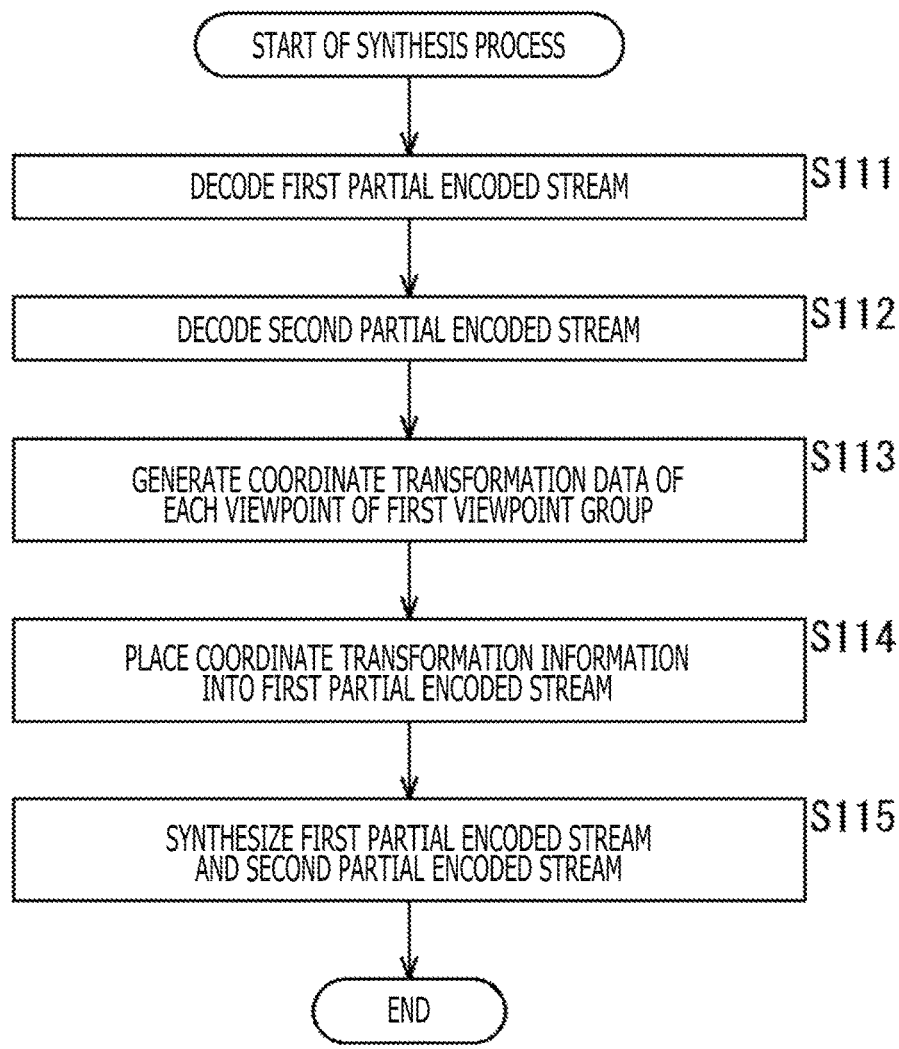
FIG. 22 is a view depicting an example of coordinate transformation information.
FIG. 23 is a flow chart illustrating a synthesis process of the synthesis apparatus of FIG. 20.

FIG. 22 is a view depicting an example of the coordinate transformation information.

In the example of FIG. 22, the camera IDs of the viewpoints of the first viewpoint group are 0 to 3.

As depicted in FIG. 22, the coordinate transformation information is configured by associating, with the camera ID of each viewpoint of the first viewpoint group, isCorrectionFlag of the viewpoint and coordinate transformation data.

isCorrectionFlag is a flag indicative of whether or not the first three-dimensional coordinate system that is a three-dimensional coordinate system of a corresponding viewpoint is different from the second three-dimensional coordinate system that becomes the base. isCorrectionFlag is 1 in the case where it is indicated that the first three-dimensional coordinate system that is a three-dimensional coordinate system of the corresponding viewpoint is different from the second three-dimensional coordinate system that becomes the base, but is 0 in the case where it is indicated that the first three-dimensional coordinate system is not different.

In the fourth embodiment, since the first three-dimensional coordinate system and the second three-dimensional coordinate system are different from each other, all isCorrectionFlags are 1. Further, in FIG. 22, coordinate transformation data of a viewpoint whose camera ID is i is represented as R|t(i).

It is to be noted that the coordinate transformation information may include the coordinate transformation common flag indicative of whether or not the coordinate transformation data of all viewpoints of the first viewpoint group are same. In this case, when the coordinate transformation data of all viewpoints of the first viewpoint group are same, the coordinate transformation information includes the coordinate transformation common flag (coordinate transformation common information) indicating that the coordinate transformation data of all viewpoints of the first viewpoint group are same and coordinate transformation data common to all viewpoints of the first viewpoint group. The coordinate transformation common flag is 1, for example, in the case where the coordinate transformation data of all viewpoints of the first viewpoint group are same, but is 0 in the case where they are different.

Description of Processing of Synthesis Apparatus

FIG. 23 is a flow chart illustrating a synthesis process of the synthesis apparatus 340 of FIG. 20.

Processes at steps S111 and S112 of FIG. 23 are similar to the processes at steps S91 and S92 of FIG. 19, respectively, and therefore, description of them is omitted.

At step S113, the coordinate transformation data generation unit 341 of the synthesis apparatus 340 generates coordinate transformation data for each viewpoint of the first viewpoint group on the basis of the camera parameter, two-dimensional image data and depth image data of the second viewpoint group and the two-dimensional image data of the first viewpoint group. The coordinate transformation data generation unit 341 supplies coordinate transformation information including the coordinate transformation data of the viewpoints of the first viewpoint group to the metadata addition unit 342.

At step S114, the metadata addition unit 342 places the coordinate transformation information supplied from the coordinate transformation data generation unit 341 as metadata into a first partial encoded stream transmitted from the encoding apparatus 12.

At step S115, the metadata addition unit 342 synthesizes the first partial encoded stream including the coordinate transformation information and a second partial encoded stream transmitted from the encoding apparatus 282. The metadata addition unit 342 transmits an encoded stream of a plurality of viewpoints corresponding to the predetermined display image generation method obtained as a result of the synthesis to the decoding apparatus 284. Then, the processing is ended.

Example of Configuration of Conversion Unit

Figure 24:
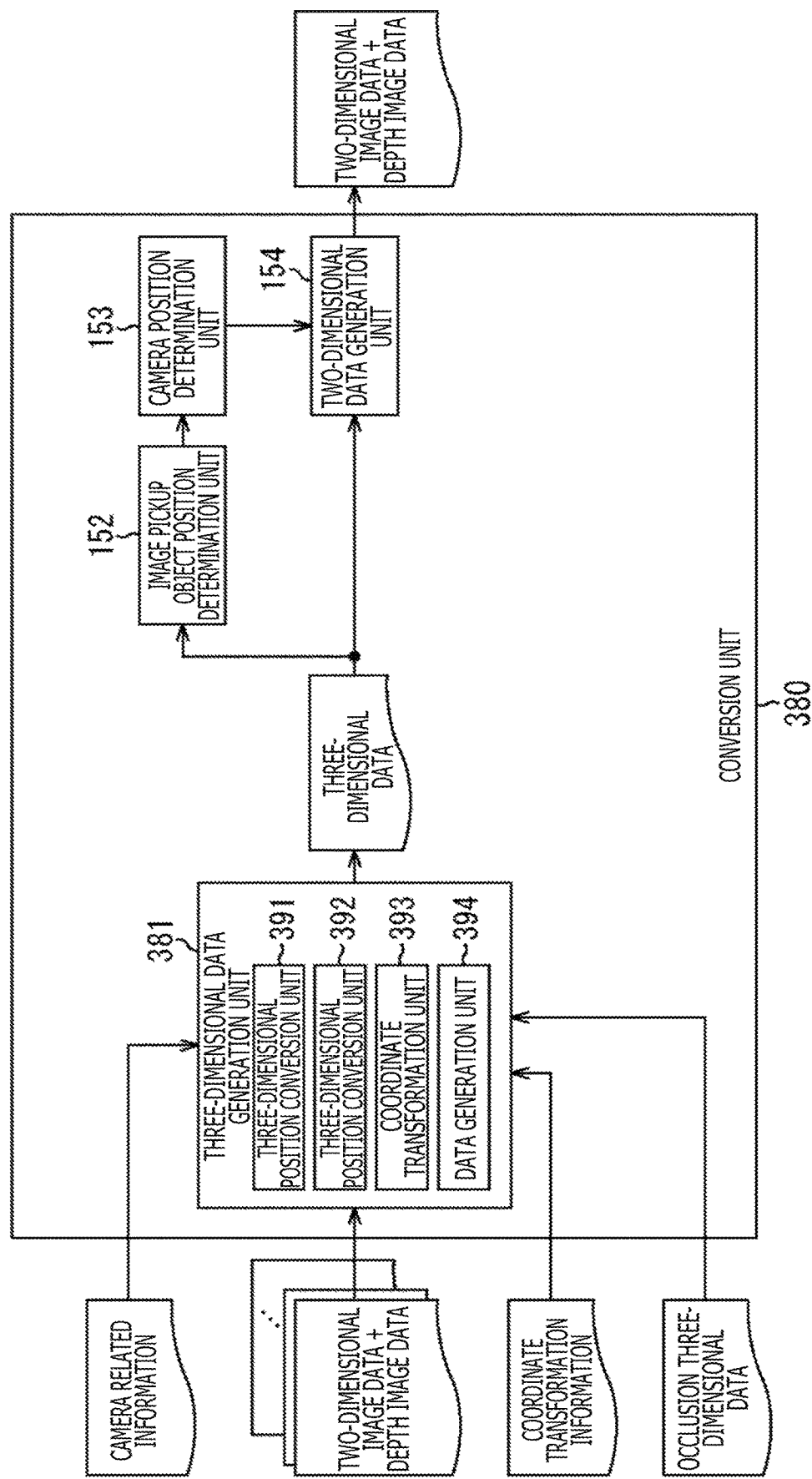
FIG. 24 is a block diagram depicting an example of a configuration of a conversion unit in the fourth embodiment.

FIG. 24 is a block diagram depicting an example of a configuration of the conversion unit 380 in the case where the display image generation method of the decoding apparatus 284 is the free viewpoint display image generation method.

Of the components depicted in FIG. 24, components same as those of FIG. 8 are denoted by the same reference signs. Overlapping description is omitted suitably.

The configuration of the conversion unit 380 of FIG. 24 is different from the configuration of the conversion unit 33 of FIG. 8 in that the three-dimensional data generation unit 151 is replaced by a three-dimensional data generation unit 381.

The three-dimensional data generation unit 381 includes a three-dimensional position conversion unit 391, a three-dimensional position conversion unit 392, a coordinate transformation unit 393 and a data generation unit 394.

The three-dimensional position conversion unit 391 (first three-dimensional position conversion unit) of the three-dimensional data generation unit 381 converts, on the basis of the camera parameter from within the metadata, two-dimensional image data and depth image data of the first viewpoint group supplied from the decoding unit 301, the two-dimensional position of each pixel of the two-dimensional image data of the first viewpoint into a three-dimensional position in the first three-dimensional coordinate system in accordance with the expression (1) given hereinabove. The three-dimensional position conversion unit 391 supplies the three-dimensional position of each pixel of the two-dimensional image data of the first viewpoint group in the first three-dimensional coordinate system and the two-dimensional image data of the first viewpoint group to the coordinate transformation unit 393.

The three-dimensional position conversion unit 392 (second three-dimensional position conversion unit) converts, on the basis of the camera parameter from among the metadata, two-dimensional image data and depth image data of the second viewpoint group supplied from the decoding unit 301, the two-dimensional position of each pixel of the two-dimensional image data of the second viewpoint group into a three-dimensional position in the second three-dimensional coordinate system in accordance with the expression (1) given hereinabove. The three-dimensional position conversion unit 392 supplies the three-dimensional position of each pixel of the two-dimensional image data of the second viewpoint group in the second three-dimensional coordinate system and the two-dimensional image data of the second viewpoint group to the data generation unit 394.

The coordinate transformation unit 393 transforms, on the basis of the coordinate transformation information from within the metadata supplied from the decoding unit 301, the three-dimensional position of each pixel of the two-dimensional image data of the first viewpoint group supplied from the three-dimensional position conversion unit 391 in the first three-dimensional coordinate system into a three-dimensional position in the second three-dimensional coordinate system. The coordinate transformation unit 393 supplies the three-dimensional position of each pixel of the two-dimensional image data of the first viewpoint group in the second three-dimensional coordinate system and the two-dimensional image data of the first viewpoint group to the data generation unit 394.

The data generation unit 394 generates, on the basis of the three-dimensional position of each pixel of the two-dimensional image data of the first viewpoint group and the second viewpoint group in the second three-dimensional coordinate system, three-dimensional data of the image pickup object from the two-dimensional image data of the first viewpoint group and the second viewpoint group.

The data generation unit 394 modifies the generated three-dimensional data using occlusion three-dimensional data from within the metadata supplied from the decoding unit 301 and supplies the modified three-dimensional data to the image pickup object position determination unit 152 and the two-dimensional data generation unit 154.

Description of Processing of Decoding Apparatus

Figure 25:
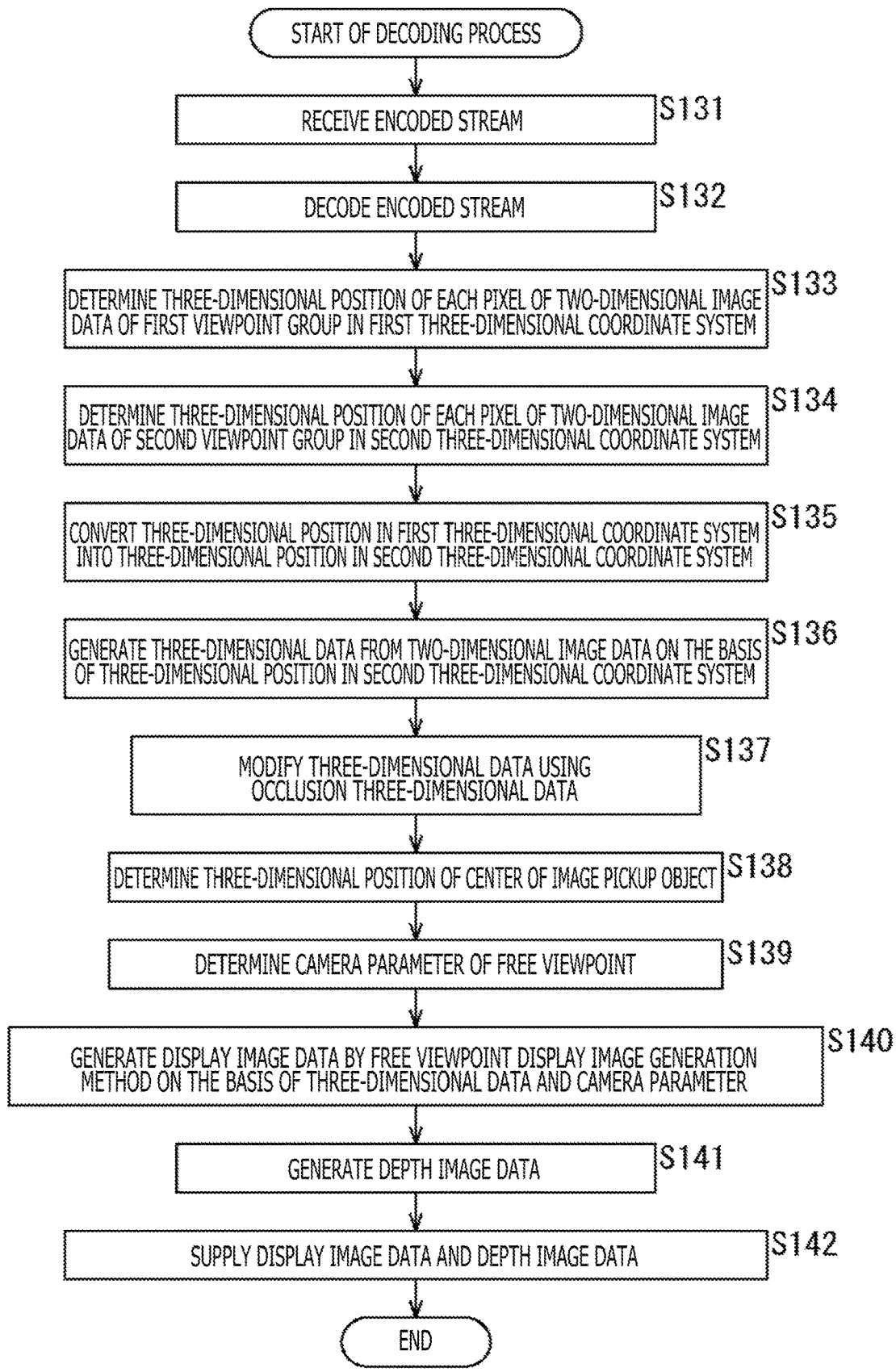
FIG. 25 is a flow chart illustrating a decoding process of a decoding apparatus in the fourth embodiment.

FIG. 25 is a flow chart illustrating a decoding process of the decoding apparatus 284 in the fourth embodiment. This decoding process is started, for example, when an encoded stream is transmitted from the synthesis apparatus 340 to the decoding apparatus 284.

At step S131 of FIG. 25, the reception unit 31 of the decoding apparatus 284 receives an encoded stream transmitted from the synthesis apparatus 283.

At step S132, the decoding unit 301 decodes the received encoded stream in accordance with a method corresponding to the encoding method of the encoding unit 22 and the encoding unit 292. The decoding unit 301 supplies two-dimensional image data, depth image data and metadata of the first viewpoint group and the second viewpoint group obtained as a result of the decoding to the conversion unit 380 (FIG. 24).

At step S133, the three-dimensional position conversion unit 391 of the conversion unit 380 determines, on the basis of the camera parameter from within the metadata, two-dimensional image data and depth image data of the first viewpoint group, the three-dimensional position of each pixel of the two-dimensional image data of the first viewpoint group in the first three-dimensional coordinate system. The three-dimensional position conversion unit 391 supplies the three-dimensional position of each pixel of the two-dimensional image data of the first viewpoint group in the first three-dimensional coordinate system and the two-dimensional image data to the coordinate transformation unit 393.

At step S134, the three-dimensional position conversion unit 392 determines, on the basis of the camera parameter from within the metadata, two-dimensional image data and depth image data of the second viewpoint group, the three-dimensional position of each pixel of the two-dimensional image data of the second viewpoint in the second three-dimensional coordinate system. The three-dimensional position conversion unit 392 supplies the three-dimensional position of each pixel of the two-dimensional image data of the second viewpoint group in the second three-dimensional coordinate system and the two-dimensional image data to the data generation unit 394.

At step S135, the coordinate transformation unit 393 converts, on the basis of the coordinate transformation information from within the metadata supplied from the decoding unit 301, the three-dimensional positions in the first three-dimensional coordinate system supplied from the three-dimensional position conversion unit 391 into three-dimensional positions in the second three-dimensional coordinate system. The coordinate transformation unit 393 supplies the three-dimensional position of each pixel of the two-dimensional image data of the first viewpoint group in the second three-dimensional coordinate system and the two-dimensional image data to the data generation unit 394.

At step S136, the data generation unit 394 generates three-dimensional data of an image pickup object from the two-dimensional image data of the first viewpoint group and the second viewpoint group on the basis of the three-dimensional position of each pixel of the two-dimensional image data of the first viewpoint group and the second viewpoint group in the second three-dimensional coordinate system.

Processes at steps S137 to S142 are similar to the processes at steps S34 to S39 of FIG. 9, respectively, and therefore, description of them is omitted.

It is to be noted that the synthesis apparatus 283 may not place coordinate transformation information into a first partial encoded stream but may replace the external parameters $R_{camA}|t_{camA}$ of each viewpoint of the first viewpoint group in the first three-dimensional coordinate system to be placed into a first partial encoded stream with external parameters $R_{camB}|t_{camB}$ of each viewpoint in the second three-dimensional coordinate system. In this case, the coordinate transformation unit 393 is not provided in the three-dimensional data generation unit 381, but the three-dimensional position conversion unit 391 directly determines a three-dimensional position in the second three-dimensional coordinate system using the external parameters $R_{camB}|t_{camB}$ in place of the external parameters $R_{camA}|t_{camA}$.

In the case where coordinate transformation data of all viewpoints of the first viewpoint group are different from each other, it is preferable to replace the external parameters $R_{camA}|t_{camA}$ with the external parameters $R_{camB}|t_{camB}$. In the case where coordinate transformation information is placed into the first partial encoded stream, since there is no necessity to modify the original first partial encoded stream, the processing is facilitated in comparison with that in an alternative case in which the external parameters are replaced.

Further, the coordinate transformation data of the viewpoints of the first viewpoint group are same if the scales of the two-dimensional image data of the viewpoints (distances between a viewpoint and an image pickup plane in the depthwise direction) are same. Accordingly, in this case, the coordinate transformation data generation unit 341 may generate only coordinate transformation data of one viewpoint of the first viewpoint group as coordinate transformation data common to the viewpoints of the first viewpoint group.

As described above, in the fourth embodiment, a first partial encoded stream generated by the encoding apparatus 12 and a second partial encoded stream generated by the encoding apparatus 282 are synthesized and transmitted to the decoding apparatus 284. Accordingly, three-dimensional coordinate systems of encoded streams of a plurality of viewpoints corresponding to the predetermined display image generation method obtained as a result of the synthesis may not be same.

However, in the fourth embodiment, the synthesis apparatus 340 decodes the first partial encoded stream and the second partial encoded stream once and generates coordinate transformation data on the basis of a result of the decoding. Then, the synthesis apparatus 340 transmits the coordinate transformation information including the generated coordinate transformation data together with the first partial encoded stream and the second partial encoded stream. Accordingly, the conversion unit 380 can convert, on the basis of the coordinate transformation information, the three-dimensional position of each pixel of the two-dimensional image data of the first viewpoint group in the first three-dimensional coordinate system into a three-dimensional position in the second three-dimensional coordinate system. As a result, the conversion unit 380 can generate three-dimensional data with high accuracy from the two-dimensional image data on the basis of the three-dimensional position of each pixel of the two-dimensional image data of the first viewpoint group and the second viewpoint group in the same first three-dimensional coordinate system.

In the second to fourth embodiments, in the case where viewpoints corresponding to a predetermined display image generation method of the two-dimensional image data and the depth image data are different from each other, detection of a synchronism deviation of individual viewpoints or generation of coordinate transformation data is performed on the basis of the two-dimensional image data and the depth image data.

Fifth Embodiment

Example of Configuration of Synthesis Apparatus in Fifth Embodiment of Transmission System The configuration of a fifth embodiment of the transmission system to which the present disclosure is applied is same as the configuration of the transmission system 280 of FIG. 17 except that the synthesis apparatus 283 is replaced by a synthesis apparatus 400 and the conversion unit 33 of the decoding apparatus 284 is replaced by a conversion unit 420 and that viewpoint group synchronism deviation information is replaced by color shift correction information. Accordingly, in the following, only the synthesis apparatus 400 and the conversion unit 420 are described.

Figure 26:
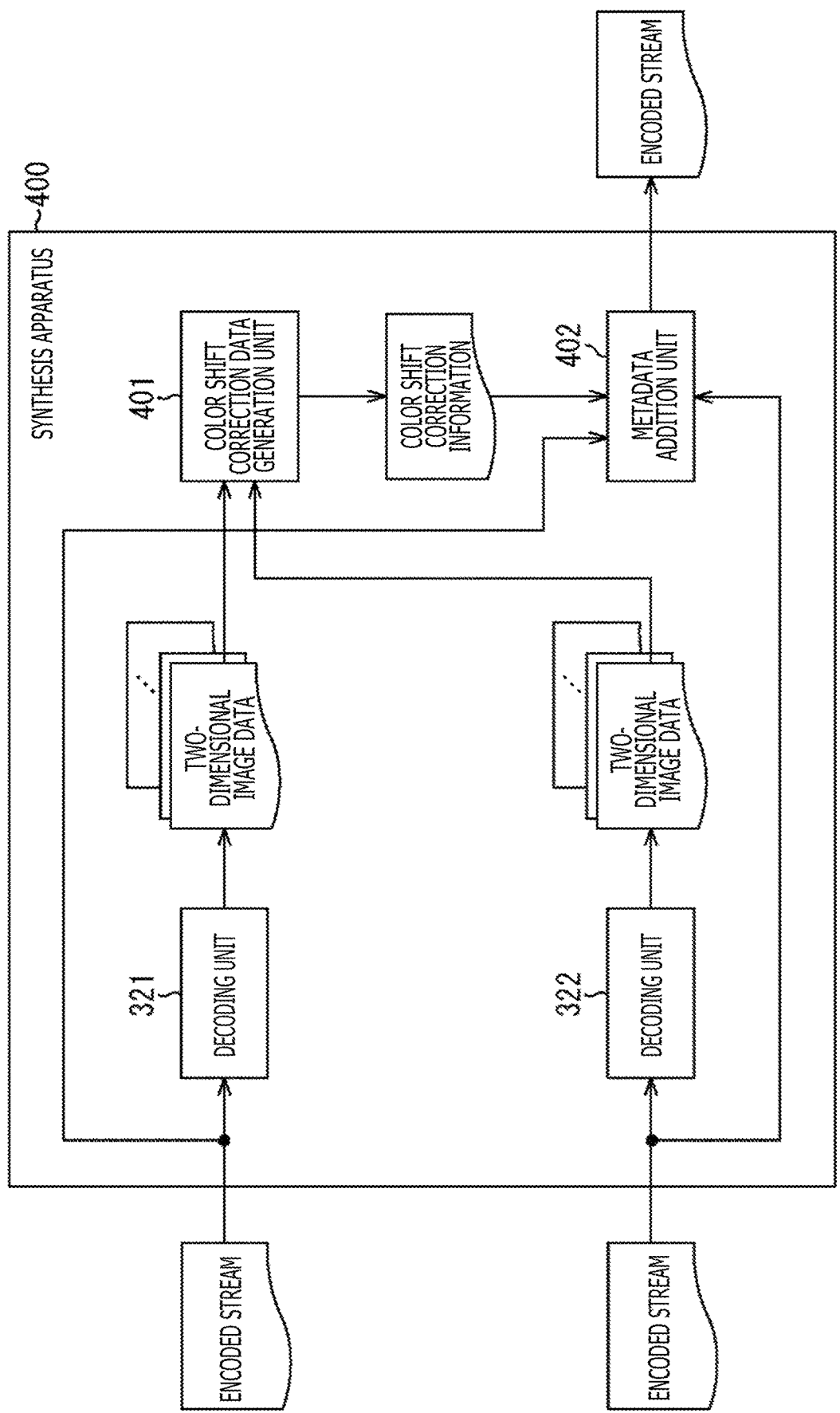
FIG. 26 is a block diagram depicting an example of a configuration of a synthesis apparatus in a fifth embodiment.

FIG. 26 is a block diagram depicting an example of a configuration of the synthesis apparatus 400.

Of the components depicted in FIG. 26, components same as the components of FIG. 18 are denoted by the same reference signs. Overlapping description is suitably omitted.

The configuration of the synthesis apparatus 400 of FIG. 26 is different from the configuration of the synthesis apparatus 283 of FIG. 18 in that the synchronism deviation detection unit 323 and the metadata addition unit 324 are replaced by a color shift correction data generation unit 401 and a metadata addition unit 402, respectively. The synthesis apparatus 400 does not detect a synchronism deviation of two-dimensional image data of each viewpoint but generates color shift correction data for correcting a color shift of two-dimensional image data of each viewpoint.

In particular, the color shift correction data generation unit 401 of the synthesis apparatus 400 determines one of viewpoints of the first viewpoint group and the second viewpoint group as a base viewpoint and determines the other viewpoints as reference viewpoints. The color shift correction data generation unit 401 generates, for each reference viewpoint, color shift correction data for correcting a color shift of two-dimensional image data of the reference viewpoint with respect to the base viewpoint on the basis of two-dimensional image data of the base viewpoint and the reference viewpoint generated by decoding by the decoding unit 321 or the decoding unit 322.

In particular, RGB values (R', G', B') obtained when inverse gamma correction is performed for RGB values (R, G, B) of a feature point from within two-dimensional image data of the reference viewpoint is represented by the following expression (7).

[Math. 7]

$$\begin{bmatrix} R' \\ G' \\ B' \end{bmatrix} = \begin{bmatrix} R^{\gamma R} \\ G^{\gamma G} \\ B^{\gamma B} \end{bmatrix} \quad (7)$$

γR, γG and γB are gamma values of R, G and B, respectively.

Meanwhile, an expression for converting RGB values (R', G', B') into RGB value (R", G", B") obtained when inverse gamma correction is performed for RGB values ($R_c$, $G_c$, $B_c$) of a feature point at which the RGB values of the reference viewpoint are (R, G, B) from within two-dimensional image data of the base viewpoint is represented by the following expression (8).

[Math. 8]

$$\begin{bmatrix} R'' \\ G'' \\ B'' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R' \\ G' \\ B' \end{bmatrix} \quad (8)$$

$a_{11}$ to $a_{13}$, $a_{21}$ to $a_{23}$ and $a_{31}$ to $a_{33}$ are coefficients.

Further, since the RGB values ($R_c$, $G_c$, $B_c$) are values obtained when gamma correction is performed for the RGB values (R", G", B"), they are represented by the following expression (9).

[Math. 9]

$$\begin{bmatrix} R_C \\ G_C \\ B_C \end{bmatrix} = \begin{bmatrix} R''^{\frac{1}{\gamma R}} \\ G''^{\frac{1}{\gamma G}} \\ B''^{\frac{1}{\gamma B}} \end{bmatrix} \quad (9)$$

By the above, the color shift correction data generation unit 401 extracts RGB value (R, G, B) of a feature point from two-dimensional image data of a reference viewpoint and extracts RGB values ($R_c$, $G_c$, $B_c$) of the feature point from two-dimensional image data of the base viewpoint. Then, the color shift correction data generation unit 401 generates, on the basis of the extracted RGB value (R, G, B) and RGB values ($R_c$, $G_c$, $B_c$), gamma values γR, γG, γB and coefficients all $a_{13}$, $a_{21}$ to $a_{23}$ and $a_{31}$ to $a_{33}$ that are required when the RGB values (R, G, B) are to be converted into the RGB values ($R_c$, $G_c$, $B_c$) as color shift correction data.

Further, the color shift correction data generation unit 401 generates color shift correction data with which the RGB values (R, G, B) and the RGB values ($R_c$, $G_c$, $B_c$) become same as each other as color shift correction data for the base viewpoint. The color shift correction data generation unit 401 supplies color shift correction information including the generated color shift correction data of each viewpoint to the metadata addition unit 402.

The metadata addition unit 402 places the color shift correction information for the first viewpoint group from within the color shift correction information supplied from the color shift correction data generation unit 401 as metadata into a first partial encoded stream transmitted thereto from the encoding apparatus 12. Further, the metadata addition unit 402 places the color shift correction information of the second viewpoint group from within the color shift correction information supplied thereto from the color shift correction data generation unit 401 as metadata into a second partial encoded stream transmitted thereto from the encoding apparatus 282.

The metadata addition unit 402 synthesizes the first partial encoded stream and the second partial encoded stream in each of which the color shift correction information is placed as metadata. The metadata addition unit 402 (transmission unit) transmits the encoded stream of a plurality of viewpoints corresponding to the predetermined display image generation method obtained as a result of the synthesis to the decoding apparatus 284.

Example of Color Shift Correction Information

FIG. 27 is a view depicting an example of color shift correction information.

In the example of FIG. 27, the number of a plurality of viewpoints corresponding to the predetermined display image generation method is 9.

As depicted in FIG. 27, the color shift correction information is configured by associating each of camera IDs of all viewpoints corresponding to the predetermined display image generation method with isCorrectionFlag and color shift correction data of the viewpoint.

isCorrectionFlag is a flag indicative of whether or not a color shift occurs between the corresponding viewpoint and the base viewpoint. isCorrectionFlag is 1 in the case where it is indicated that a color shift occurs between the corresponding viewpoint and the base viewpoint but is 0 in the case where it is indicated that a color shift does not occur.

In the example of FIG. 27, the viewpoint whose camera ID is 0 is the base viewpoint, and no color shift occurs between the reference viewpoints whose camera ID is 1, 2, 4 and 6 to 9 and the base viewpoint. Accordingly, isCorrectionFlag corresponding to the camera IDs that are 0 to 2, 4 and 6 to 9 is 0, and color shift correction data is not described correspondingly to the camera IDs.

Meanwhile, in the example of FIG. 27, a color shift occurs between the reference viewpoints whose camera ID is 3 and 5 and the base viewpoint. Accordingly, isCorrectionFlag correspondingly to the camera IDs that are 3 and 5 is 1, and color shift correction data is described corresponding to the camera IDs. In FIG. 27, the color shift correction data for each viewpoint whose camera ID is i is described as P(i).

It is to be noted that color shift correction information may include a color shift common flag indicative of whether or not color shift correction data for all of the viewpoints with which a color shift occurs are same as each other. In this case, when the color shift correction data of all of the viewpoints with which a color shift occurs are same as each other, the color shift correction information includes a color shift common flag (color shift common information) indicating that the color shift correction data of all of the viewpoints with which a color shift occurs are same as each other and color shift correction data common to all of the viewpoints with which a color shift occurs. The color shift common flag is 1, for example, in the case where the color shift correction data of all of the viewpoints with which a color shift occurs are same as each other, but is 0 in the case where the color shift correction data are different.

Description of Processing of Synthesis Apparatus

Figure 28:
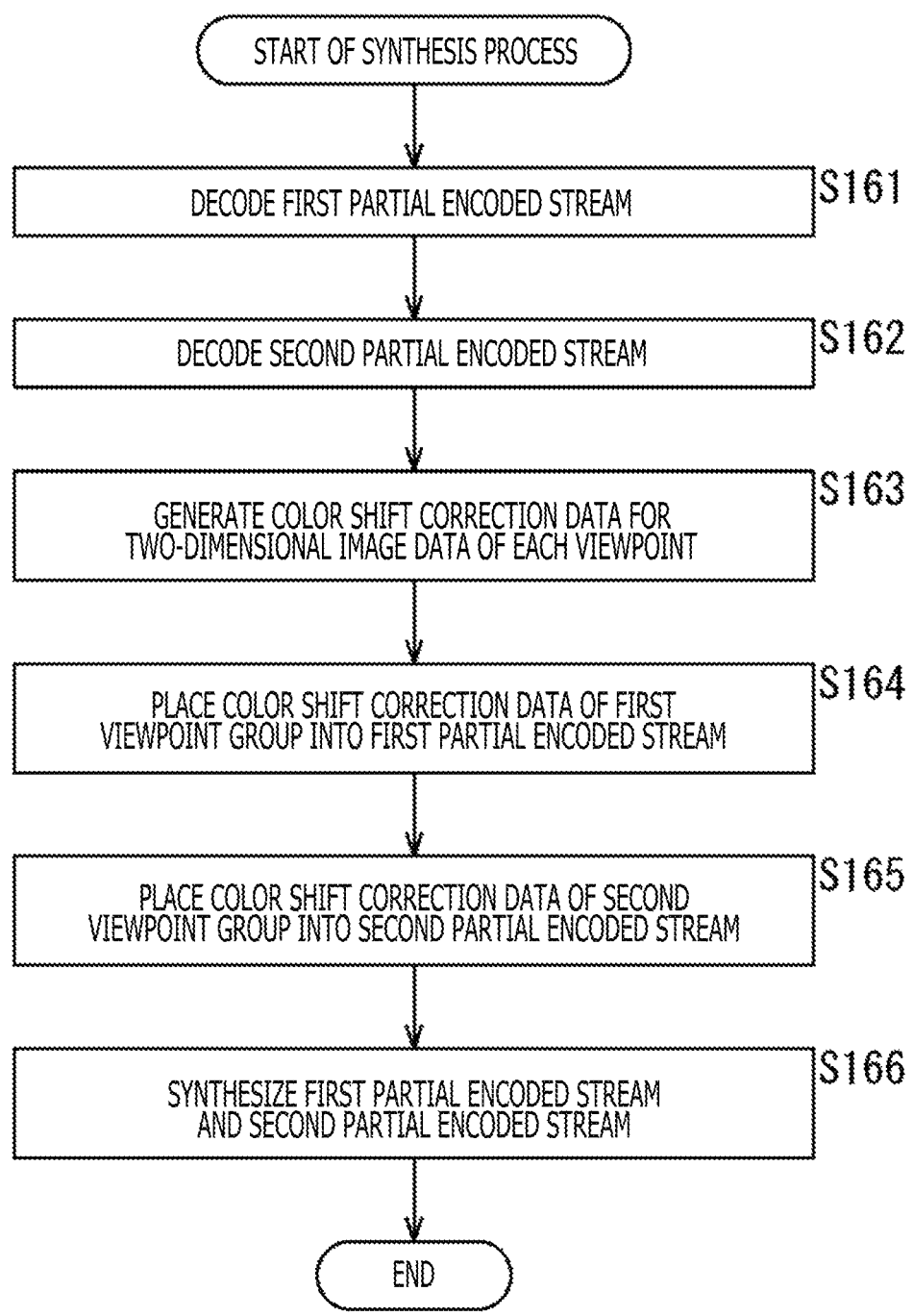
FIG. 28 is a flow chart illustrating a synthesis process of the synthesis apparatus of FIG. 26.

FIG. 28 is a flow chart illustrating a synthesis process of the synthesis apparatus 400 of FIG. 26.

Processes at steps S161 and S162 of FIG. 28 are similar to the processes at steps S91 and S92 of FIG. 19, respectively, and therefore, description of them is omitted.

At step S163, the color shift correction data generation unit 401 of the synthesis apparatus 400 generates, for each reference viewpoint, color shift correction data for the reference viewpoint on the basis of two-dimensional image data of the base viewpoint and the reference viewpoint generated by decoding of the decoding unit 321 or the decoding unit 322. Further, the color shift correction data generation unit 401 generates color shift correction data with which the RGB values (R, G, B) and the RGB values ($R_c$, $G_c$, $B_c$) become same as each other as color shift correction data for the base viewpoint. The color shift correction data generation unit 401 supplies color shift correction information including the generated color shift correction data for the viewpoints to the metadata addition unit 402.

At step S164, the metadata addition unit 402 places the color shift correction information for the first viewpoint group from within the color shift correction information supplied from the color shift correction data generation unit 401 as metadata into a first partial encoded stream transmitted from the encoding apparatus 12.

At step S165, the metadata addition unit 402 places the color shift correction information for the second viewpoint group from within the color shift correction information supplied from the color shift correction data generation unit 401 as metadata into a second partial encoded stream transmitted from the encoding apparatus 282.

At step S166, the metadata addition unit 402 synthesizes the first partial encoded stream and the second partial encoded stream in each of which the color shift correction information is placed as metadata. The metadata addition unit 402 transmits an encoded stream of a plurality of viewpoints corresponding to the predetermined display image generation method obtained as a result of the synthesis to the decoding apparatus 284.

Example of Configuration of Conversion Unit

Figure 29:
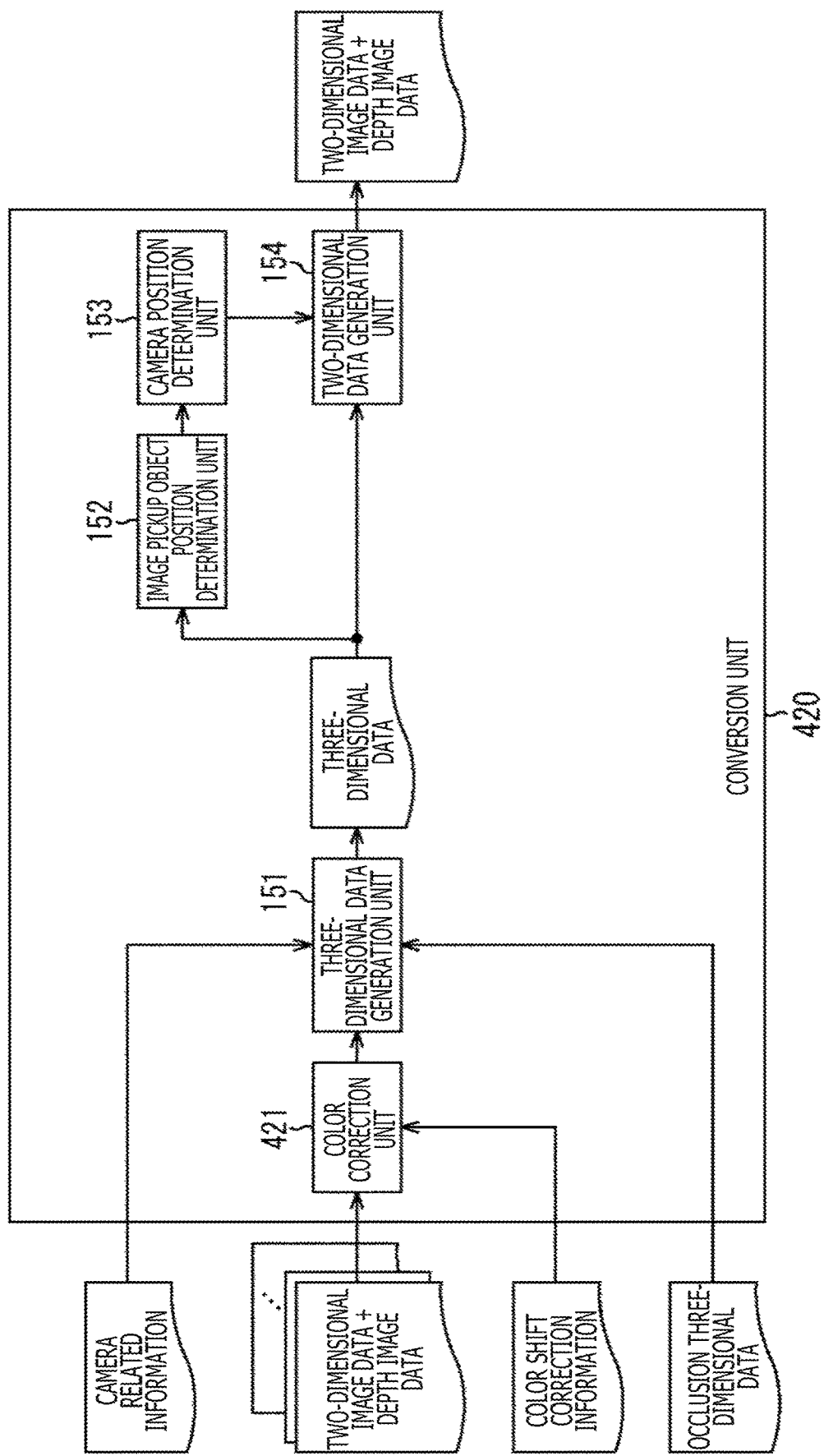
FIG. 29 is a block diagram depicting an example of a configuration of a conversion unit in the fifth embodiment.

FIG. 29 is a block diagram depicting an example of a configuration of the conversion unit 420.

Of the components depicted in FIG. 29, components same as the components of FIG. 8 are denoted by the same reference signs. Overlapping description is suitably omitted.

The configuration of the conversion unit 420 of FIG. 29 is different from the configuration of the conversion unit 33 of FIG. 8 in that a color correction unit 421 is provided newly.

The color correction unit 421 of the conversion unit 420 performs, on the basis of color shift correction information obtained as a result of decoding by the decoding unit 301, color correction of two-dimensional image data of the first viewpoint group and the second viewpoint group in accordance with the expressions (7) to (9) given hereinabove. Consequently, the relation between a color and RGB values becomes same among the two-dimensional image data of all viewpoints. The color correction unit 421 supplies the two-dimensional image data of the first viewpoint group and the second viewpoint group after the color correction and depth image data of the first viewpoint group and the second viewpoint group obtained as a result of decoding by the decoding unit 301 to the three-dimensional data generation unit 151.

The decoding process of the decoding apparatus 284 in the fifth embodiment is similar to the decoding process of FIG. 9 except that color correction by the color correction unit 421 is performed between step S32 and step S33.

As described above, in the fifth embodiment, a first partial encoded stream and a second partial encoded stream generated using two-dimensional image data picked up by different cameras are synthesized and transmitted to the decoding apparatus 284. Accordingly, a color shift may in some cases occur in an encoded stream of a plurality of viewpoints corresponding to the predetermined display image generation method obtained as result of the synthesis.

However, in the fifth embodiment, the synthesis apparatus 340 decodes the first partial encoded stream and the second partial encoded stream once and generates color shift correction data for the two-dimensional image data of individual viewpoints obtained as a result of the decoding. Then, the synthesis apparatus 340 transmits the color shift correction information of the generated color shift correction data together with the first partial encoded stream and the second partial encoded stream. Accordingly, the conversion unit 420 can correct a color shift of two-dimensional image data of each viewpoint of the first viewpoint group and the second viewpoint group on the basis of the color shift correction data. As a result, the conversion unit 420 can improve the accuracy of two-dimensional image data within three-dimensional data by generating three-dimensional data using the two-dimensional image data and the depth image data of the first viewpoint group and the second viewpoint group whose color shift is corrected.

Further, in the fifth embodiment, since the synthesis apparatus 400 transmits color shift correction information, only it is necessary to place the color shift correction information as metadata into the first partial encoded stream and the second partial encoded stream. Accordingly, the processing amount of the synthesis apparatus 400 can be reduced in comparison with that in an alternative case in which the first partial encoded stream and the second partial encoded stream are decoded and then re-encoded after the color shift is corrected.

It is to be noted that, in the fifth embodiment, perimeter dimming correction information including a gain for correcting dimming of a periphery with respect to a central portion of two-dimensional image data for each viewpoint or each viewpoint group may be placed as metadata into the first partial encoded stream and the second partial encoded stream. Alternatively, Exif (Exchangeable image file format) information for each viewpoint or for each viewpoint group may be placed as metadata.

Sixth Embodiment

Description of Computer to which Present Disclosure is Applied

While the series of processes described hereinabove can be executed by hardware, it can otherwise be executed by software. In the case where the series of processes is executed by software, a program that constructs the software is installed into a computer. Here, in the computer, a computer incorporated in hardware for exclusive use, a personal computer, for example, for universal use that can execute various functions by installing various programs and so forth are included.

FIG. 30 is a block diagram depicting an example of a hardware configuration of a computer that executes the series of processes described hereinabove by a program.

In the computer 600, a CPU (Central Processing Unit) 601, a ROM (Read Only Memory) 602 and a RAM (Random Access Memory) 603 are connected to each other by a bus 604.

To the bus 604, an input/output interface 605 is connected further. To the input/output interface 605, an inputting unit 606, an outputting unit 607, a storage unit 608, a communication unit 609 and a drive 610 are connected.

The inputting unit 606 includes, for example, a keyboard, a mouse, a microphone and so forth. The outputting unit 607 includes, for example, a display, a speaker and so forth. The storage unit 608 includes a hard disk, a nonvolatile memory or the like. The communication unit 609 includes a network interface or the like. The drive 610 drives a removable medium 611 such as a magnetic disk, an optical disk, a magneto-optical disk or a semiconductor memory.

In the computer 600 configured in such a manner as described above, the CPU 601 loads a program stored, for example, in the storage unit 608 into the RAM 603 through the input/output interface 605 and the bus 604 and executes the program to perform the series of processes described hereinabove.

The program to be executed by the computer 600 (CPU 601) can be recorded into and provided, for example, as a removable medium 611 as a package medium. Further, the program can be provided through a wired or wireless transmission medium such as a local area network, the Internet or a digital satellite broadcast.

In the computer 600, the program can be installed into the storage unit 608 through the input/output interface 605 by loading a removable medium 611 into the drive 610. Further, the program can be received through a wired or wireless transmission medium by the communication unit 609 and installed into the storage unit 608. Alternatively, the program can be installed into the ROM 602 or the storage unit 608 in advance.

It is to be noted that the program executed by the computer 600 may be a program by which the processes are performed in a time series in accordance with the order described in the present specification or may be a program by which the processes are performed in parallel or at necessary timings such as when the program is called or the like.

Further, in the present specification, the term system signifies an aggregation of a plurality of constituent elements (devices, modules (parts) and so forth) and it does not matter whether or not all of the constituent elements are accommodated in the same housing. Accordingly, a plurality of apparatus accommodated in separate housings and connected to each other through a network are a system, and one apparatus that includes a plurality of modules accommodated in a single housing is also a system.

It is to be noted that the effects described in the present specification are exemplary to the end and are not restrictive, and other effects may be involved.

Further, the embodiment of the present disclosure is not limited to the embodiments described hereinabove but can be altered in various manners without departing from the subject matter of the present disclosure.

The present disclosure can take also the following configuration. P (1)

An image processing apparatus, including:
a color shift correction data generation unit that generates color shift correction data for correcting a color shift between two-dimensional image data of a first viewpoint and two-dimensional image data of a second viewpoint; and
a transmission unit that transmits color shift correction information including the color shift correction data generated by the color shift correction data generation unit, first encoded data that is encoded data of the two-dimensional image data of the first viewpoint and depth image data indicative of a position of each of pixels in a depthwise direction of an image pickup object with respect to a third viewpoint and second encoded data that is encoded data of the two-dimensional image data of the second viewpoint and depth image data of a fourth viewpoint. P (2)

The image processing apparatus according to (1), in which the number of the second viewpoints is a plural number; and the color shift correction data generation unit generates the color shift correction data for each of the second viewpoints. P (3)

The image processing apparatus according to (2), in which the color shift correction information includes color shift common information indicating whether or not the color shift correction data of all of the second viewpoints with which a color shift occurs are same. P (4)

The image processing apparatus according to (2), in which in a case where the color shift correction data of all of the second viewpoints with which a color shift occurs are same, the transmission unit transmits color shift correction information including color shift common information indicating that the color shift correction data of all of the second viewpoints with which a color shift occurs are same and the color shift correction data common to all of the second viewpoints. P (5)

The image processing apparatus according to any one of (1) to (4), in which at least part of image pickup objects of the two-dimensional image data of the first viewpoint and the two-dimensional image data of the second viewpoint are same. P (6)

The image processing apparatus according to any one of (1) to (5), further including:

a decoding unit that decodes the first encoded data and the second encoded data; in which the color shift correction data generation unit generates the color shift correction data on the basis of the two-dimensional image data of the first viewpoint and the two-dimensional image data of the second viewpoint obtained as a result of the decoding by the decoding unit. P (7)

An image processing method by an information processing apparatus, including:

a color shift correction data generation step of generating color shift correction data for correcting a color shift between two-dimensional image data of a first viewpoint and two-dimensional image data of a second viewpoint; and a transmission step of transmitting color shift correction information including the color shift correction data generated by the process at the color shift correction data generation step, first encoded data that is encoded data of the two-dimensional image data of the first viewpoint and depth image data indicative of a position of each of pixels in a depthwise direction of an image pickup object with respect to a third viewpoint and second encoded data that is encoded data of the two-dimensional image data of the second viewpoint and depth image data of a fourth viewpoint. P (8)

An image processing apparatus, including:

a decoding unit that decodes first encoded data that is encoded data of two-dimensional image data of a first viewpoint and depth image data indicative of a position of each of pixels in a depthwise direction of an image pickup object with respect to a second viewpoint and second encoded data that is encoded data of two-dimensional image data of a third viewpoint and depth image data of a fourth viewpoint; and a color correction unit that performs color correction of the two-dimensional image data of the third viewpoint obtained as a result of the decoding by the decoding unit on the basis of color shift correction information including color shift correction data of the two-dimensional image data of the first viewpoint and the two-dimensional image data of the third viewpoint. P (9)

The image processing apparatus according to (8), further including:

a three-dimensional data generation unit that generates three-dimensional data of the image pickup object on the basis of the two-dimensional image data of the first viewpoint, the depth image data of the second viewpoint, the two-dimensional image data of the third viewpoint for which color correction is performed by the color correction unit and the depth image data of the fourth viewpoint. P (10)

The image processing apparatus according to (8) or (9), in which the number of the third viewpoints is a plural number; and the color correction unit performs color correction on the basis of the color shift correction information including the color shift correction data for each of the third viewpoints. P (11)

The image processing apparatus according to (10), in which the color shift correction information includes color shift common information indicating whether or not the color shift correction data of all of the third viewpoints with which a color shift occurs are same. P (12)

The image processing apparatus according to (10), in which the color shift correction information includes color shift common information indicating that the color shift correction data of all of the third viewpoints with which a color shift occurs are same and the color shift correction data common to all of the third viewpoints. P (13)

The image processing apparatus according to any one of (8) to (12), in which at least part of image pickup objects of the two-dimensional image data of the first viewpoint and the two-dimensional image data of the third viewpoint are same. P (14)

An image processing method by an image processing apparatus, including:

a decoding step of decoding first encoded data that is encoded data of two-dimensional image data of a first viewpoint and depth image data indicative of a position of each of pixels in a depthwise direction of an image pickup object with respect to a second viewpoint and second encoded data that is encoded data of two-dimensional image data of a third viewpoint and depth image data of a fourth viewpoint; and a color correction step of performing color correction of the two-dimensional image data of the third viewpoint obtained as a result of the decoding by the process at the decoding step on the basis of color shift correction information including color shift correction data of the two-dimensional image data of the first viewpoint and the two-dimensional image data of the third viewpoint.

REFERENCE SIGNS LIST

11 Image pickup apparatus, 12 Encoding apparatus, 13 Decoding apparatus, 22 Encoding unit, 23 Transmission unit, 31 Reception unit, 32 Decoding unit, 53 Two-dimensional data generation unit, 151 Three-dimensional data generation unit, 154 Two-dimensional data generation unit, 171 Image pickup apparatus, 172 Encoding apparatus, 173 Decoding apparatus, 192 Conversion unit, 211-1 to 211-N Camera, 222 Synchronism deviation detection unit, 261-1 to 261-2N Decoding processing unit, 262 Outputting unit, 282 Encoding apparatus, 283 Synthesis apparatus, 284 Decoding apparatus, 292 Encoding unit, 301 Decoding unit, 321, 322 Decoding unit, 323 Synchronism deviation detection unit, 324 Metadata addition unit, 340 Synthesis apparatus, 341 Coordinate transformation data generation unit, 342 Metadata addition unit, 391, 392 Three-dimensional position conversion unit, 393 Coordinate transformation unit, 394 Data generation unit, 400 Synthesis apparatus, 401 Color shift correction data generation unit, 402 Metadata addition unit, 421 Color correction unit

The invention claimed is:

1. An image processing apparatus, comprising:
a color shift correction data generation unit configured to generate color shift correction data for correcting a color shift of color values of two-dimensional image data of a first viewpoint with respect to color values of two-dimensional image data of a second viewpoint; and
a transmission unit configured to transmit color shift correction information including the color shift correction data generated by the color shift correction data generation unit, first encoded data that is encoded data of the two-dimensional image data of the first viewpoint and depth image data indicative of a position of each of pixels in a depthwise direction of an image pickup object with respect to a third viewpoint and second encoded data that is encoded data of the two-dimensional image data of the second viewpoint and depth image data of a fourth viewpoint, wherein
a number of the second viewpoints is a plural number,
the color shift correction information includes the color shift correction data for correcting a color shift between the two-dimensional image data of the first viewpoint with respect to the two-dimensional image data of each of the second viewpoints,
the color shift correction information includes color shift common information set based on whether or not the color shift correction data of all of the second viewpoints with which the color shift occurs are same as each other, and
the color shift correction data generation unit and the transmission unit are each implemented via at least one processor.

2. The image processing apparatus according to claim 1, wherein
in a case where the color shift correction data of all of the second viewpoints with which the color shift occurs are different, the transmission unit is further configured to transmit color shift correction information including color shift common information indicating that the color shift correction data of all of the second viewpoints with which the color shift occurs are different and the color shift correction data of each of the second viewpoints.

3. The image processing apparatus according to claim 2, wherein
in a case where the color shift correction data of all of the second viewpoints with which the color shift occurs are same, the transmission unit is further configured to transmit color shift correction information including color shift common information indicating that the color shift correction data of all of the second viewpoints with which the color shift occurs are same and only one of the color shift correction data common to all of the second viewpoints.

4. The image processing apparatus according to claim 1, wherein at least part of image pickup objects of the two-dimensional image data of the first viewpoint and the two-dimensional image data of the second viewpoint are same.

5. The image processing apparatus according to claim 1, further comprising:
a decoding unit configured to decode the first encoded data and the second encoded data, wherein
the color shift correction data generation unit is further configured to generate the color shift correction data on the basis of the two-dimensional image data of the first viewpoint and the two-dimensional image data of the second viewpoint obtained as a result of the decoding by the decoding unit, and
wherein the color shift correction data generation unit is implemented via at least one processor.

6. An image processing method by an information processing apparatus, comprising:
generating color shift correction data for correcting a color shift of color values of two-dimensional image data of a first viewpoint with respect to color values of two-dimensional image data of a second viewpoint; and
transmitting color shift correction information including the color shift correction data, first encoded data that is encoded data of the two-dimensional image data of the first viewpoint and depth image data indicative of a position of each of pixels in a depthwise direction of an image pickup object with respect to a third viewpoint and second encoded data that is encoded data of the two-dimensional image data of the second viewpoint and depth image data of a fourth viewpoint, wherein
a number of the second viewpoints is a plural number,
the color shift correction information includes the color shift correction data for correcting a color shift between the two-dimensional image data of the first viewpoint with respect to the two-dimensional image data of each of the second viewpoints, and
the color shift correction information includes color shift common information set based on whether or not the color shift correction data of all of the second viewpoints with which the color shift occurs are same as each other.

7. An image processing apparatus, comprising:
a decoding unit configured to decode first encoded data that is encoded data of two-dimensional image data of a first viewpoint and depth image data indicative of a position of each of pixels in a depthwise direction of an image pickup object with respect to a second viewpoint and second encoded data that is encoded data of two-dimensional image data of a third viewpoint and depth image data of a fourth viewpoint; and
a color correction unit configured to perform color correction of the two-dimensional image data of the third viewpoint obtained as a result of the decoding by the decoding unit on the basis of color shift correction information including color shift correction data for correcting a color shift of color values of the two-dimensional image data of the first viewpoint with respect to color values of the two-dimensional image data of the third viewpoint, wherein
a number of the second viewpoints is a plural number,
the color shift correction information includes the color shift correction data for correcting a color shift between the two-dimensional image data of the first viewpoint with respect to the two-dimensional image data of each of the second viewpoints, the color shift correction information includes color shift common information set based on whether or not the color shift correction data of all of the second viewpoints with which the color shift occurs are same as each other, and the decoding unit and the color correction unit are each implemented via at least one processor.

8. The image processing apparatus according to claim 7, further comprising:

a three-dimensional data generation unit configured to generate three-dimensional data of the image pickup object on the basis of the two-dimensional image data of the first viewpoint, the depth image data of the second viewpoint, the two-dimensional image data of the third viewpoint for which color correction is performed by the color correction unit and the depth image data of the fourth viewpoint, wherein the three-dimensional data generation unit is implemented via at least one processor.

9. The image processing apparatus according to claim 7, wherein a number of the third viewpoints is a plural number, and the color correction unit is further configured to perform color correction on the basis of the color shift correction information including the color shift correction data for correcting a color shift between the two-dimensional image data of the first viewpoint with respect to the two-dimensional image data of each of the third viewpoints.

10. The image processing apparatus according to claim 9, wherein the color shift correction information includes color shift common information indicating whether or not the color shift correction data of all of the third viewpoints with which the color shift occurs are same.

11. The image processing apparatus according to claim 9, wherein the color shift correction information includes color shift common information indicating that the color shift correction data of all of the third viewpoints with which the color shift occurs are same and the color shift correction data common to all of the third viewpoints.

12. The image processing apparatus according to claim 7, wherein at least part of image pickup objects of the two-dimensional image data of the first viewpoint and the two-dimensional image data of the third viewpoint are same.

13. An image processing method by an image processing apparatus, comprising:

decoding first encoded data that is encoded data of two-dimensional image data of a first viewpoint and depth image data indicative of a position of each of pixels in a depthwise direction of an image pickup object with respect to a second viewpoint and second encoded data that is encoded data of two-dimensional image data of a third viewpoint and depth image data of a fourth viewpoint; and performing color correction of the two-dimensional image data of the third viewpoint obtained as a result of the decoding on the basis of color shift correction information including color shift correction data for correcting a color shift of color values of the two-dimensional image data of the first viewpoint with respect to color values of the two-dimensional image data of the third viewpoint, wherein a number of the second viewpoints is a plural number, the color shift correction information includes the color shift correction data for correcting a color shift between the two-dimensional image data of the first viewpoint with respect to the two-dimensional image data of each of the second viewpoints, and the color shift correction information includes color shift common information set based on whether or not the color shift correction data of all of the second viewpoints with which the color shift occurs are same as each other.

* * * * *